(12) United States Patent
Koike et al.

(10) Patent No.: US 6,507,710 B1
(45) Date of Patent: Jan. 14, 2003

(54) DATA RECORDING DEVICE AND CAMERA WITH DATA IMAGING DEVICE

(75) Inventors: Kazumi Koike, Kanagawa (JP); Mitsuhiro Moriya, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/700,281

(22) PCT Filed: May 10, 1999

(86) PCT No.: PCT/JP99/02397

§ 371 (c)(1),
(2), (4) Date: Dec. 28, 2000

(87) PCT Pub. No.: WO99/59027

PCT Pub. Date: Nov. 18, 1999

(30) Foreign Application Priority Data

| May 13, 1998 | (JP) | 10-130115 |
| Jul. 28, 1998 | (JP) | 10-212255 |
| Jul. 28, 1998 | (JP) | 12-212908 |
| Jul. 28, 1998 | (JP) | 10-212909 |

(51) Int. Cl.[7] .............................................. G03B 17/24
(52) U.S. Cl. ........................ 396/315; 396/317; 396/318
(58) Field of Search .................................. 396/310, 315, 396/316, 317, 318

(56) References Cited

U.S. PATENT DOCUMENTS 5,884,108 A * 3/1999 Kamo et al. ................ 396/315

6,044,231 A * 3/2000 Soshi et al. ................ 396/315

FOREIGN PATENT DOCUMENTS

| JP | 5147235 | 10/1974 |
| JP | 58131051 | 9/1983 |
| JP | 324640 | 3/1991 |
| JP | 5127248 | 5/1993 |
| JP | 6160963 | 6/1994 |
| JP | 6301095 | 10/1994 |
| JP | 7295066 | 11/1995 |
| JP | 86142 | 1/1996 |
| JP | 8114841 | 5/1996 |
| JP | 8160523 | 6/1996 |
| JP | 1096991 | 4/1998 |

* cited by examiner

Primary Examiner—David M. Gray
(74) Attorney, Agent, or Firm—Young & Thompson

(57) ABSTRACT

In an optical data recording device, an LCD panel, an aperture stop and a projection lens are arranged in this order from the object side, and a center of the LCD panel is displaced from an optical axis of the projection lens in a direction away from an optical axis of an taking lens, so an image of data displayed on the LCD panel is projected on a photo filmstrip at a position that is shifted from the projection lens optical axis toward the taking lens optical axis. Where the photo filmstrip is curved along its lengthwise direction for compensating for a curvature of field of the taking lens, the LCD panel is inclined to a perpendicular plane to the projection lens optical axis, so an image surface of the LCD panel is formed on the photo filmstrip parallel with its curve.

25 Claims, 38 Drawing Sheets

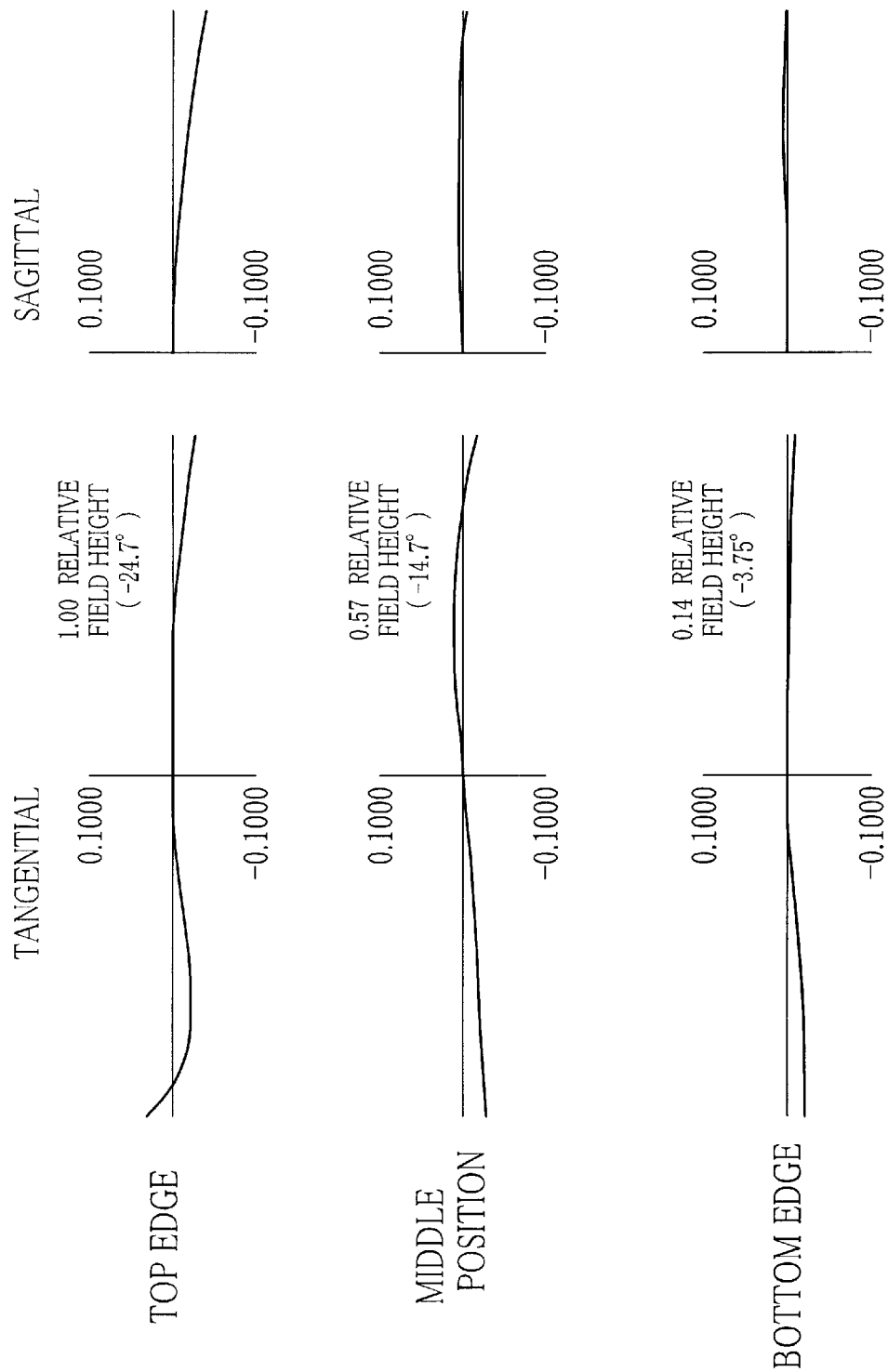

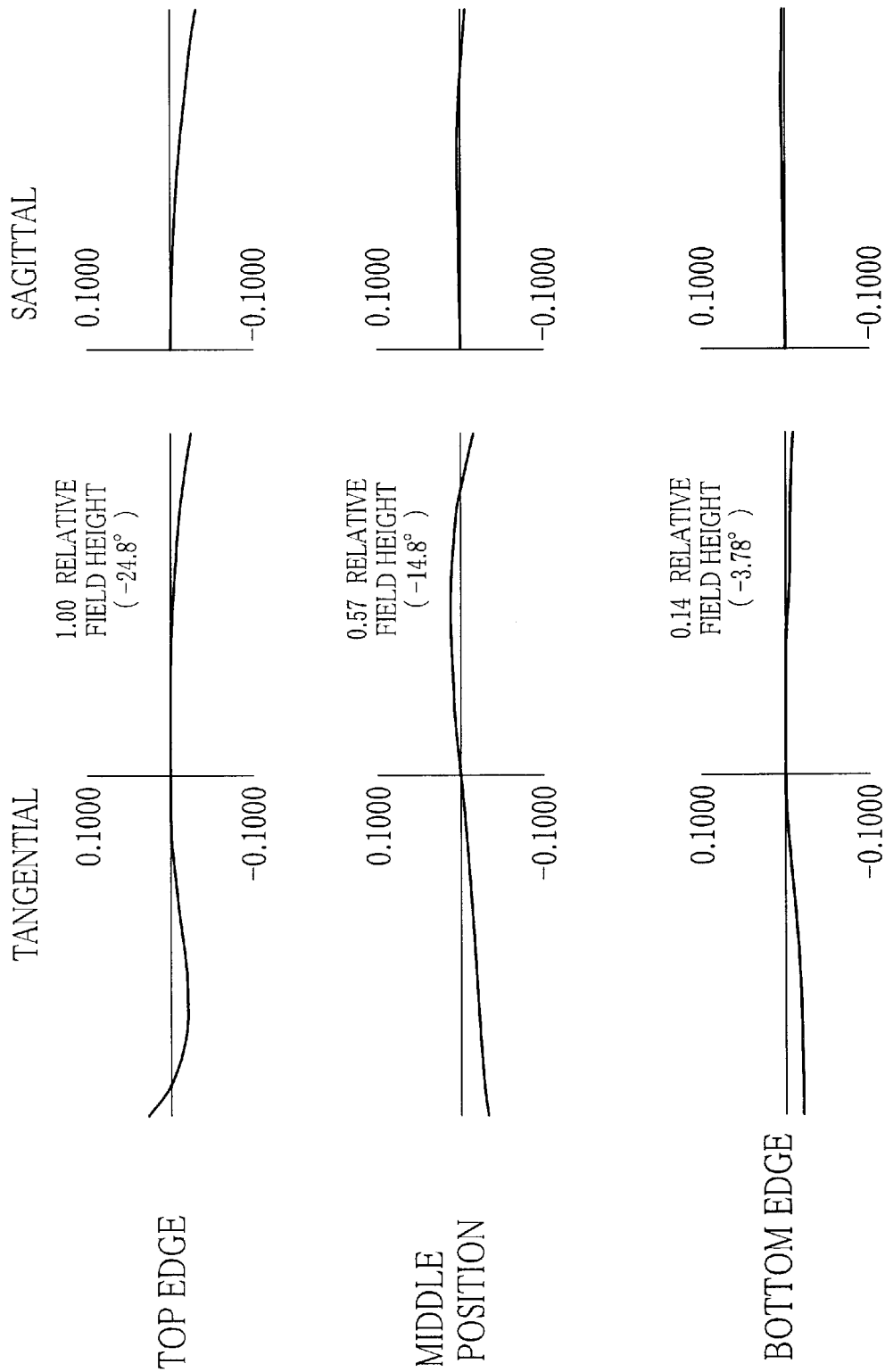

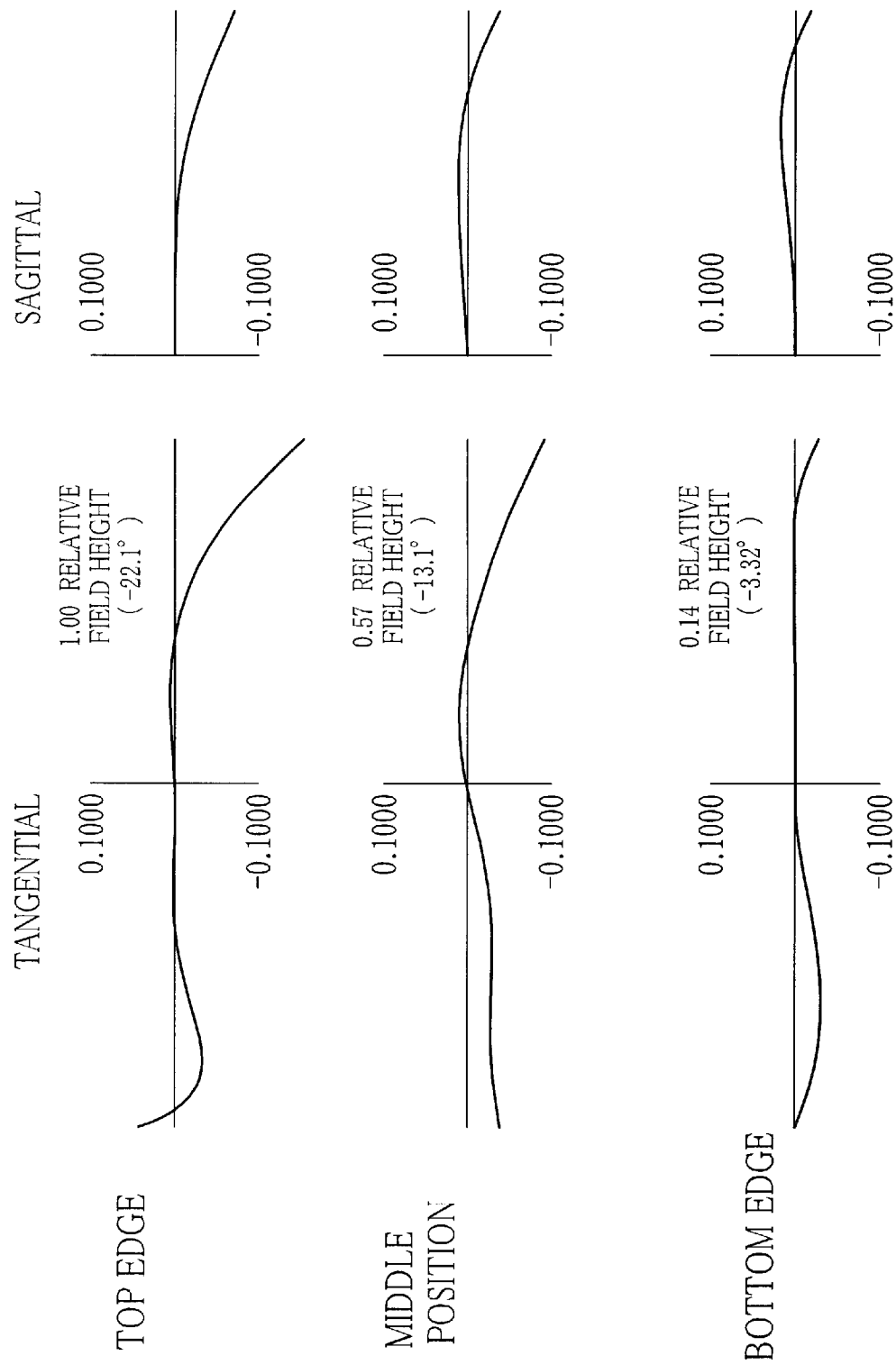

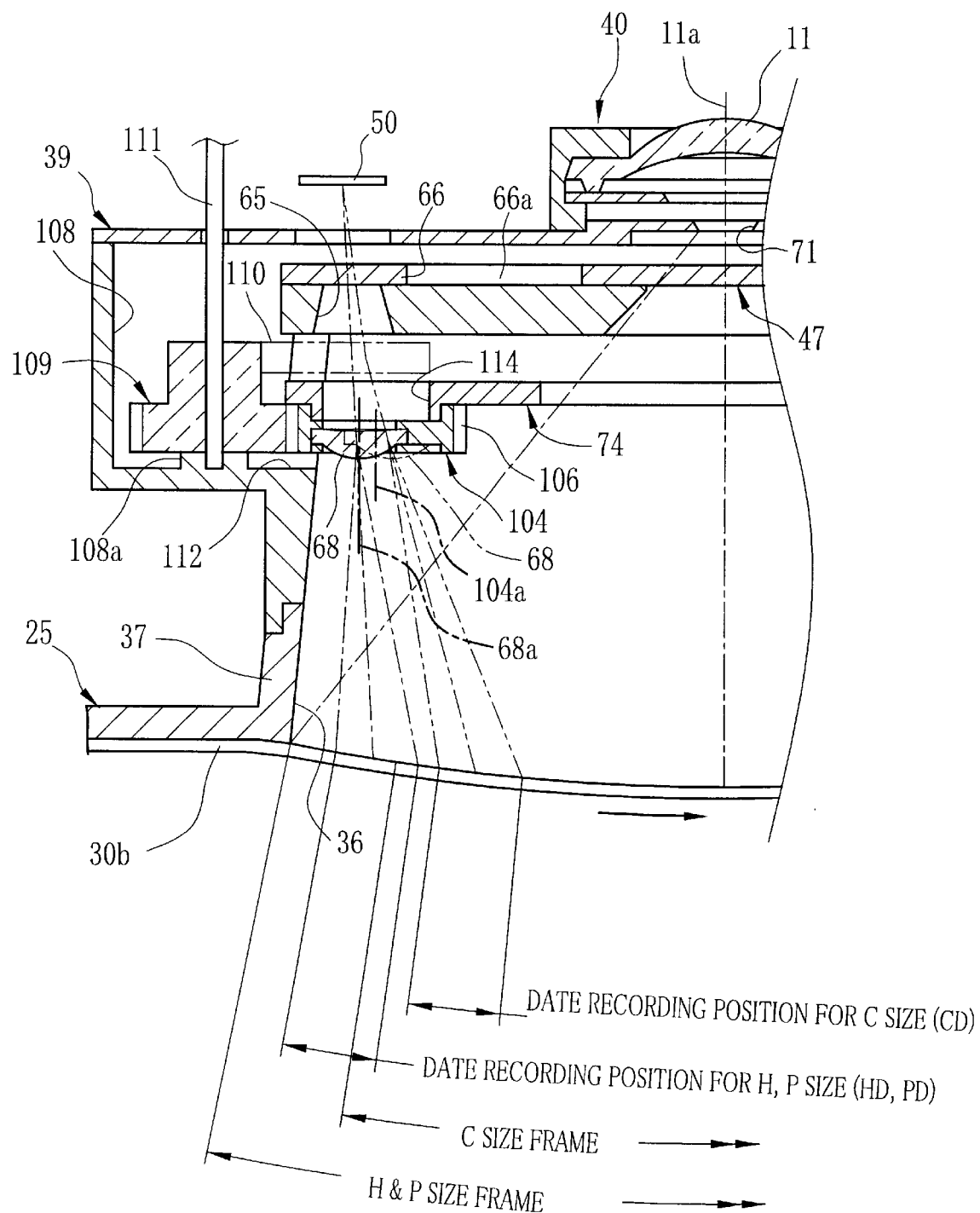

DATA RECORDING DEVICE AND CAMERA WITH DATA IMAGING DEVICE

FIELD OF THE ART

The present invention relates to an optical data recording device for recording data, such as date, optically in a photographed frame on a photo filmstrip, and a camera with the optical data recording device, wherein the camera includes a lens-fitted photo film unit that does not allow the user to load a filmstrip.

BACKGROUND ARTS

A camera comprising an optical data recording device for optically recording date data, like the date and time of photography, on a filmstrip has been known. It is desirable to introduce the optical data recording device into a lens-fitted photo film unit, hereinafter referred to as a film unit, wherein an unexposed photo filmstrip is previously loaded in a unit body that has simple photographic mechanisms incorporated therein. In one type of the optical data recording device, data is recorded from a front or emulsion side of the photo filmstrip. In another type of the optical data recording device, data is recorded from a rear or base side of the photo filmstrip. In either type, the date data is ordinary recorded in a position slightly displaced from a corner toward a center.

In the type where data is recorded from the rear side of the photo filmstrip, a display panel, e.g. an LCD panel, that displays data to record, e.g. the date of photography, as transparent characters is placed in proximity to the rear side of the photo filmstrip. The display panel is illuminated from the rear side in synchronism with activation of a shutter, so light travelling through the display panel is directly used for recording data in the photographed frame. Another kind of this type uses a display panel that is constituted of light emitting diodes or the like, to record data in the photographed frame by projecting light directly from the light emitting diodes. This type does not need any optical system for forming an image of the displayed content on the display panel onto the photo filmstrip.

However, because the optical data recording device of this type comprises the display panel and the lamp for illuminating the display panel, and must be provided on a rear lid of the camera or on a rear cover of the film unit, it has a disadvantage of making the camera or the film unit thicker. Beside that, for synchronizing the data recording with the photographing, it is necessary to interconnect the optical data recording device with those circuits and mechanisms which are located on the front side of the photo filmstrip, though the optical data recording device is located on the rear side of the photo filmstrip. So the number of parts is increased, and wiring between these parts needs complicated manufacturing processes or increased number of processes, thereby increasing the cost of manufacture.

On the other hand, in the type where data is recorded from the front side of the photo filmstrip, an projection lens is placed between the display panel and the emulsion surface of the photo filmstrip, to project an image of data displayed on the display panel onto the photo filmstrip. Because the projection lens is used, and also a sufficient space is provided between the display panel and the photo filmstrip by virtue of the thickness of the camera body, it is possible to record a sharp image of the data.

As an optical data recording device of the type where data is photographed from the front side of the photo filmstrip, there is one that suggested by the present applicant (Japanese Patent Application No. 9-141249). This data recording device is provided with a shutter aperture for data that is located near a shutter aperture for photography, through which subject light is conducted to the photo filmstrip, and a display panel and an projection lens are placed before and behind the shutter aperture for data. The shutter aperture for data is opened and closed by a data shutter member that is formed integrally with a shutter blade for the shutter aperture for photography. According to this configuration, it is possible to record data as displayed on the display panel optically onto the photo filmstrip by projecting light traveling through the display panel through the projection lens onto the filmstrip, while the shutter aperture for data is opened in synchronism with the photography.

Among presently marketed cameras, there are ones that permit designating a print size at the photography so that photo prints of different aspect ratios may be obtained from frames photographed on the same photo filmstrip. One method of designating the print size is actually changing the exposure area on the photo filmstrip by switching a print size switching member. Another method of designating the print size is optically recording a corresponding mark to the designated print size onto the filmstrip outside the exposure area of a constant size, wherein the photographed frame is trimmed for printing. To record date data optically at a proper position for the designated print size, it is necessary to change the position to project the date data in cooperation with the change in print size. In the conventional data recording device, data display position on the display panel is shifted relative to the projection lens, or a switching mirror is provided between the projection lens and the photo filmstrip to adjust the projecting position by changing the angle of the switching mirror. However, these switching mechanisms for the optical data recording device are so complicated and requires so much mounting space and accuracy that it has been hard to turn them to practical use.

In the Advanced Photo System (APS) that has recently been put into practice and marketed, the photo filmstrip and the camera permit producing photo prints of different aspect ratios from that of a standard size frame, though all frames are photographed in the standard size, by recording magnetic data for each individual frame to designate an aspect ratio of photo prints on a transparent magnetic recording layer that is formed on the base side of the filmstrip. In the APS, a standard exposure area or standard size frame on the photo filmstrip has the same aspect ratio as a hi-vision (H) size photo print (89×158 mm), so a conventional (C) size photo print (89×127 mm) is produced from a photograph area that is obtained by restricting the standard size frame from left and right, i.e. in a lengthwise direction of the frame, whereas a panoramic (P) size photo print (89×254 mm) is produced from a photograph area that is obtained by restricting the standard size frame from top and bottom, i.e. in a widthwise direction of the frame. It is to be noted that the lengthwise direction of the frame is identical to the lengthwise direction of the filmstrip.

The camera of the APS may also records data such as the date of photography magnetically on the magnetic recording layer of the photo filmstrip, so the data may be read out on the printing to print the data at a designated position on a photo print. For the magnetic recording, however, a magnetic head and a circuit for driving and controlling the magnetic head are needed. These elements are so expensive that it is practically impossible to introduce the magnetic recording function to low-price cameras or the film units.

In the APS, insofar as the exposure area through the taking lens is fixed to be the standard frame size, it is possible to select any one of the print sizes: H, P and C sizes, after the photography, for example at the time of ordering photo prints, even though the pictures are photographed through such a camera or a film unit that does not permit switching the print size at the photography, e.g. those specific to the C size. For the sake of printing the data, such as the date of photography, within the photo print even when the C size print is designated, it is necessary to optically record the data within the corresponding area to the C size, called C size frame area, of the standard frame.

As described above, the left and right margins of the C size frame area is located closer to an optical axis of the taking lens, in comparison with the left and right margins of the standard frame or H size frame area. Therefore, in order to record the data within the C size frame area by use of the optical data recording device where the data is recorded by the light projected from the front side of the photo filmstrip through the projection lens and the data shutter aperture, it is necessary to put the projection lens closer to the center of the frame, because the center of the recorded data is put on the optical axis of the projection lens. In that case, since the taking lens is designed to expose the H size frame area, the projection lens, a lens holder for the projection lens or other member would shade a marginal portion of the H size frame area from the light from the taking lens.

If the data shutter aperture is placed closer to the shutter aperture for photography so as not block the subject light path, it would arise a problem that the data shutter member on the way to opening and closing the data shutter aperture would move in front of the shutter aperture for photography, so the photographed subject image would have unevenly exposed portions.

Meanwhile, since the low-price cameras and the film units use a simple and cheap taking lens, some of those hold the photo filmstrip behind the taking lens such that the filmstrip is curved with its concave oriented to the taking lens in correspondence with the curvature of field of the taking lens, in order to correct the curvature of field for photographing a subject image.

If the above method of recording data from the front of the photo filmstrip is introduced into the camera or the film unit that compensates for the image distortion by curving the photo filmstrip, an image of the display panel, i.e. optically recorded data, would be partly blurred unless an image surface of the display panel that is formed through the projection lens is aligned with the curved surface of the photo filmstrip.

DISCLOSURE OF THE INVENTION

In view of the foregoing, an object of the present invention is to provide an optical data recording device that records data, such as date, inside a photographed frame, by projecting light from the front of the photo film, and makes it possible to locate the data recording position closer to the optical axis of the taking lens without blocking the light path from the taking lens.

Another object of the present invention is to provide an optical data recording device that is simple in construction and can change the data recording position on the filmstrip.

The present invention further has an object to provide a camera with an optical data recording device that is simple in construction, cooperates with a print size switching operation and changes the data recording position on the filmstrip in accordance with the selected print size, wherein the camera includes not only those allowing the user to load the film, but also the film unit.

To achieve the above objects, in an optical data recording device for recording data, as displayed on a display panel, optically in a photographic frame on a photo filmstrip through a projection lens, wherein the photographic frame has an image of a subject photographed therein through a taking lens, the present invention is in that the display panel and the projection lens are located on the side of the taking lens relative to the photo filmstrip, and that a center of the display panel is displaced from an optical axis of the projection lens in a direction away from an optical axis of the taking lens, such that the data on the display panel is projected onto the photo filmstrip to be recorded at a position that is shifted from the projection lens optical axis toward the taking lens optical axis.

According to the optical data recording device of the present invention, the data is optically recorded at a closer position to the taking lens optical axis without the need for placing the projection lens closer to the taking lens optical axis, even where the data is projected from the front of the photo filmstrip. Therefore, if the H size photo print or the C size photo print is selected, it is possible to record the photographic date in the photo print, while preventing the subject light for recording the subject image from being blocked by the projection lens or other elements.

According to a preferred embodiment of the present invention, a stop is provided between the display panel and the projection lens, such that the following condition is satisfied:

$$1 > d/f \geq 0.3 |R1| > |R2| \times 3$$

wherein f represents the focal length of the projection lens, d represents a distance from the stop to an image side surface of the projection lens, R1 represents a radius of curvature of a surface of the projection lens on the side of the display panel, and R2 represents a radius of curvature of the image side surface of the projection lens.

Adjusting a relationship between the focal length of the projection lens and the distance from the stop to the image side surface of the projection, and a relationship between the respective radiuses of curvature of the opposite surfaces of the projection lens in the above ranges makes it possible to form the image of the display panel, i.e. the data, adequately on the photo filmstrip.

Furthermore, it is possible to improve compactness while keeping good quality of the image of the display panel formed through the projection lens, by defining an angle θ of a line that extends from a farther edge of the display panel from the projection lens optical axis to a center of the stop, relative to the projection lens optical axis, to satisfy the following condition:

$$0 < \theta < 0.55$$

wherein the angle θ is given by an equation $\theta = TAN^{-1}\{(Q+L/2)/S\}$, assuming that S represents a distance from the display panel to the stop, L represents a longer side length of the display panel, and Q represents an amount of displacement of the center of the display panel from the optical axis of the projection lens.

Assuming that F1 represents the f-number of the taking lens, and F2 represents the f-number of the image forming lens, the f-numbers preferably satisfy the following condition:

$$\log_2(F2) \leq \log_2(F1).$$

In this way, the exposure level through the projection lens is set higher in comparison with exposure conditions of the taking lens. This makes it possible to record the data or the image of the display panel on the photo filmstrip at a sufficient exposure amount even with the ambient light.

Where the data is to be recorded on the photo filmstrip that is held in a curved posture, the display panel is incline to a perpendicular plane to the projection lens optical axis, such that the image surface of the display panel is formed on the photo filmstrip in parallel with its curve. Therefore, the data is recorded entirely good focusing condition on the photo filmstrip.

Where the data is to be recorded on the photo filmstrip that is held in a curved posture, it is possible to incline the projection lens optical axis to the taking lens optical axis for forming the image surface of the display panel on the photo filmstrip in parallel with its curve. Then, it becomes possible to set the display panel substantially parallel to the perpendicular plane to the taking lens optical axis. For instance, since the display panel may be set parallel to an external covering surface of a camera that is approximately parallel to this perpendicular surface, this configuration contributes to reducing useless space.

By holding the projection lens to be able to rotate about a rotary center that is displaced from its optical axis, data recording position may be relocated with economical and simple constitutions. By causing the projection lens for the data recording to rotate in cooperation with the print size switching operation mechanism, the data may be recorded at the position suitable for the selected print size. Moreover, where the photo filmstrip is held curved in the exposure position, the light path length adjusting plate for adjusting the light path length is inserted into between the display panel and the projection lens in cooperation with the projection lens being rotated, so the data may be recorded in proper focus.

BRIEF DESCRIPTION OF THE DRAWING

FIGS. 10, 13, 16, 19, 22, 25 and 28 are diagrams illustrating coma aberration of the projection lenses of the first to seventh examples;

FIG. 36 is a sectional view of essential parts of the film unit of FIG. 32, illustrating a position of the optical data recording device where the date data is recorded at a date recording position for the H or P size;

PREFERRED EMBODIMENTS OF THE INVENTION

Figure 1:
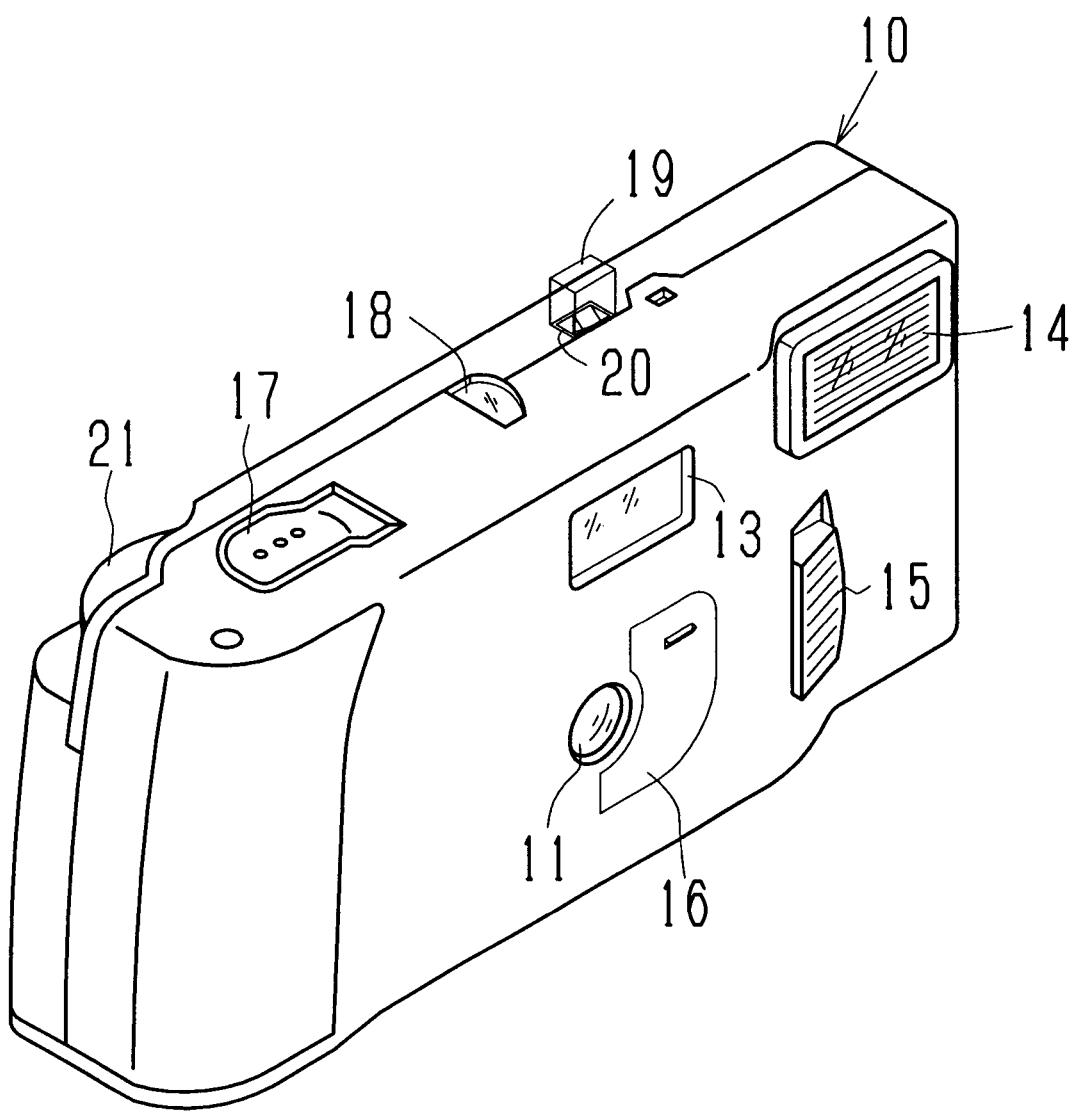
FIG. 1 is a perspective view illustrating an appearance of a unit body of a film unit having an optical data recording device integrated therein, according to a first embodiment of the present invention.

A film unit shown in FIG. 1 is not provided with a print size designating device, but photographs every picture in the entire area of the standard frame that has the same aspect ratio as an H size photo print. Instead, it is possible to produce H size photo prints as well as C size photo prints by ordering appropriate frames to be printed in the H size.

Figure 2:
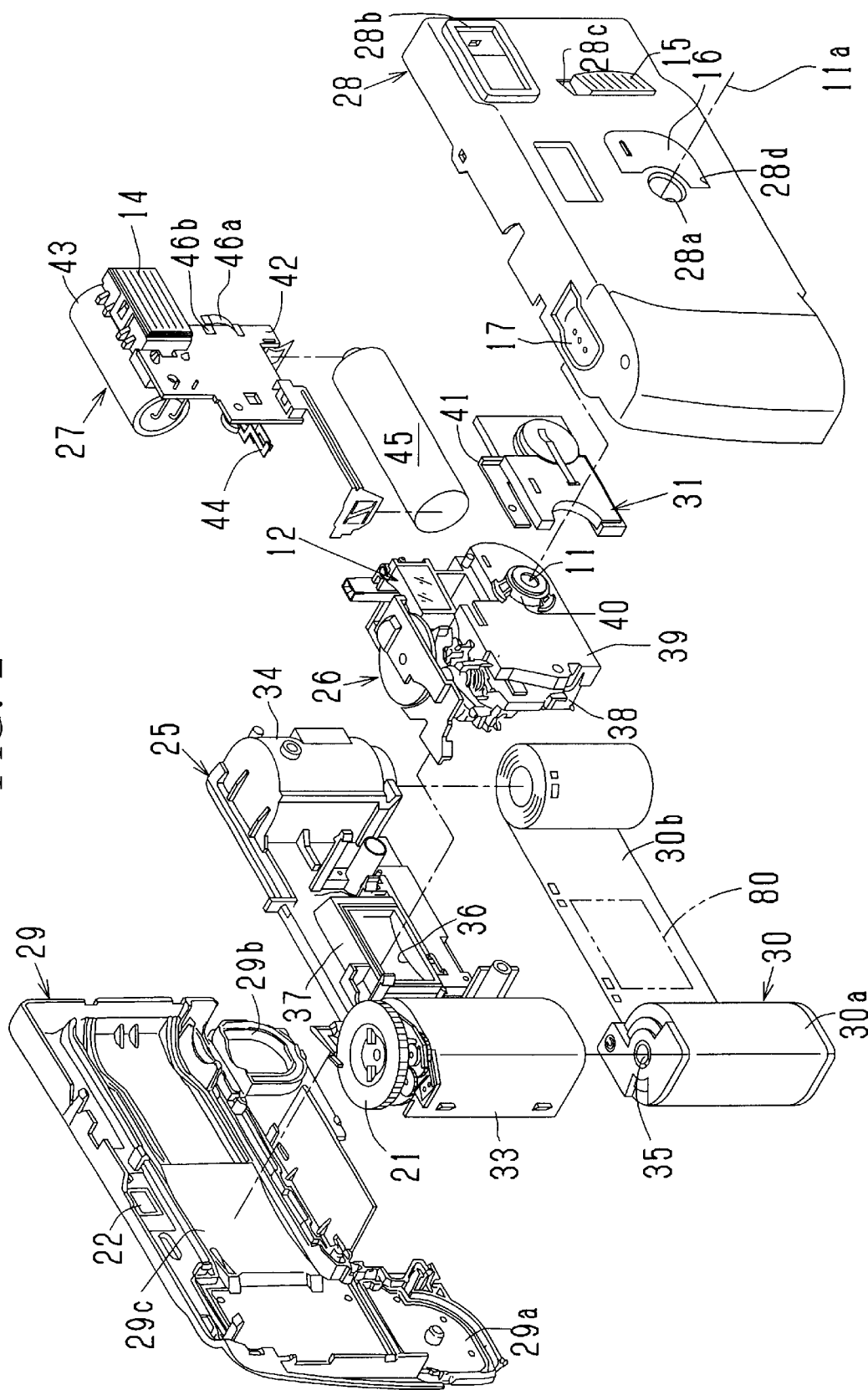
FIG. 2 is an exploded perspective view illustrating the configuration of the unit body of FIG. 1.

On a front side of an unit body 10 are provided a taking lens 11, a finder objective window 13, a flash projector 14, a charge operation knob 15 for turning ON and OFF charging for the flash, and a light converging panel 16. On a top side of the unit body 10 are provided a shutter button 17, a counter window for indicating the number of frames available for exposure, and an opening 20 allowing a light guide 19 to protrude through it, for indicating completion of flash charging. From a back side of the unit body 10 is protruded a winding wheel 21 that is manually rotated after each exposure. Also a finder eyepiece window 22 is provided on the back side in opposition to the objective window 13, as shown in FIG. 2.

The unit body 10 is constituted of a body basic portion 25, an exposure unit 26, a flash unit 27, a front cover 28, a rear cover 29, an IX240 type photo film cartridge of the Advanced Photo System, and a date module 31 that is a member of an optical data recording device.

The body basic portion 25 is integrally formed with a cartridge chamber 33 for holding a cartridge shell 30a of the photo film cartridge 30 and a film roll chamber 34 for holding a roll of unexposed photo filmstrip 30b that is pulled out from the cartridge shell 30a. The winding wheel 21 is pivotally disposed atop the cartridge chamber 33. The winding wheel 21 has a shaft formed integrally on a bottom side thereof, and the shaft is engaged in an end of a spool 35 of the cartridge shell 30a as it is held in the cartridge chamber 33. Thus, the photo filmstrip 30b after exposure is wound up into the cartridge shell 30a by rotating the winding wheel 21 in a counterclockwise direction in the drawings.

Between the cartridge chamber 33 and the film roll chamber 34 is formed an aperture 36 defining an exposure range on the photo filmstrip 30b that is exposed to a subject light from the taking lens 11. The aperture 36 is surrounded by a light-shielding barrel 37 that protrudes forward. The aperture 36 defines the exposure range to be a standard frame size (16.7×30.2 mm) that is equal in aspect ratio to the H size photo prints.

The exposure unit 26 is constituted of a shutter mechanism, a film winding lock mechanism, a finder optical system 12 and other mechanisms, which are integrated in a base portion 38 that doubles as a light-shielding box. A shutter cover 39 is mounted on a front side of the base portion 38, and the taking lens 11 is held by a lens holder 40 that is mounted on a front side of the shutter cover 39. The exposure unit 26 is attached to the body basic portion 25 by mounting the base portion 38 on the light-shielding barrel 37. Thereby, the base portion 38 and the light-shielding barrel 37 shield a space between the taking lens 11 and the aperture 36 from light. Also the date module 31 is mounted to the exposure unit 26 through a module holding plate 41.

The flash unit 27 is constituted of a flash circuit board 42, the flash projector 14 mounted to the flash circuit board 42, a main capacitor 43, a synchronized trigger switch 44, a battery 45 and so forth. When the charge operation knob 15 is slid upward, a projection formed on a back side of the charge operation knob 15 resiliently bends a metal blade 46a into contact with a contact member 46b, thereby turning on a charge switch to start charging the main capacitor 43.

The front cover 28 is formed with openings 28a to 28c for exposing the taking lens 11, the flash projector 14 and the charge operation knob 15, besides the shutter button 17 and the finder objective window 13. The light converging panel 16 is fitted in an opening 28d that is formed beside the opening 28a for the taking lens 11. The front cover 28 is mounted to the front side of the body basic portion 25 after it is attached with the exposure unit 26, the flash unit 27 and the date module 31.

The rear cover 29 covers the rear side of the body basic portion 25 after the cartridge shell 30a and the photo filmstrip 30b are loaded in the cartridge chamber 33 and the film roll chamber 34. Bottom lids 29a and 29b are formed on a bottom side of the rear cover 29, to close bottoms of the cartridge chamber 33 and the film roll chamber 34 in a light-tight fashion.

The rear cover 29 has a film supporting surface 29c in a portion facing the aperture 36. The film supporting surface 29c curves along an advancing direction of the photo filmstrip 30b, to be recessed rearward around an optical axis 11a of the taking lens11. Guide rails formed along top and bottom margins of the aperture 36 are curved to protrude rearward complementary to the film supporting surface 29c. According to this configuration, a portion of the photo filmstrip 30b placed behind the aperture 36 is held to be curved along the advancing direction with its concave surface oriented toward the taking lens 11, thereby to cancel an image distortion through the taking lens 11.

Figure 3:
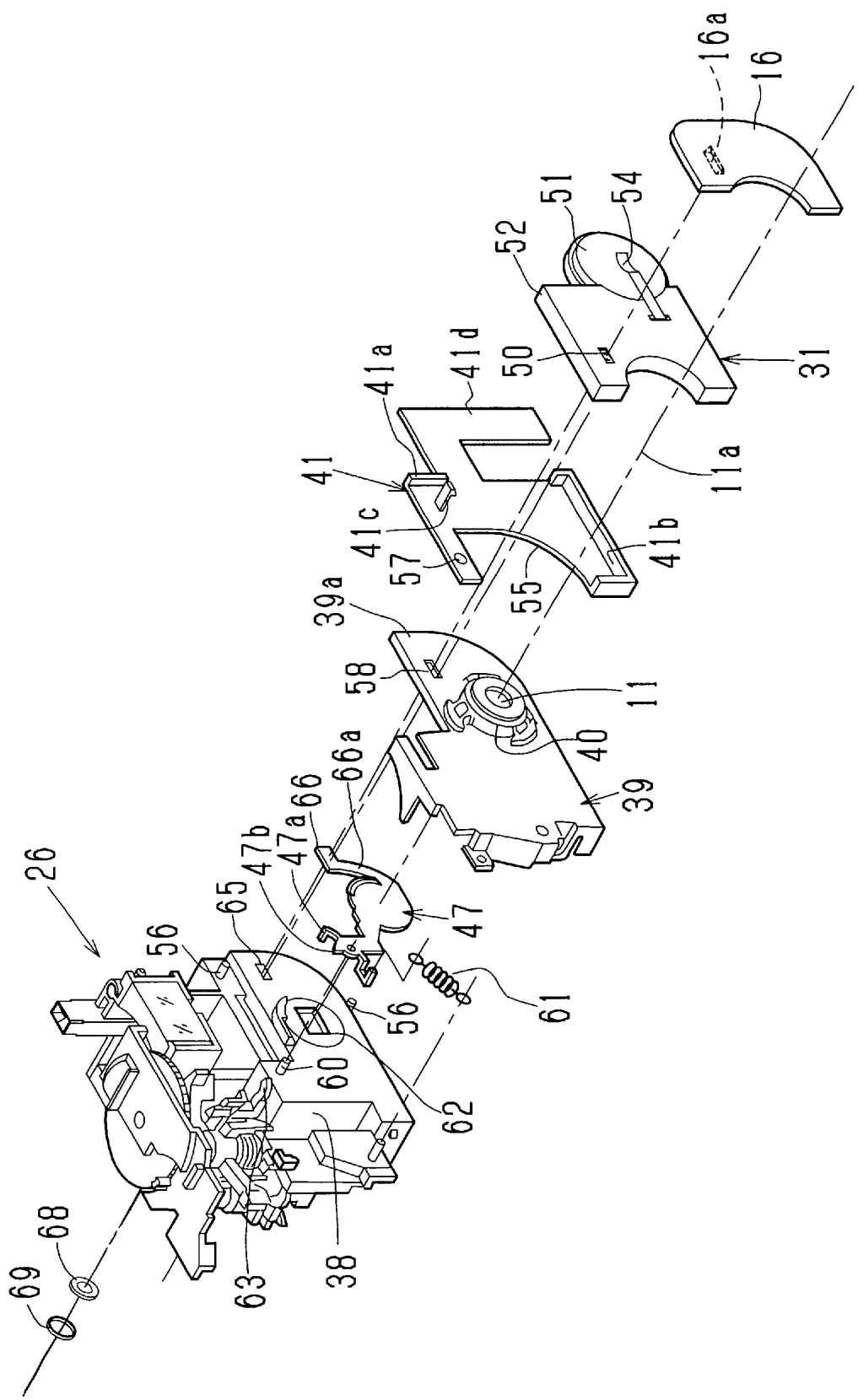
FIG. 3 is an exploded perspective view of an exposure unit including the optical data recording device.

As shown in FIG. 3, the date module 31 is constituted of electronic elements mounted on a module substrate, including a crystal oscillator, a clock circuit, an LCD driver, a preset switch, and an LCD panel 50, a module battery 51, and a module case 52. The module substrate is mounted in the module case 52. The module battery 51 is held between a pair of contact strips 54 that are placed on front and back sides of the module case 52, and supplies power to the respective circuits in the module case 52 through these contact strips 54.

The clock circuit memorizes calendar data for several years, generates a clock signal of a constant cycle by use of the crystal oscillator, and counts time and date on the basis of this clock signal, to produce date data representative of a present date. The date data of the clock circuit is set to an initial value by use of the preset switch during the manufacture. The LCD driver drives the LCD panel 50 on the basis of the date data, so the LCD panel 50 displays data to photograph on the photo filmstrip 30b, i.e. the present date ("year, month, day"). The module battery 51 is a button cell, but it can drive the circuits of the module for years because the circuits are designed to consume so little.

The LCD panel 50 is exposed through holes formed on the front and back sides of the module case 52. The LCD panel 50 faces through the front side hole to an illuminating section 16a of the light converging panel 16 that is integrated into the front cover 28, so the LCD panel 50 is illuminated by the illuminating section 16a. The LCD panel 50 is of a light permeable type that displays transparent characters indicating a date, e.g. "98, 11, 03", or the like in an opaque background. Therefore, light projected from the illuminating section 16a and passing through the LCD panel 50 is projected from the back side hole of the module case 52, for use as a date light for recording the date data.

The date module 31 is mounted to the module holding plate 41. The module holding plate 41 has ridges 41a and 41b and a fastening hook 41c formed on its front. The date module 31 is positioned on the module holding plate 41 by the ridges 41a and 41b, and is secured by the fastening hook 41c. A supporting portion 41d of the module holding plate 41 is for supporting a rear end of the charge operation knob 15.

The module holding plate 41 is also formed with a cutout 55 whose shape is complementary to a right side portion 39a of the shutter cover 39. By fitting the cutout 55 onto the right side portion 39a and inserting a positioning pin 56 on the exposure unit 26 into a hole 57 that is formed through the module holding plate 41, the module holding plate 41 is positioned on the exposure unit 26 in alignment with the shutter cover 39. Thereafter, the module holding plate 41 is secured to the exposure unit 26 through not-shown hooks or the like.

Where the module holding plate 41 is mounted to the exposure unit 26 in the way as above, the LCD panel 50 of the date module 31 is opposed through the cutout 55 to an opening 58 that is formed through the right side portion 39a of the shutter cover 39. The module case 52 is cut out at its left side into a shape that is complementary to a contour of the lens holder 40 for the taking lens 11, so that the module case 52 does not protrude forward from the lens holder 40 when it is mounted to the exposure unit 26.

Figure 4:
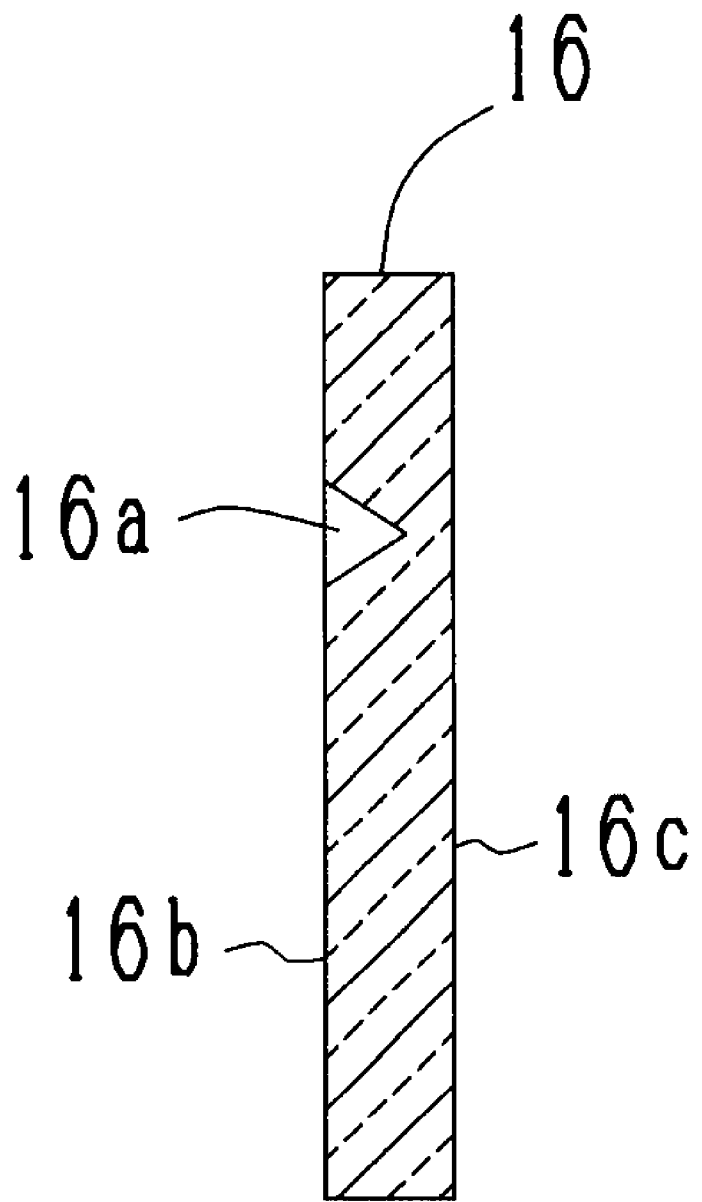
FIG. 4 is a sectional view illustrating a contour of a light converging panel.

As shown in FIG. 4, the light converging panel 16 is formed from a transparent plastic resin, and has the illuminating section 16a on its back side 16b. The illuminating section 16a is shaped into a groove with a V-shaped section. Ambient light falling on an obverse surface 16c of the light converging panel 16 that is exposed on the front of the unit body 10, comes to the illuminating section 16a after being repeatedly reflected inside the light converging panel 16. Then, the light is projected from the illuminating section 16a to the rear side. In this way, the ambient light falling on the wide obverse surface 16c of the light converging panel 16 is converged and projected from the illuminating section 16a, so the LCD panel 50 opposed to the illuminating section 16a is illuminated with a greater brightness. It is to be noted that the shape of the illuminating section 16a is not limited to this embodiment.

The light converging plate 16 is placed almost parallel to a perpendicular plane to the optical axis 11a that travels through the center of the taking lens 11. The date module 31 is placed almost parallel to the front side of the light converging panel 16 and the front cover 28.

As shown in FIG. 3, a shutter blade 47 is placed between the front of the base portion 38 and the shutter cover 39, so as to be pivotal about an axle 60. The shutter blade 47 is urged by a spring 61 to a position closing a photographic shutter opening 62. The photographic shutter opening 62 is located at a front center of the base portion 38, i.e. on the photographic optical axis 11a. The shutter blade 47 is kicked at its top end 47b by a kicking lever 63 that moves to the right in the drawings in cooperation with a shutter release operation. Then, the shutter blade 47 rotates about the axle 60 in a clockwise direction and, thereafter, rotates in the counterclockwise direction because of the spring 61. With this reciprocating swing of the shutter blade 47, the photographic shutter opening 62 is opened and closed. The subject light that passes through the taking lens 11 goes into the base portion 38 through the photographic shutter opening 62 while the photographic shutter opening 62 is opened, and thus exposes the photo filmstrip 30b placed behind the aperture 36. When the shutter blade 47 fully opens the photographic shutter opening 62, a pressing tip 47a turns on the synchronized trigger switch 44 of the flash unit 27. Upon the synchronized trigger switch 44 being turned on, he flash projector 14 projects a flash light.

A data shutter opening 65 is formed through the base portion 38 on an upper right side of the photographic shutter opening 62 in face with the opening 58 of the shutter cover 39. On the other hand, an arm 66a protrudes to an upper right direction from the shutter blade 47, and a data shutter member 66 is formed integrally on an end of the arm 66a. The data shutter member 66 opens and closes the data shutter opening 65 in cooperation with the swing of the shutter blade 47.

An projection lens 68 is located behind the data shutter opening 65 inside the base portion 38, through which the date data displayed on the LCD panel 50 is projected and focused on the photo filmstrip 30b. The projection lens 68 is secured to the base portion 38 through a securing ring 69.

Figure 5:
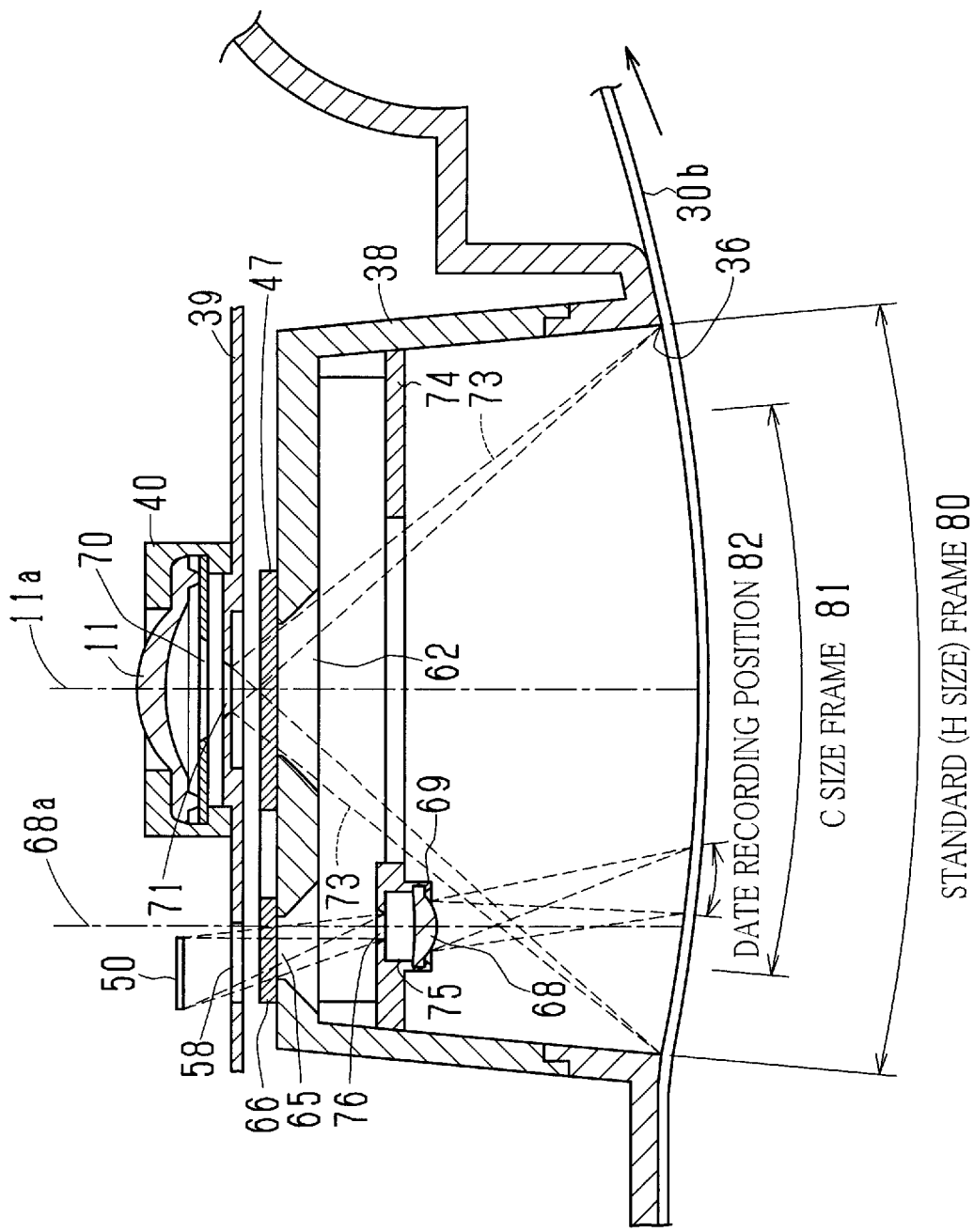
FIG. 5 is a horizontal sectional view of the exposure unit of FIG. 3.

FIG. 5 schematically shows a section of the exposure unit 26 taken along the film advancing direction as indicated by an arrow, i.e. the lengthwise direction of the photographic frame. The taking lens 11 is held by the lens holder 40 at a predetermined position on the shutter cover 39, while a flare stop 70 for preventing flares is disposed on the side of the photo filmstrip 30b. An aperture stop 71 is formed through the shutter cover 39 at a position on the optical axis 11a, so the shutter blade 47 opens and closes the photographic shutter opening 62 behind the aperture stop 71.

The subject light passing through the taking lens 11 goes into the aperture stop 71 through the flare stop 70, so the amount of light is restricted through the aperture stop 71. The subject light from the aperture stop 71 goes into the base portion 38 through the photographic shutter opening 62 while the shutter blade 47 opens it. Then, the entire area of the standard frame on the photo filmstrip 30b as bounded by the aperture 36 is exposed to the subject light. At that time, those portion of the subject light which are directed from the aperture stop 71 to peripheral portions of the standard frame in its lengthwise direction, i.e. the left and right portions in the drawing, travel along optical paths as indicated by 73 in the drawings.

In this example, the projection lens 68 is fitted in a lens holder 75 that is formed integrally with a flare preventing frame 74, and is secured by the securing ring 69. The flare preventing frame has a rectangular opening and is mounted to an inner wall of the base portion 38. The projection lens 68 is arranged such that its optical axis 68a travels through a position that is slightly shifted toward the photographic optical axis 11a from a center of the data shutter opening 65. The projection lens 68, the lens holder 75 therefor, and the securing ring 69 are arranged so as not to interfere with the optical paths 73. An aperture stop 76 is formed integrally with the lens holder 75 in front of the projection lens 68. In this way, the light converging panel 16, the date module 31, the data shutter opening 65, the aperture stop 76 and the projection lens 68 constitute the optical data recording device.

The date light that passes through the LCD panel 50 goes into the base portion 38 through the opening 58 and the data shutter opening 65 while the data shutter member 66 opens the data shutter opening 65. Thereafter, the date light falls on the projection lens 68 through the aperture stop 76, and is projected onto the photo filmstrip 30b through the projection lens 68. The center of the LCD panel 50 is shifted from the optical axis 68a of the projection lens 68 to remove away from the photographic optical axis 11a in the lengthwise direction of the photographic frame. Accordingly, an image of the date data displayed on the LCD panel 50 is formed in a position on the photo filmstrip 30b that is shifted from the optical axis 68a of the projection lens 68 toward the photographic optical axis 11a in the lengthwise direction of the photographic frame. Although the LCD panel 50 is actually larger than the opening of the module case 52, a display area exposed through the opening is referred to as the LCD panel 50 in the above definition, so is the center of the display area referred to as the center of the LCD panel 50. In the following description, "margins of the LCD panel 50" imply margins of the display area exposed through the opening. The date data is displayed at a fixed position in the display area. That is, the display position is unchanged.

Figure 6:
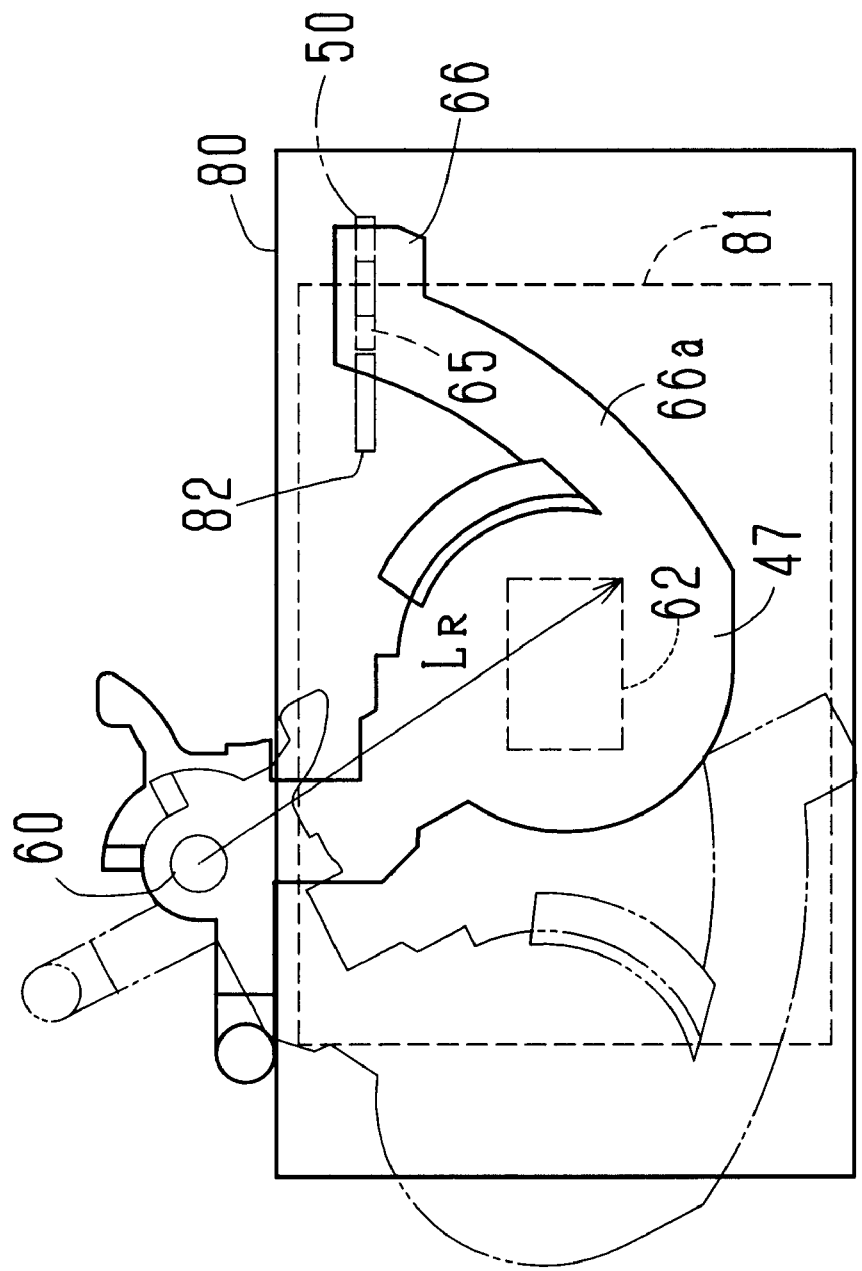
FIG. 6 is an explanatory diagram illustrating a positional relationship between a shutter aperture, a data shutter aperture and an LCD panel, as viewed from the front.

FIG. 6 schematically shows a relationship between the respective parts and the recording position of the date data, viewed from the side of the taking lens 11. In the drawings, designated by 80 and 81 are the standard frame and the C size frame area respectively. The center of the LCD panel 50 is shifted from the center of the data shutter opening 65 away from the photographic optical axis 11a, indeed the center of the data shutter opening 65 is also shifted from the optical axis 68a of the projection lens 68 to remove away from the photographic optical axis 11a in the lengthwise direction of the photographic frame. The shift amount of the center of the LCD panel 50 from the optical axis 68a of the projection lens 68 is determined such that the date data is recorded in the C size frame area whose longer side length is shorter than that of the standard frame on the left and right sides.

Arranging the LCD panel 50, the data shutter opening 65 and the projection lens 68 in this positional relationship allows to record the date data optically in the C size frame area while preventing the projection lens 68 as well as the lens holder 75 and the securing ring 69 for the projection lens 68 from blocking the subject light even in the peripheral zone of the standard frame. In this embodiment, the date data is recorded at a date recording position 82 that is closer to the photographic optical axis 11a than the data shutter opening 65 in the lengthwise direction of the photographic frame, and is located at an upper right position of the C size frame area. It is to be noted that the position and the size of the data shutter opening 65 and those of the opening 58 formed through the shutter cover 39 are adjusted such that the date light falls in the aperture stop without being eclipsed.

Shifting the data shutter opening 65 away from the photographic optical axis 11a in the lengthwise direction of the photographic frame in the way as described above also prevents the data shutter member 66 and the arm 66a from passing by the front of the photographic shutter opening 62 while they are moving between a position shown by solid lines and a position shown by phantom lines in cooperation with the shutter blade 47. More specifically, by adjusting the positions of the projection lens 68 and the LCD panel 50, the data shutter opening 65 is located outside a circle whose radius LR is identical to a distance from the center of the axle 60 to the farthest corner of the photographic shutter opening 62, so that the data shutter member 66 and the arm 66a will swing about the axle 60 with larger radiuses than the radius LR. In this way, the data shutter member 66 and the arm 66a would not pass by the front of the photographic shutter opening 62, solving the problem of uneven exposure condition of the photographed subject image.

Since the data shutter member 66 swings with the larger radius than the shutter blade 47, the data shutter member 66 opens the data shutter opening 65 for a longer time than the shutter blade 47 opens the photographic shutter opening 62. Therefore, though the LCD panel 50 is illuminated by ambient light collected through the light converging panel 16, a sufficient amount of date light for recording the date data sharply will reach the film surface.

Figure 7:
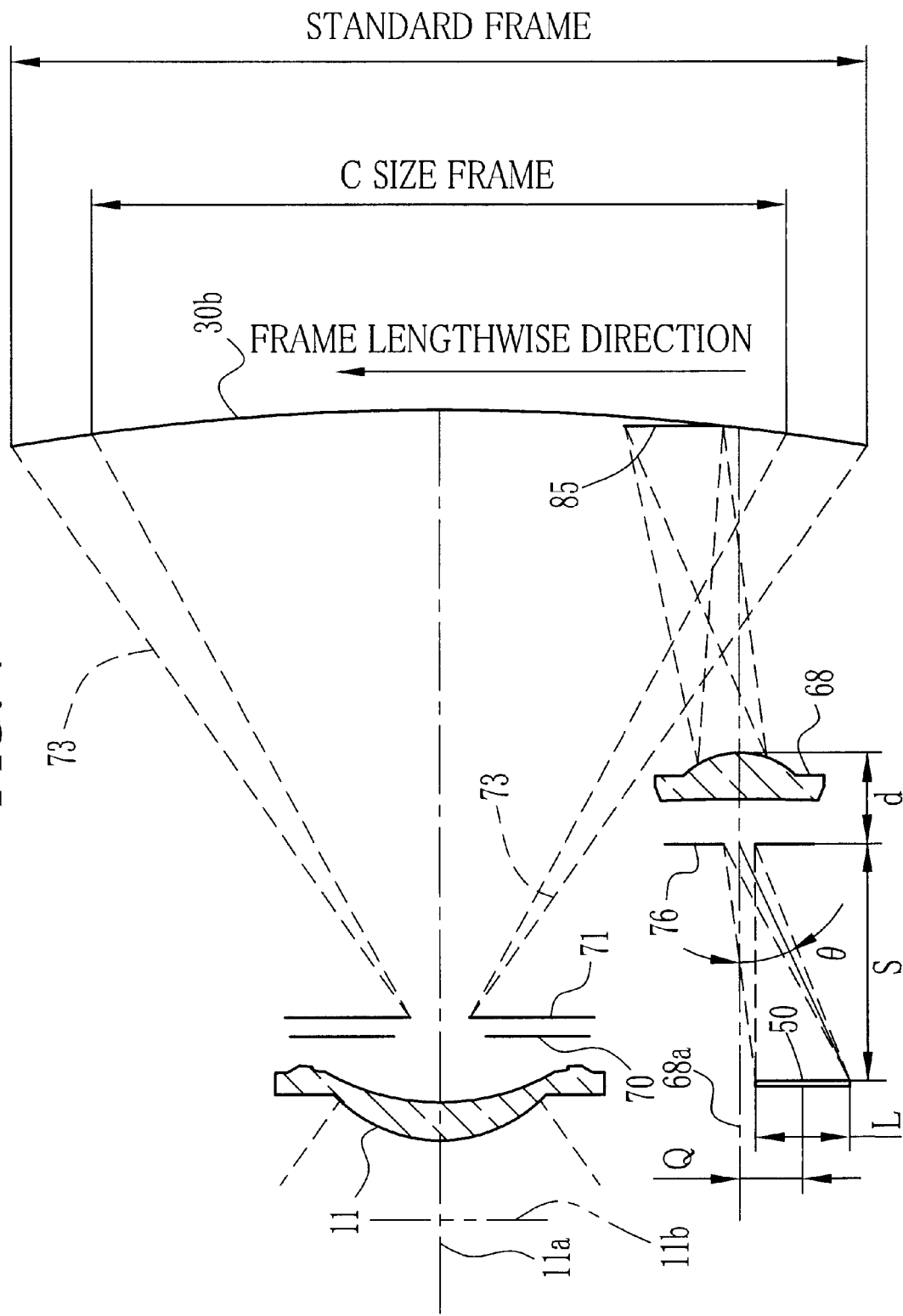
FIG. 7 is an explanatory diagram illustrating positions of a light path of an projection lens and the LCD panel relative to a light path of a taking lens.

FIG. 7 shows the layout of the optical data recording device of FIG. 5 in a simplified style. The layout shown in FIG. 7 is that viewed from the upside of the film unit. The reference number 85 shows an image surface of the LCD panel 50 through the projection lens 68. In this embodiment, the optical axis 68a of the projection lens 68 is arranged parallel to the photographic optical axis 11a, whereas the LCD panel 50 is arranged almost parallel to a perpendicular plane 11b to the photographic optical axis 11a. In the optical data recording device, as described above, the LCD panel 50, the aperture stop 76 and the projection lens 68 are arranged in this order from the objective side. Therefore, the principal point of the projection lens 68 is shifted to the image side from the center of the lens, resulting in increasing the distance from the projection lens 68 to the image surface. Thus, the image may be formed more sharply.

Assuming that the focal length of the projection lens 68 is "f", the distance from the aperture stop 76 to the image side surface of the projection lens 68 is "d", the radius of curvature of the projection lens 68 on the side of the LCD panel 50 is "R1", and that on the image side is "R2", the relationship between the distance d and the focal length f, and that between the radiuses of curvature R1 and R2 satisfy the following conditions (1) and (2):

$$1 > d/f \geq 0.3 \quad (1)$$

$$|R1| > |R2| \times 3 \quad (2)$$

The condition (1) is for balancing the external diameter of the projection lens 68 with the performance thereof by limiting the distance from the aperture stop 76 to the image side surface of the projection lens 68. For example, where the value "d/f" is above the upper limit of the condition (1), the external diameter of the projection lens 68 is so large that it is hard to avoid blocking the light from the photographic optical system, i.e. from the taking lens 11. On the other hand, where the value "d/f" is below the lower limit, aberrations become so large that the image quality lowers remarkably in the peripheral area under the conditions of the present invention, so that it comes to be impossible to form the image of the LCD panel 50 with uniformly good quality.

On the other hand, the condition (2) is for limiting the radiuses of curvatures R1 and R2 of the opposite surfaces of the projection lens 68, for the sake of providing the projection lens 68 with adequate performance within the range of the condition (1). If the condition (2) is not satisfied, the performance of the projection lens 68 in the vicinity of the optical axis is unbalanced with that outside the axis.

Furthermore, an angle θ of a line, which extends from a farther edge of the LCD panel 50 from the optical axis 68a of the projection lens 68 to a center of the aperture stop 76, to the optical axis 68a is determined to satisfy the following condition (3):

$$0 < \theta < 0.55 \quad (3)$$

The angle θ is given by an equation $\theta = \text{TAN}^{-1}\{(Q+L/2)/S\}$, wherein S represents the distance from the LCD panel 50 to the aperture stop 76, L represents the longer side length of the LCD panel 50, and Q represents the shift amount of the center of the LCD panel 50 from the optical axis 68a of the projection lens 68.

With the increase in the angle θ, i.e. the angle of the date light from the edge of the LCD panel 50 to the aperture stop 76 increases, an eclipse is more likely to occur at the aperture stop 76. Therefore, as the angle θ increases, variations in the amounts of light beams that are projected from the respective portions of the LCD panel 50 and pass through the aperture stop 76 get larger, and thus unevenness in the exposure of the image of the LCD panel 50 is more likely to occur. If the condition (3) is satisfied, unevenness in the exposure is reduced.

The smaller the angle θ, the effect of reducing the uneven exposure becomes the larger, but the distance from the LCD panel 50 to the image surface must be elongated. Then, the optical data recording device is difficult to made compact, so is the film unit having the optical data recording device. For this reason, the angle θ should be defined so as to balance the problem of uneven exposure with the compactness of the optical data recording device and thus the film unit. For example, the angle θ preferably satisfy the condition 0.35 < θ < 0.55.

Assuming that F1 represents the f-number of the taking lens 11, and F2 represents the f-number of the projection lens, the f-numbers satisfy the following condition (4):

$$\log_2(F2) \leq \log_2(F1) \quad (4)$$

The condition (4) defines a relationship between the exposure amount to the subject light through the taking lens 11, and the exposure amount to the date light through the projection lens 68. By setting the exposure level through the projection lens 68 equal to or higher than that through the taking lens 11, reduction of the light amount through the LCD panel 50 is compensated, so ambient light may be utilized for illuminating the LCD panel 50.

It is preferable to give the condition (4) as $\log_2(F2) < \log_2(F1) - 0.15$, to set the exposure level through the projection lens 68 higher than the exposure level through the taking lens 11. Although the f-numbers are defined in this way on the promise that the ambient light is used for illuminating the LCD panel 50, it is alternatively possible to use LEDs or the like as the light source at a higher cost. In that case, the f-number of the projection lens is not to be limited to the above condition, but a lens with a large f-number, i.e. a darker lens, is used as the projection lens. Since the darker lens has the larger depth of field, the LCD panel may be less inclined relative to the optical axis of the projection lens.

Now the operation of the above described configuration will be briefly described.

In response to the shutter button 17 being pressed, the kicking lever 63 of the shutter mechanism kicks the top tip 47b of the shutter blade 47. The kicked 47 rotates about the axle 60 against the force of the spring 61, in the clockwise direction in FIG. 6. After opening up the photographic shutter opening 62, the shutter blade 47 rotates in the counterclockwise direction according to the force of the spring 61, to return to the closed position. During this opening and closing operation, the photographic shutter opening 62 lets the subject light from the taking lens 11 and 71 into the base portion 38. The subject light then travels through the opening of the flare preventing frame 74 and falls on the photo filmstrip 30b that is placed behind the aperture 36. Because the projection lens 68, the securing ring 69 and the lens holder 75 are located outside the peripheral optical paths 73 of the subject light, the subject light is not interfered, so a latent image of the subject is formed in the entire area of the standard frame 80.

With the swing of the shutter blade 47, the data shutter member 66 as integrated with the shutter blade 47 swings about the axle 60 to open and close the data shutter opening 65. While the data shutter opening 65 is opened and closed by the data shutter member 66, the LCD panel 50 is illuminated by the illuminating section 16a of the light converging panel 16, so the date light provided through the LCD panel 50 is conducted into the base portion 38 through the opening 58 of the shutter cover 39 and the data shutter opening 65. Because the data shutter member 66 and the arm 66a do not move in front of the photographic shutter opening 62, the subject image is not unevenly exposed.

The date light entered in the base portion 38 falls on the projection lens 68 through the aperture stop 76 from a direction that is farther from the photographic optical axis 11a than the optical axis 68a of the projection lens 68 in the lengthwise direction of the photographic frame, so an image is formed at the date recording position 82 that is closer to the photographic optical axis 11a than the optical axis 68a of the projection lens 68 in the frame lengthwise direction. In this way, the date data displayed on the LCD panel 50 is recorded on the subject image at the date recording position 82 that is located at the upper right corner of the C size frame area 81.

For a flash photography, the charge operation knob 15 is slid upward prior to pressing the shutter button 17. Thereby, voltage from the battery 45 is boost up, and the main capacitor 43 starts being charged with the voltage. When the main capacitor 43 is fully charged, a lamp is turned on to indicate the completion of charging through the light guide 19, that is protruded through the opening 20 on the top side of the unit body as the charge operation knob 15 is slid upward. When the shutter button 17 is pressed after this indication is confirmed, the flash projector 14 projects a flash light toward a subject at the timing when the synchronized trigger switch 44 is turned on by the swing of the shutter blade 47. The flash light reflected from the subject also falls on the light converging panel 16, so the date light is produced from the flash light, and is projected onto the photo filmstrip 30b. Accordingly, the date data is recorded at the flash photography without fail even in the darkness.

By repeating the photography in this way, each subject image is photographed in the entire area of the standard frame 80, whereas the date data is recorded in the C size frame area 81.

After the last frame is photographed, the exposed photo filmstrip 30b is entirely wound up into the cartridge shell 30a by the film winding operation. The exposed film unit is forwarded to a photofinisher, to develop the exposed photo filmstrip 30b. The developed photo filmstrip 30b is set in a printer-processor, to produce photo prints. If the size of the photo prints is not designated, C size photo prints are produced from the C size frame area 81. Where the H size is designated, H size photo prints are produced from the standard frame 80. The produced photo prints and the photo filmstrip 30b developed and contained in the cartridge shell 30a are returned to the user. Since the date data is recorded inside the C size frame area 81, the finished photo prints have the date data recorded thereon either in the H size ones or in the C size ones.

Since the optical data recording device of the present embodiment satisfies the above conditions (1) to (3), the optically recorded date data suffers little exposure-unevenness and image deterioration. Because the data shutter opening 65 is opened earlier than the photographic shutter opening 62, and is closed later than the photographic shutter opening 62, the exposure time is elongated. In addition, since the optical data recording device satisfies the condition (4), the date data may be recorded at a sufficient exposure amount on the photo filmstrip 30b.

Next, first to seventh examples of the projection lens 68 for use in the above date recording device will be described by use of the same reference numbers as used in the above description. In either of the first to seventh examples, the focal length of the taking lens 11 is 24.8 mm, and the f-number (F1) thereof is "10", whereas the f-number (F2) of the projection lens 68 is "8.0". Since $\log_2$ (F1) is approximately equal to 3.32, and $\log_2$ (F2) is equal to 3, the condition (4) is satisfied.

In either of the first to fifth and seventh examples, the image side surface or the second surface of the projection lens 68 is an aspherical surface that satisfies the following condition, provided that the optical axis is regarded as the Z axis:

$$Z = ch^2/[1 + \sqrt{1-(1+K)c^2h^2}] + Ah^4 + Bh^6 + Ch^8 + Dh^{10}$$

In the formula, c and h represent an inverted number of the radius of curvature of the second surface (=1/R2) and a height of light beam from the optical axis respectively. Aspherical coefficients K, A, B, C and D of the respective examples are shown in Tables for the individual examples.

EXAMPLE 1

Figure 8:
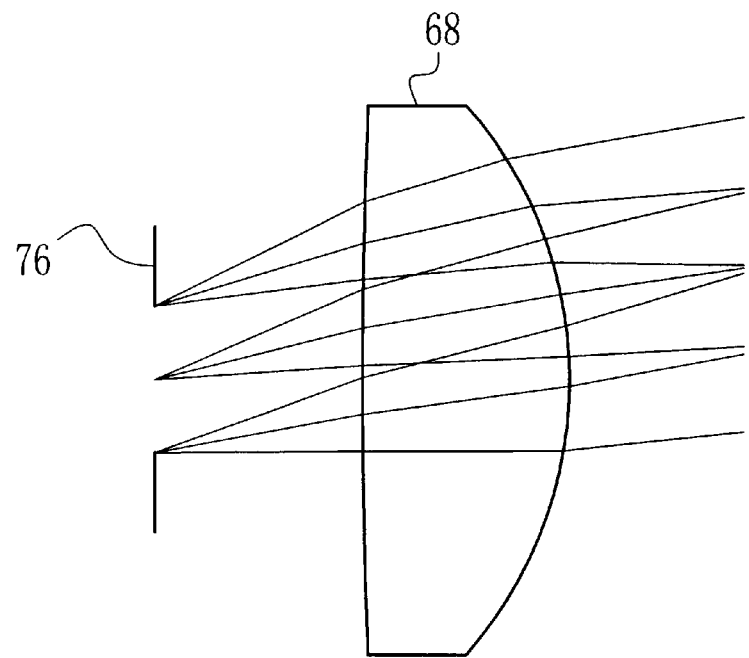
FIGS. 8, 11, 14, 17, 20, 23 and 26 are diagrams illustrating light paths of first to seventh examples of projection lenses for use in the optical data recording device of the first embodiment.

FIG. 8 shows a diagram illustrating the optical path of the projection lens 68 of the first example. The projection lens 68 of the first example is configured as follows:

f=5.13 (mm)
F2=8.0
d=2.90 (mm)
wherein f, F2 and d represent the focal length and the f-number of the projection lens, and the distance from the aperture stop 76 to the projection lens 68 respectively. The distance S from the LCD panel 50 to the aperture stop 76, the longer side length of the LCD panel 50, and the shift amount of the center of the LCD panel 50 from the optical axis of the projection lens 68 are designed as follows:
S=7.63 (mm)
L=3.00 (mm)
Q=2.00 (mm)

The lens data of the projection lens 68 is shown in Table 1.

Among the lens data shown in Tables in the first to seventh examples, numerical values given as distances represent air space between adjacent surfaces or the thickness of lenses, but the numerical value shown as a distance in the column of surface "2" represents a distance from the image side surface of the projection lens 68 to a paraxial focus point, whereas the numerical value shown as a distance in the column of the image surface represents a deviation of an optimum focusing position from the paraxial focus point. This is because the optimum focusing position deviates from the paraxial focus point if remaining aberrations of the projection lens are large, especially regarding spherical aberration. Where the deviation is "zero", the optimum focusing position coincides with the paraxial focus point, so the optical data recording device is arranged such that the photo filmstrip 30b is placed on the paraxial focus point. However, where the deviation is not "zero", the optical data recording device is arranged such that the photo filmstrip 30b is placed on the optimum focusing position. Where the deviation value is positive, the optimum focusing position deviates from the paraxial focus point in a direction to remove from the projection lens 68. Where the deviation value is negative, the optimum focusing position deviates from the paraxial focus point in a direction to close to the projection lens 68. The radius of curvature R, distance and effective aperture are expressed in terms of "mm".

TABLE 1

| SURFACE | RADIUS OF CURVATURE | DISTANCE | EFFECTIVE APERTURE | REFRACTIVE INDEX | DISPERSIVE POWER |
|---|---|---|---|---|---|
| DISPLAY PANEL | | 7.63 | | | |
| STOP | | 1.44 | φ1.0 | | |
| 1 | 63.200 | 1.46 | | 1.492 | 57.5 |
| 2(*) | −2.608 | 10.47 | | | |
| IMAGE SURFACE | | 0 | | | |

In Table 1, (*) indicates that the surface is aspherical, and the aspherical coefficients K, A, B, C and D are shown in Table 2.

TABLE 2

| K | 0 |
|---|---|
| A | 0.124744E-01 |
| B | −0.729504E-02 |
| C | 0.357048E-02 |
| D | −0.576013E-03 |

The characteristic values "d/f" and "θ" of the present invention are:

d/f÷0.57

θ÷0.430

Therefore, the conditions (1) and (3) are satisfied respectively.

The relationship between R1 and R2 is as follows:

|R1|=63.200

|R2|×3=7.824

So the condition (2) is satisfied.

Figure 9:
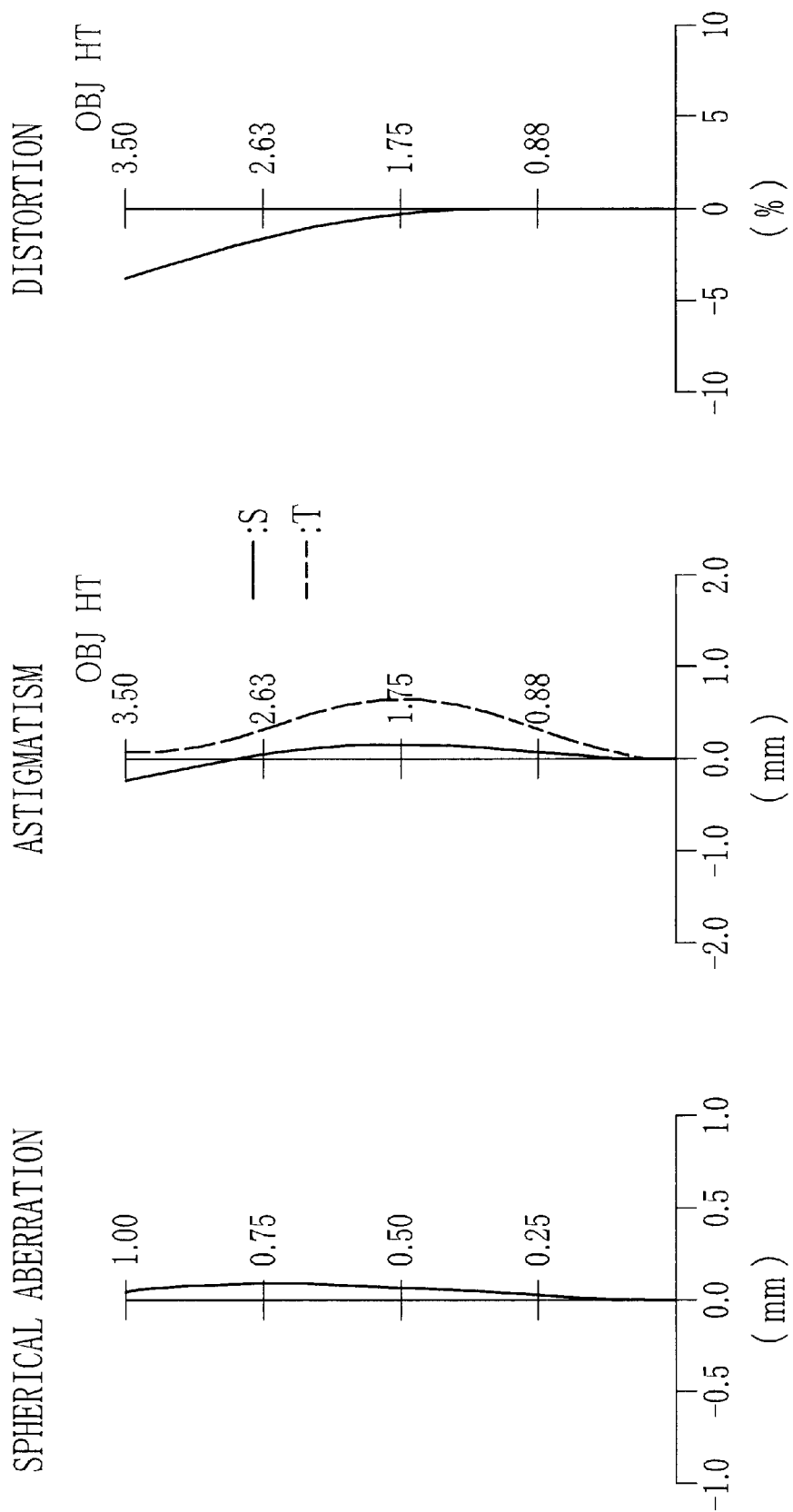
FIGS. 9, 12, 15, 18, 21, 24 and 27 are diagrams illustrating various aberrations of the projection lenses of the first to seventh examples, including spherical aberration, astigmatism and distortion.
Figure 27:
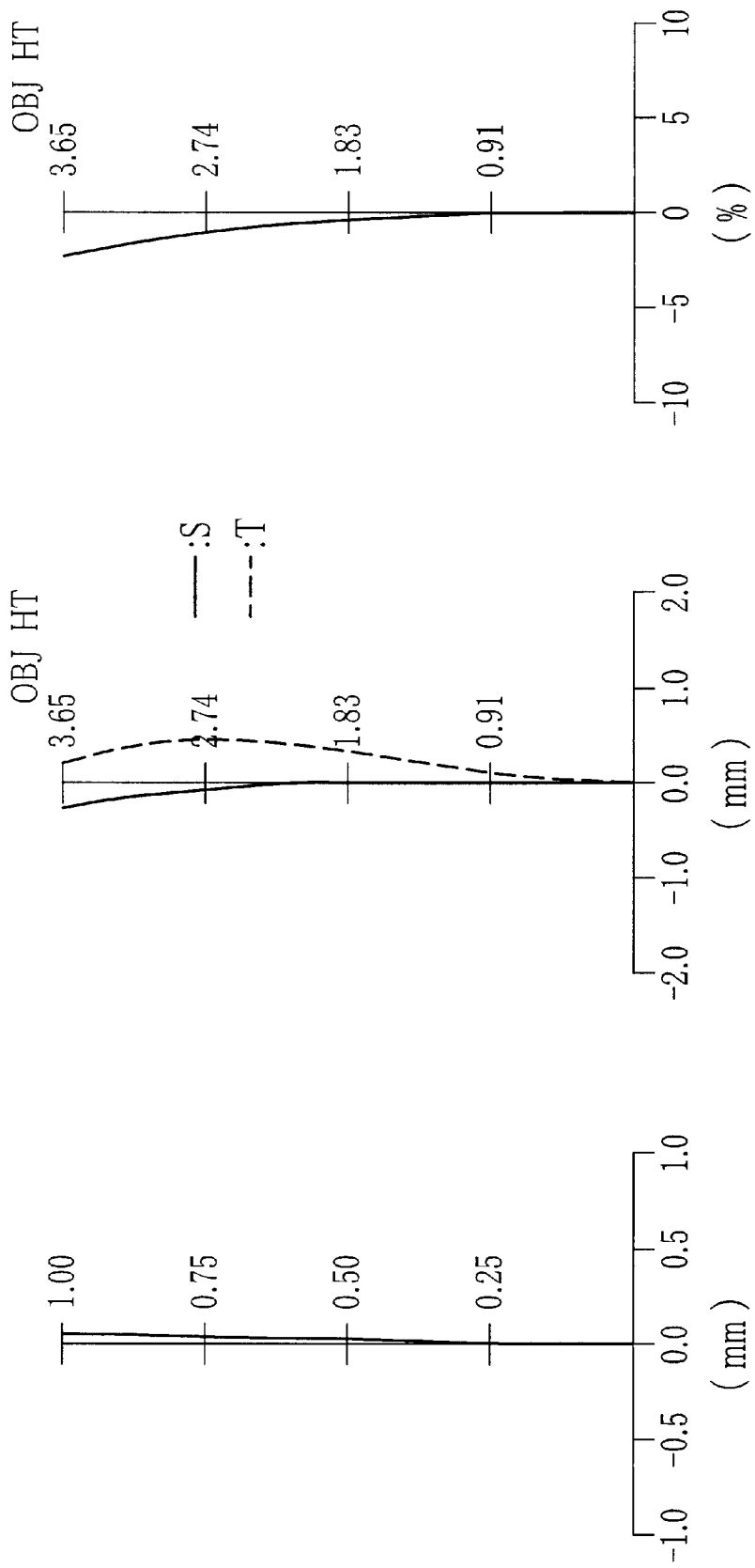
Figure 28:
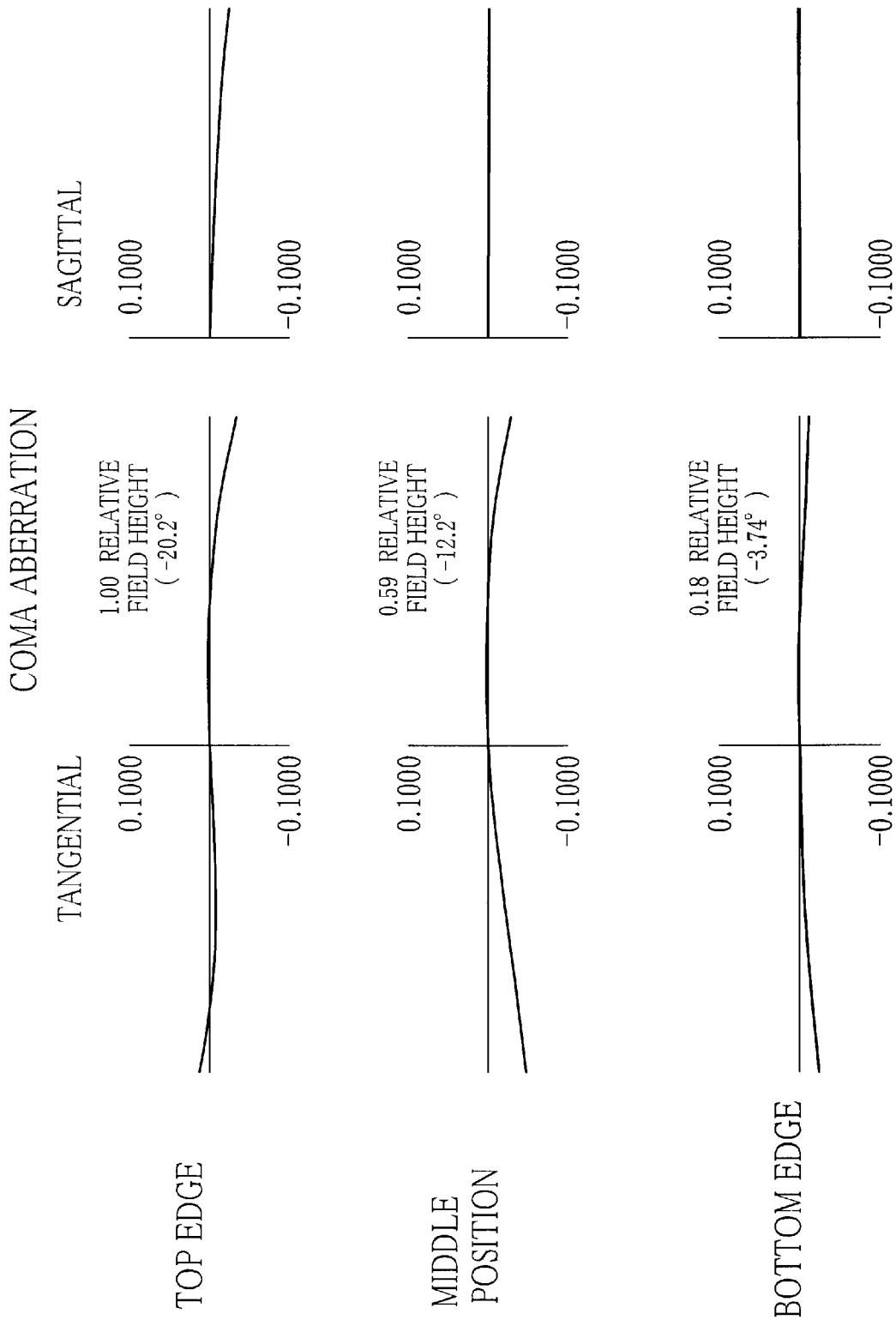

Aberrations of the projection lens 68 of the above first example are shown in FIGS. 9 and 10. In FIGS. 9, 12, 15, 18, 21, 24 and 27 that show the astigmatism, solid lines represent aberration with respect to the sagittal image surface, whereas dashed lines represent aberration with respect to the tangential or meridional image surface. In FIGS. 10, 13, 16, 19, 22 and 25 that show the coma aberration of the first to sixth examples, upper edge, middle position and lower edge respectively represent relative field heights of "1.00", "0.57" and "0.14". In FIG. 28, upper edge, middle position and lower edge respectively represent relative field heights of "1.00", "0.57" and "0.18". All of the shown aberrations are those with respect to the e-line light (546.1 nm).

EXAMPLE 2

Figure 11:
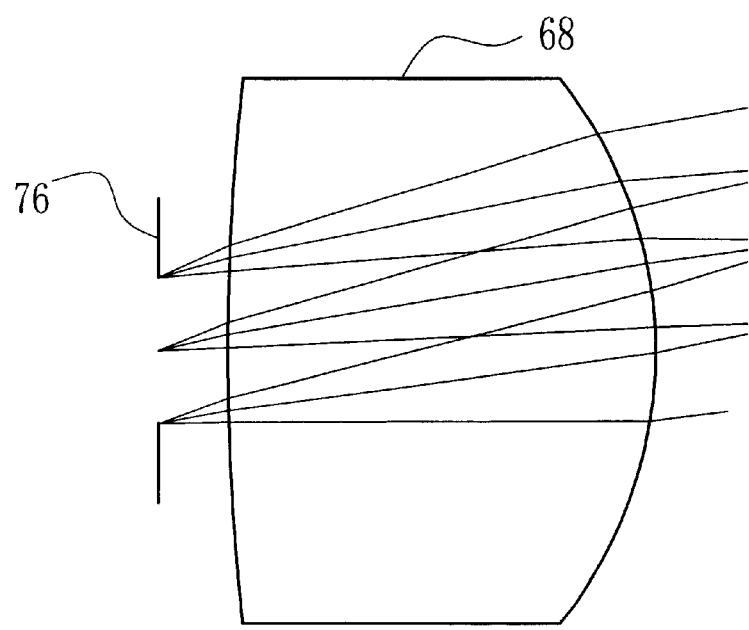

FIG. 11 is a diagram illustrating the optical path of the projection lens 68 configured according to the second example. The respective values for the second example are as follows:

f=5.02 (mm)
F2=8.0
d=3.47 (mm)
S=7.47 (mm)
L=3.00 (mm)
Q=2.00 (mm)

Table 3 shows the lens data of the projection lens 68.

TABLE 3

| SURFACE | RADIUS OF CURVATURE | DISTANCE | EFFECTIVE APERTURE | REFRACTIVE INDEX | DISPERSIVE POWER |
|---|---|---|---|---|---|
| DISPLAY PANEL | | 7.47 | | | |
| STOP | | 0.47 | φ1.99 | | |
| 1 | 20.909 | 3.00 | | 1.492 | 57.5 |
| 2(*) | −2.669 | 10.06 | | | |
| IMAGE SURFACE | | 0 | | | |

In Table 3, (*) represents an aspherical surface, and the aspherical coefficients K, A, B, C and D are shown in Table 4.

TABLE 4

| K | 0 |
|---|---|
| A | 0.125885E-01 |
| B | −0.736008E-02 |
| C | 0.364898E-02 |
| D | −0.604595E-03 |

The characteristic values "d/f" and "θ" of the present invention are:

d/f÷0.69

θ÷0.438

Therefore, the conditions (1) and (3) are satisfied respectively.

The relationship between R1 and R2 is as follows:

|R1|=20.909

|R2|×3=8.007

Figure 12:
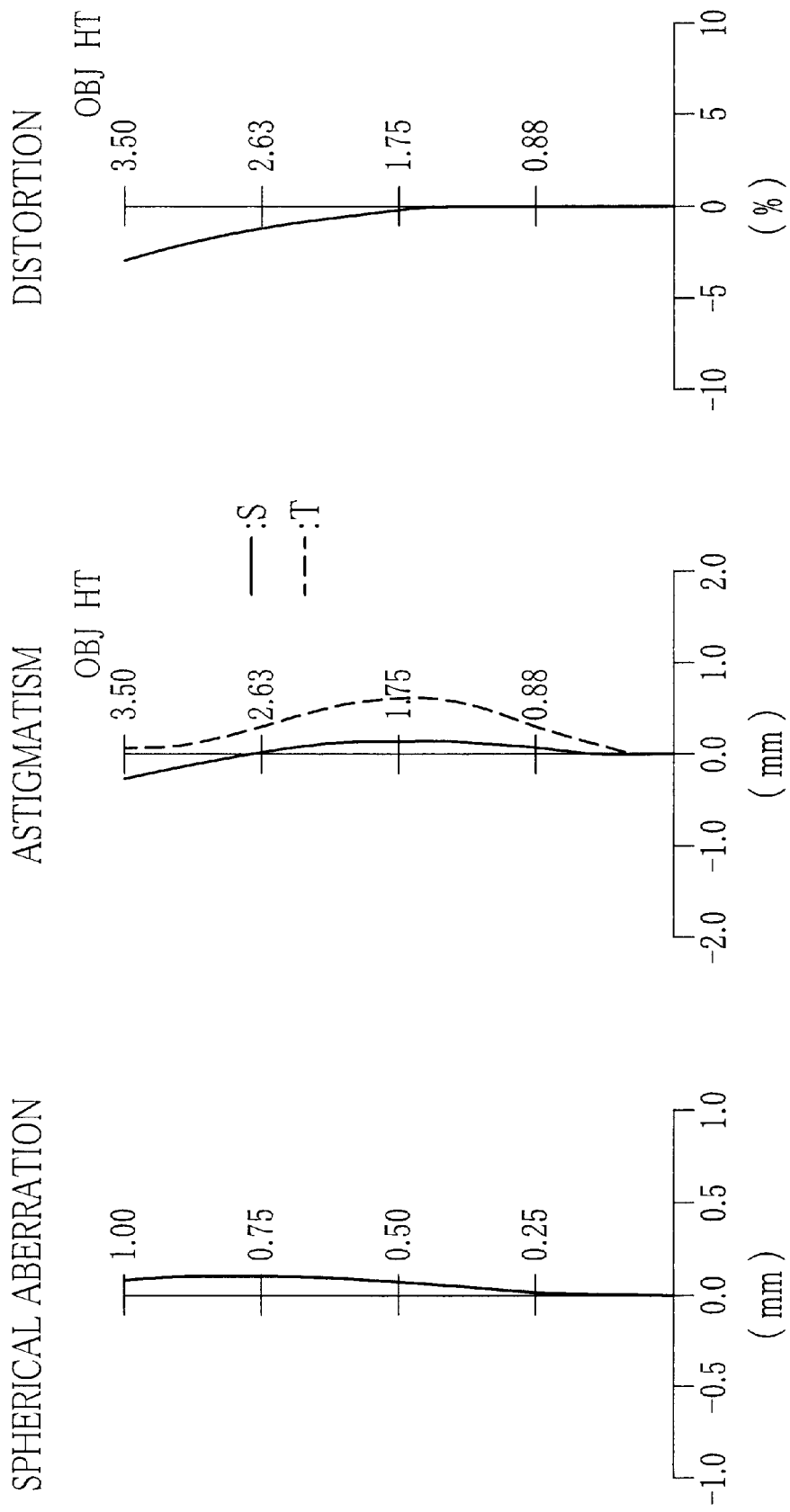
Figure 13:
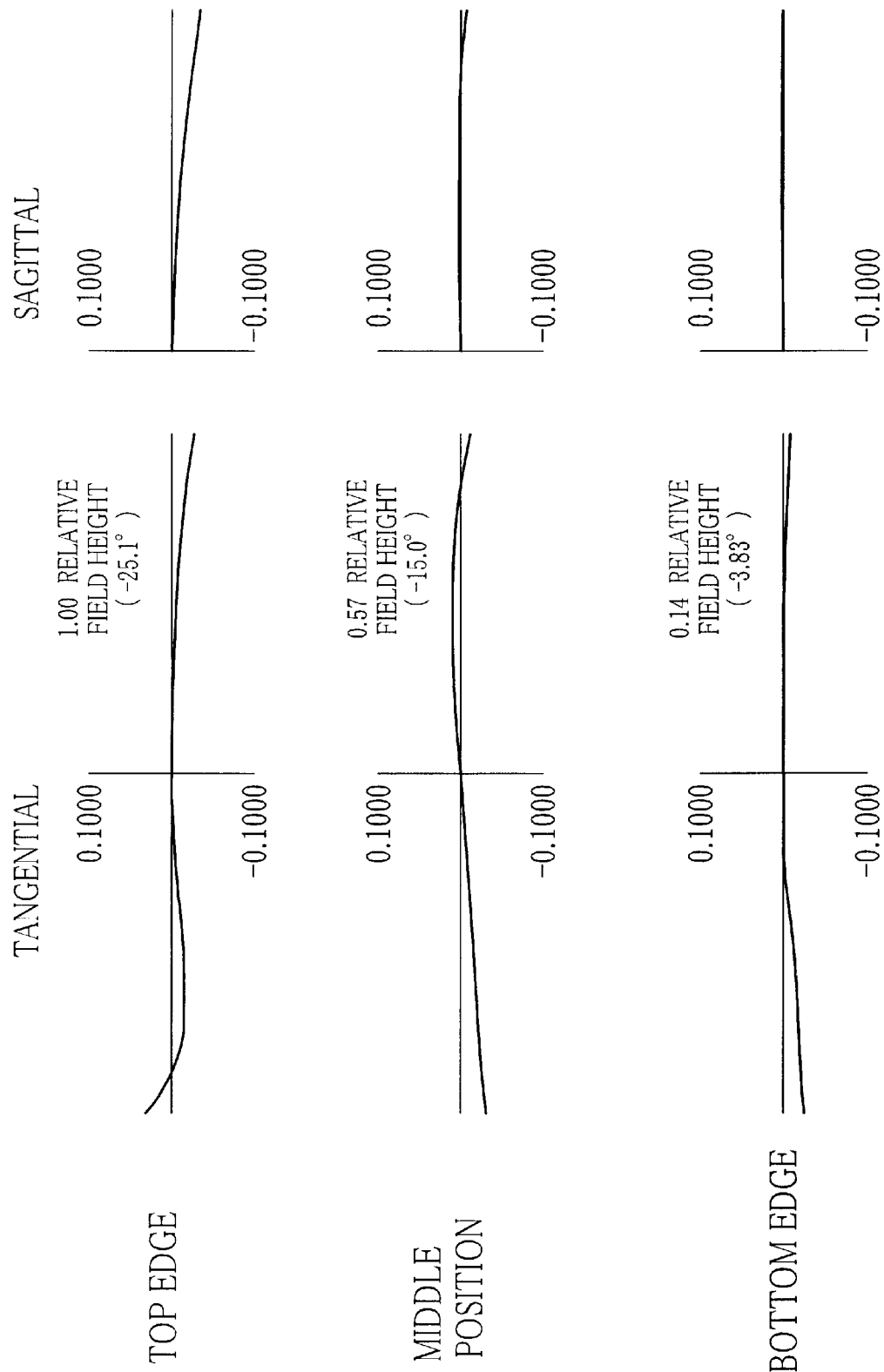

So the condition (2) is satisfied. Aberrations of the projection lens 68 of the above second example are shown in FIGS. 12 and 13.

EXAMPLE 3

Figure 14:
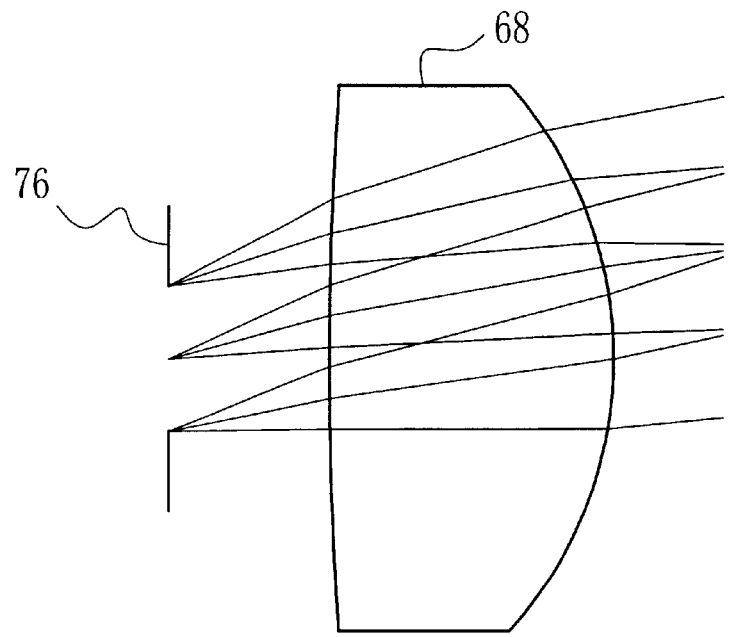
Figure 15:
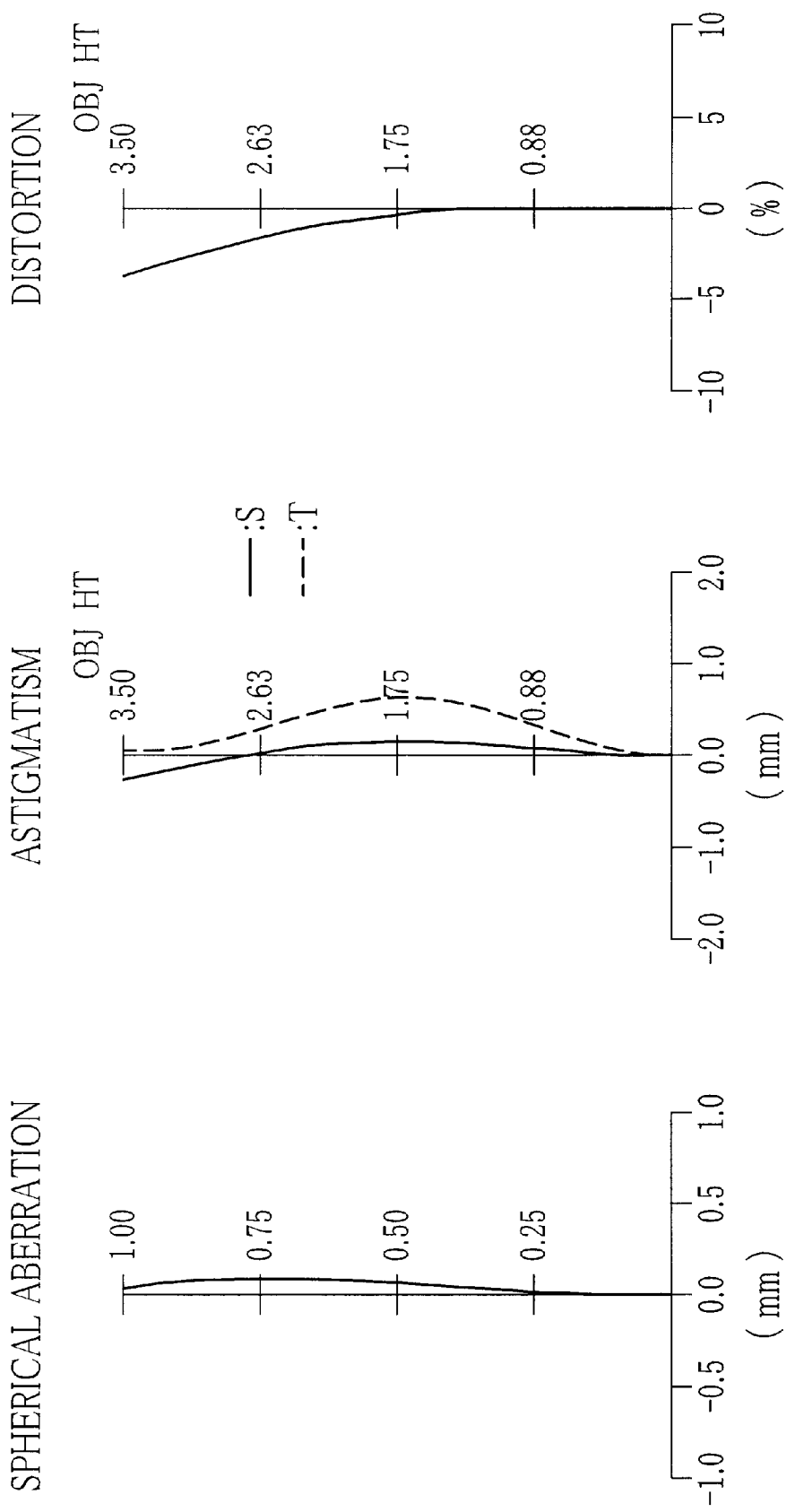

FIG. 14 is a diagram illustrating the optical path of the projection lens 68 configured according to the third example. The respective values for the third example are as set forth below. Aberrations of the projection lens 68 of the third example are shown in FIGS. 15 and 16.

f=5.09 (mm)

F2=8.0 d=3.09 (mm)

S=7.56 (mm)

L=3.00 (mm)

Q=2.00 (mm)

Table b 5shows the lens data of the projection lens 68.

TABLE 5

| SURFACE | RADIUS OF CURVATURE | DISTANCE | EFFECTIVE APERTURE | REFRACTIVE INDEX | DISPERSIVE POWER |
|---|---|---|---|---|---|
| DISPLAY PANEL | | 7.56 | | | |
| STOP | | 1.09 | φ1.0 | | |
| 1 | 41.227 | 2.00 | | 1.492 | 57.5 |
| 2(*) | −2.622 | 10.35 | | | |
| IMAGE SURFACE | | 0 | | | |

In Table 5, (*) represents an aspherical surface, and the aspherical coefficients are shown in Table 6.

TABLE 6

| K | 0 |
|---|---|
| A | 0.125310E-01 |
| B | −0.732356E-02 |
| C | 0.360207E-02 |
| D | −0.586095E-03 |

The characteristic values "d/f" and "θ" of the present invention are:

d/f÷0.61

θ÷0.434

Therefore, the conditions (1) and (3) are satisfied respectively.

The relationship between R1 and R2 is as follows:

|R1|=41.227

|R2|×3=7.866

So the condition (2) is satisfied.

EXAMPLE 4

Figure 17:
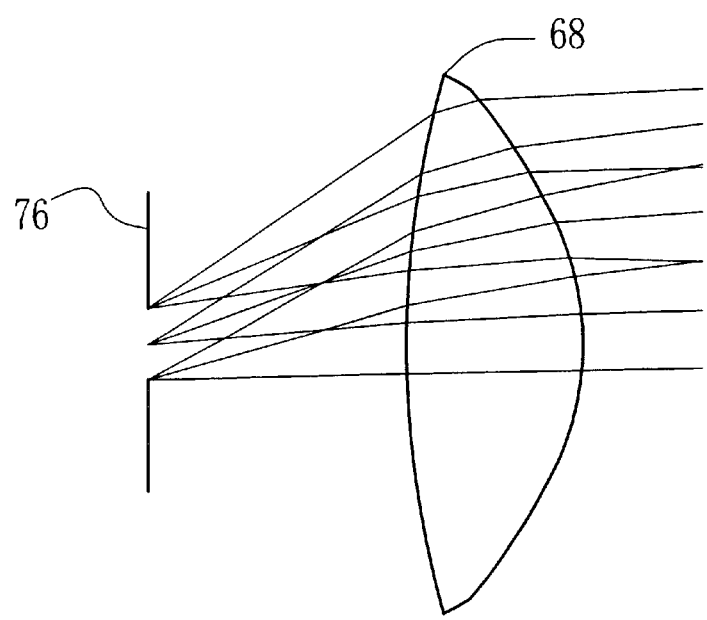
Figure 18:
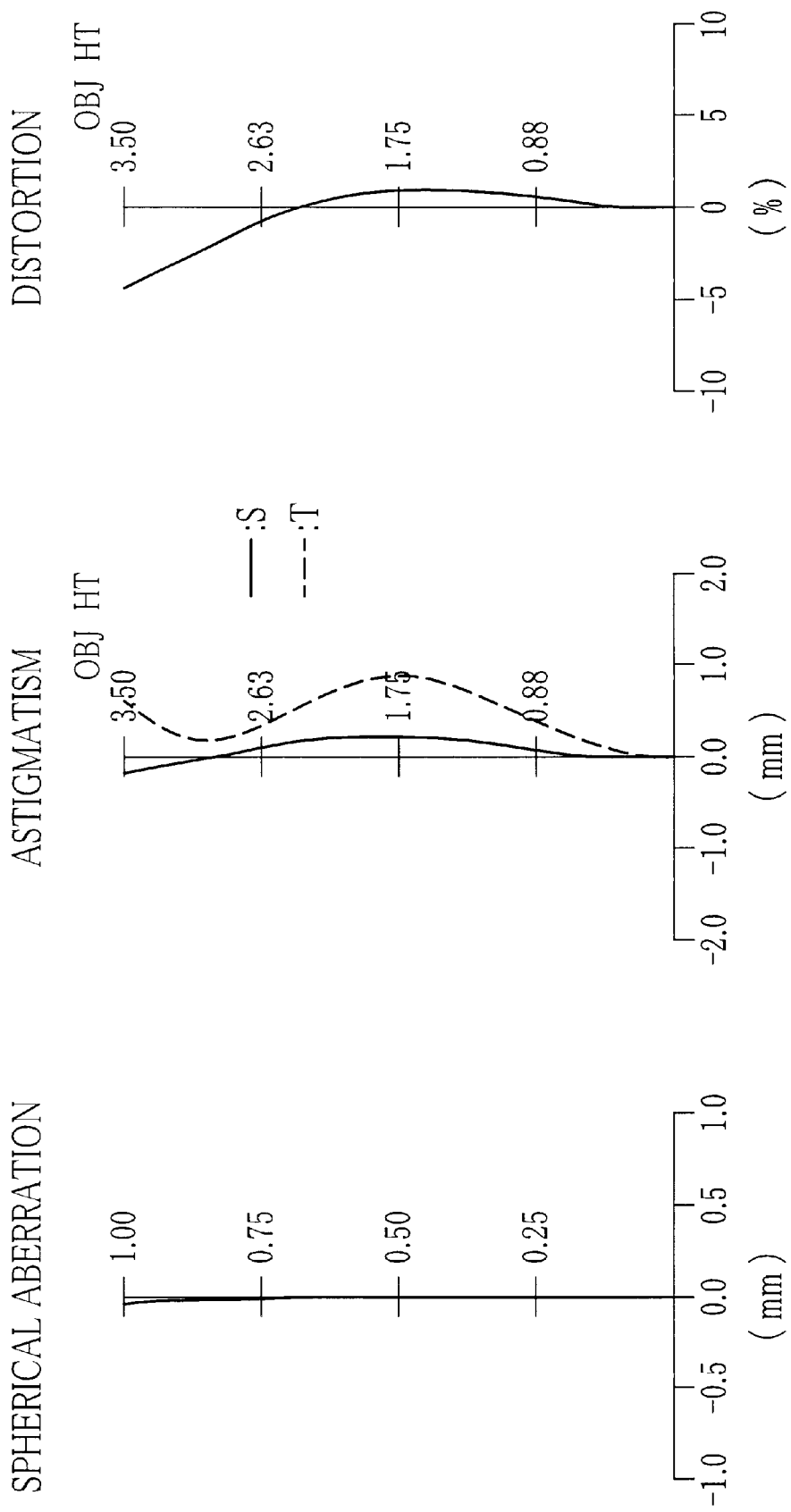
Figure 19:
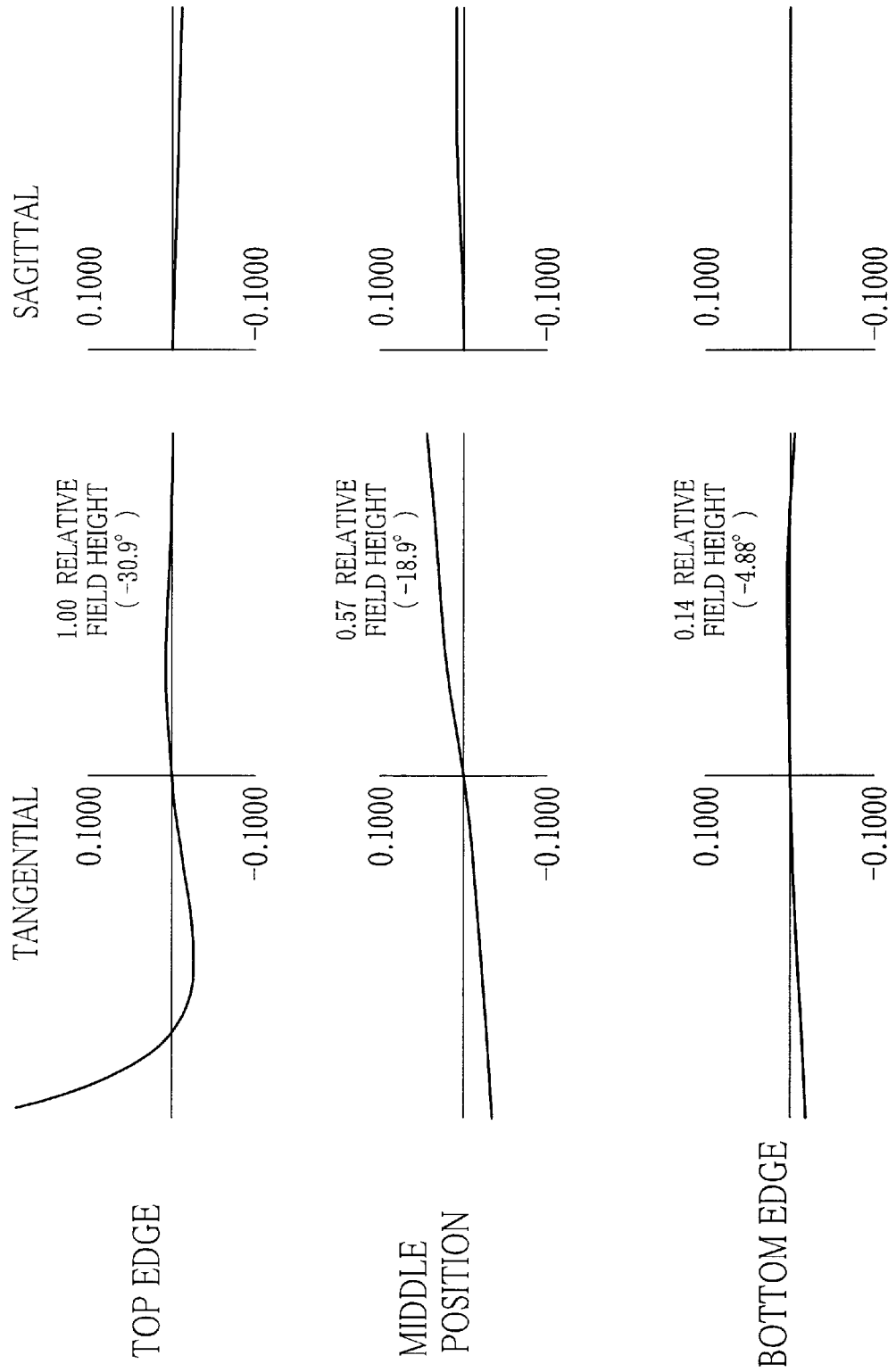

FIG. 17 is a diagram illustrating the optical path of the projection lens 68 configured according to the fourth example. The respective values for the fourth example are as set forth below. Aberrations of the projection lens 68 of the fourth example are shown in FIGS. 18 and 19.

f=5.10 (mm)

F2=8.0 d=5.00 (mm)

S=5.85 (mm)

L=3.00 (mm)

Q=2.00 (mm)

Table 7 shows the lens data of the projection lens 68.

TABLE 7

| SURFACE | RADIUS OF CURVATURE | DISTANCE | EFFECTIVE APERTURE | REFRACTIVE INDEX | DISPERSIVE POWER |
|---|---|---|---|---|---|
| DISPLAY PANEL | | 5.86 | | | |
| STOP | | 3.00 | φ0.77 | | |
| 1 | 10.937 | 2.00 | | 1.492 | 57.5 |
| 2(*) | −3.059 | 10.14 | | | |
| IMAGE SURFACE | | 9.94 | | | |

In Table 7, (*) represents an aspherical surface, and the aspherical coefficients are shown in Table 8.

TABLE 8

| K | 0 |
|---|---|
| A | 0.618245E-02 |
| B | 0.168492E-03 |
| C | −0.209958E-04 |
| D | 0.816094E-05 |

The characteristic values "d/f" and "θ" of the present invention are:

d/f÷0.98

θ÷0.539

Therefore, the conditions (1) and (3) are satisfied respectively.

The relationship between R1 and R2 is as follows:

|R1|=10.937

|R2|×3=9.177

So the condition (2) is satisfied.

EXAMPLE 5

Figure 20:
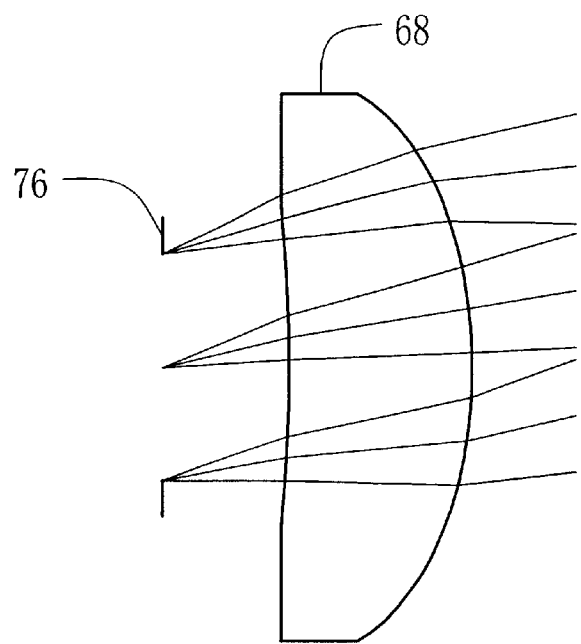
Figure 21:
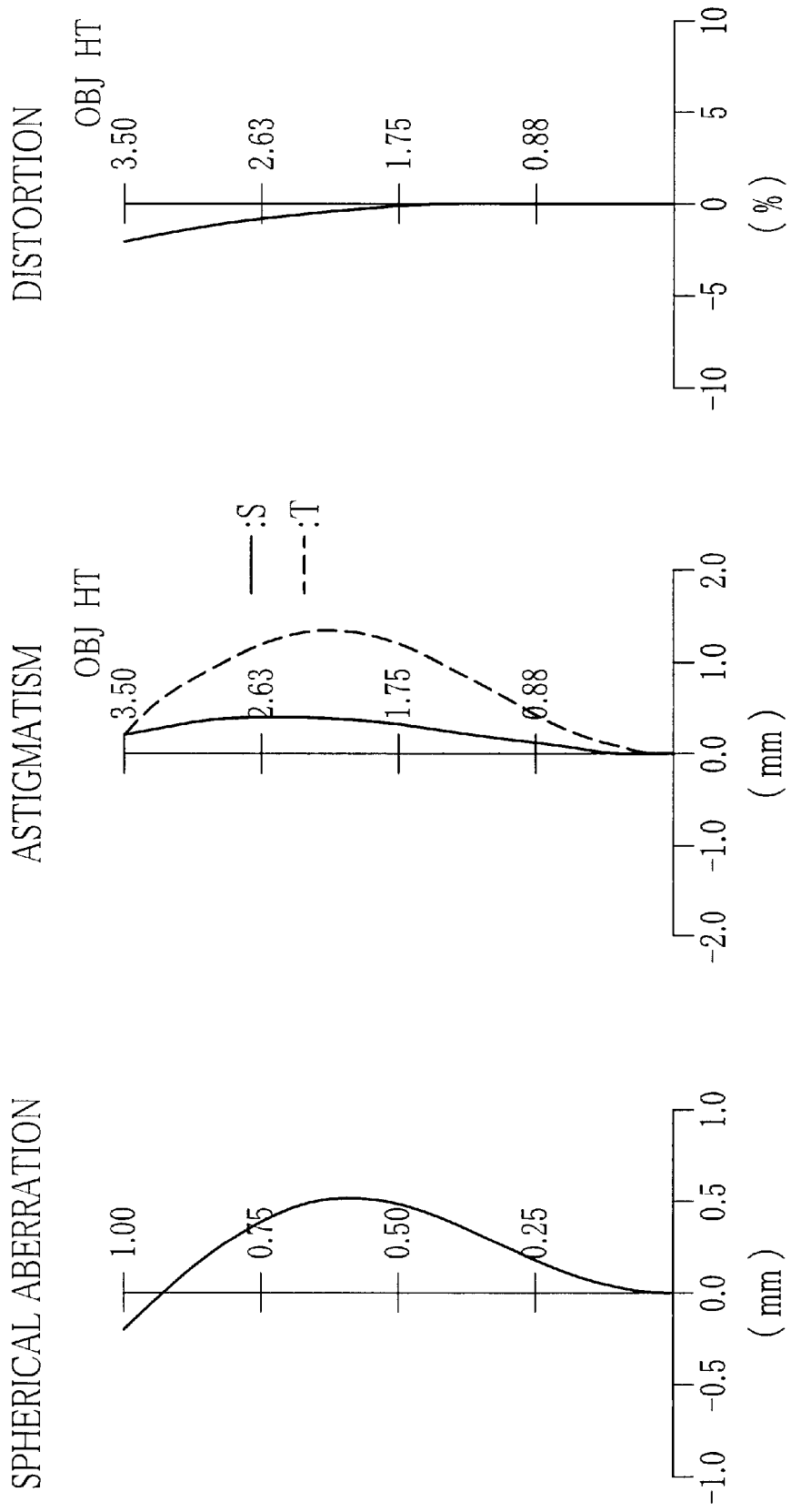

FIG. 20 is a diagram illustrating the optical path of the projection lens 68 configured according to the fifth example. The respective values for the fifth example are as set forth below. Aberrations of the projection lens 68 of the fifth example are shown in FIGS. 21 and 22.

f=5.16 (mm)

F2=8.0 d=1.60 (mm)

S=8.63 (mm)

L=3.00 (mm)

Q=2.00 (mm)

Table 9 shows the lens data of the projection lens 68.

TABLE 9

| SURFACE | RADIUS OF CUR- VATURE | DIS- TANCE | EFFEC- TIVE AP- ERTURE | REFRAC- TIVE INDEX | DIS- PERSIVE POWER |
|---|---|---|---|---|---|
| DISPLAY PANEL | | 8.63 | | | |
| STOP | | 0.65 | φ1.13 | | |
| 1 | −8.379 | 0.95 | | 1.492 | 57.5 |
| 2(*) | −2.029 | 10.77 | | | |
| IMAGE SURFACE | | 0 | | | |

In Table 9, (*) represents an aspherical surface, and the aspherical coefficients are shown in Table 10.

TABLE 10

| K | 0 |
|---|---|
| A | 0.446014E-01 |
| B | −0.880057E-01 |
| C | 0.848541E-01 |
| D | −0.285857E-01 |

The characteristic values "d/f" and "θ" of the present invention are:

d/f÷0.31

θ÷0.385

Therefore, the conditions (1) and (3) are satisfied respectively.

The relationship between R1 and R2 is as follows:

|R1|=8.379

|R2|×3=6.087

So the condition (2) is satisfied.

EXAMPLE 6

Figure 23:
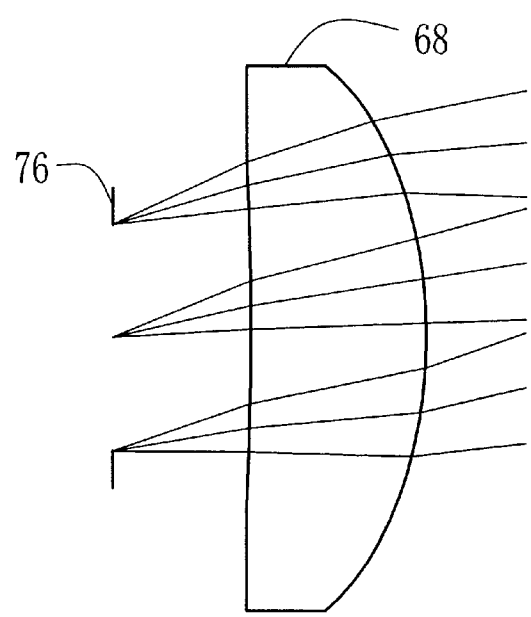
Figure 24:
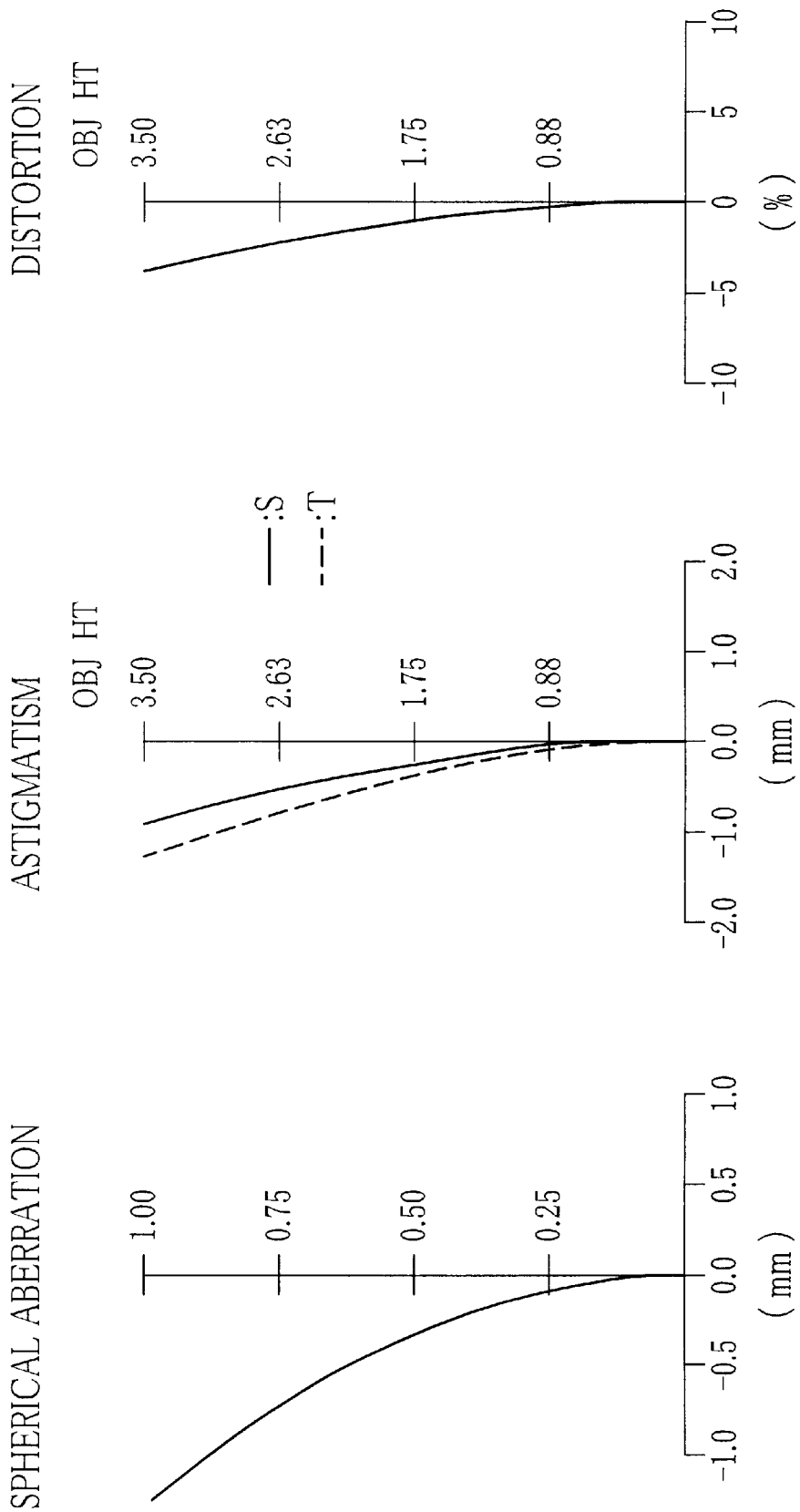
Figure 25:
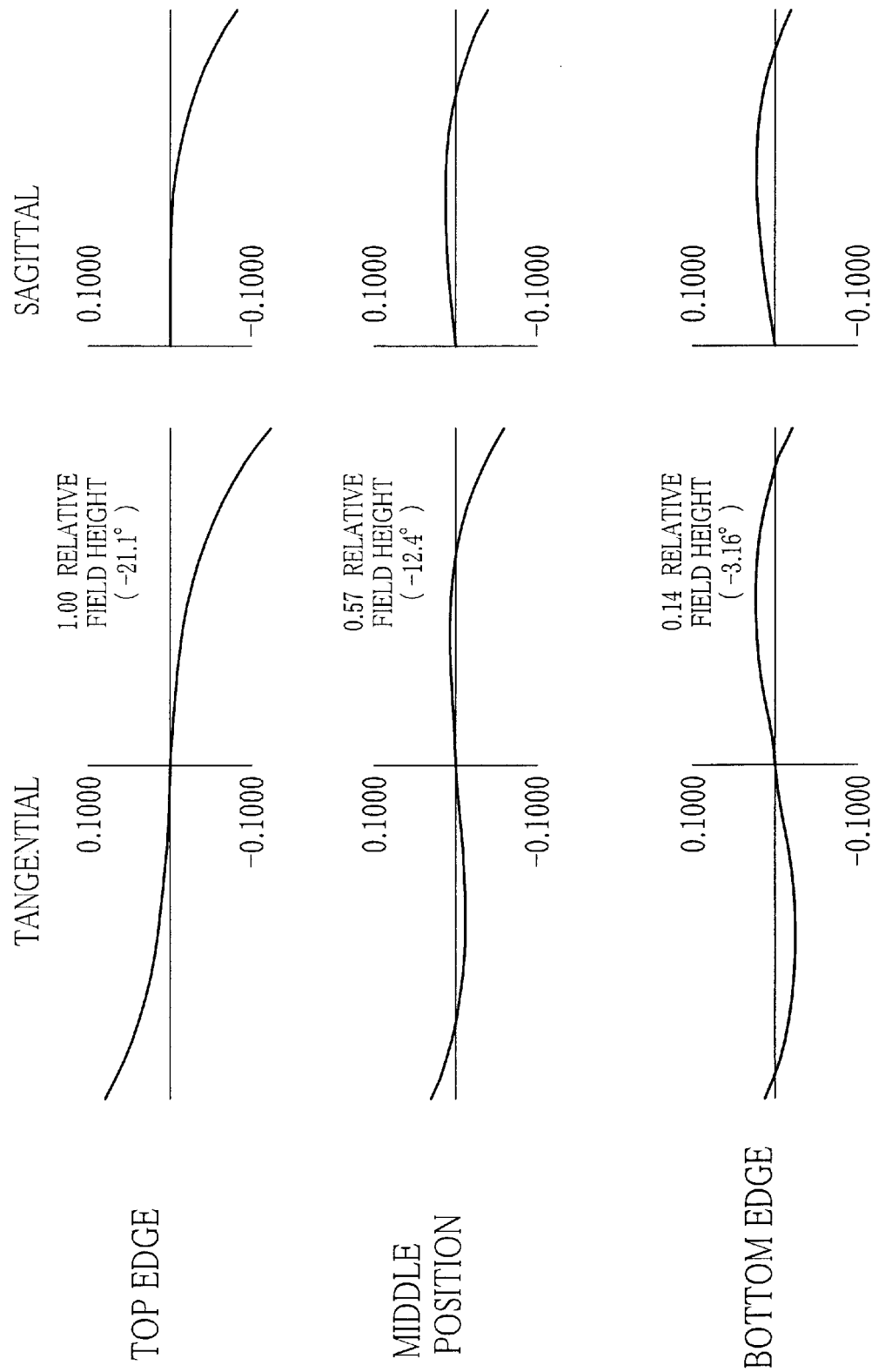

FIG. 23 is a diagram illustrating the optical path of the projection lens 68 configured according to the sixth example. The respective values for the sixth example are as set forth below. Aberrations of the projection lens 68 of the sixth example are shown in FIGS. 24 and 25.

f=5.44 (mm)

F2=8.0 d=1.74 (mm)

S=9.07 (mm)

L=3.00 (mm)

Q=2.00 (mm)

Table 11 shows the lens data of the projection lens 68.

TABLE 11

| SURFACE | RADIUS OF CUR- VATURE | DIS- TANCE | EFFEC- TIVE AP- ERTURE | REFRAC- TIVE INDEX | DIS- PERSIVE POWER |
|---|---|---|---|---|---|
| DISPLAY PANEL | | 9.07 | | | |
| STOP | | 0.78 | φ1.19 | | |
| 1 | −12.620 | 0.97 | | 1.492 | 57.5 |
| 2 | −2.262 | 11.28 | | | |
| IMAGE SURFACE | | −1.09 | | | |

The characteristic values "d/f" and "θ" of the present invention are:

d/f÷0.32

θ÷0.368

Therefore, the conditions (1) and (3) are satisfied respectively.

The relationship between R1 and R2 is as follows:

|R1|=12.620

|R2|×3=6.786

So the condition (2) is satisfied.

EXAMPLE 7

Figure 26:
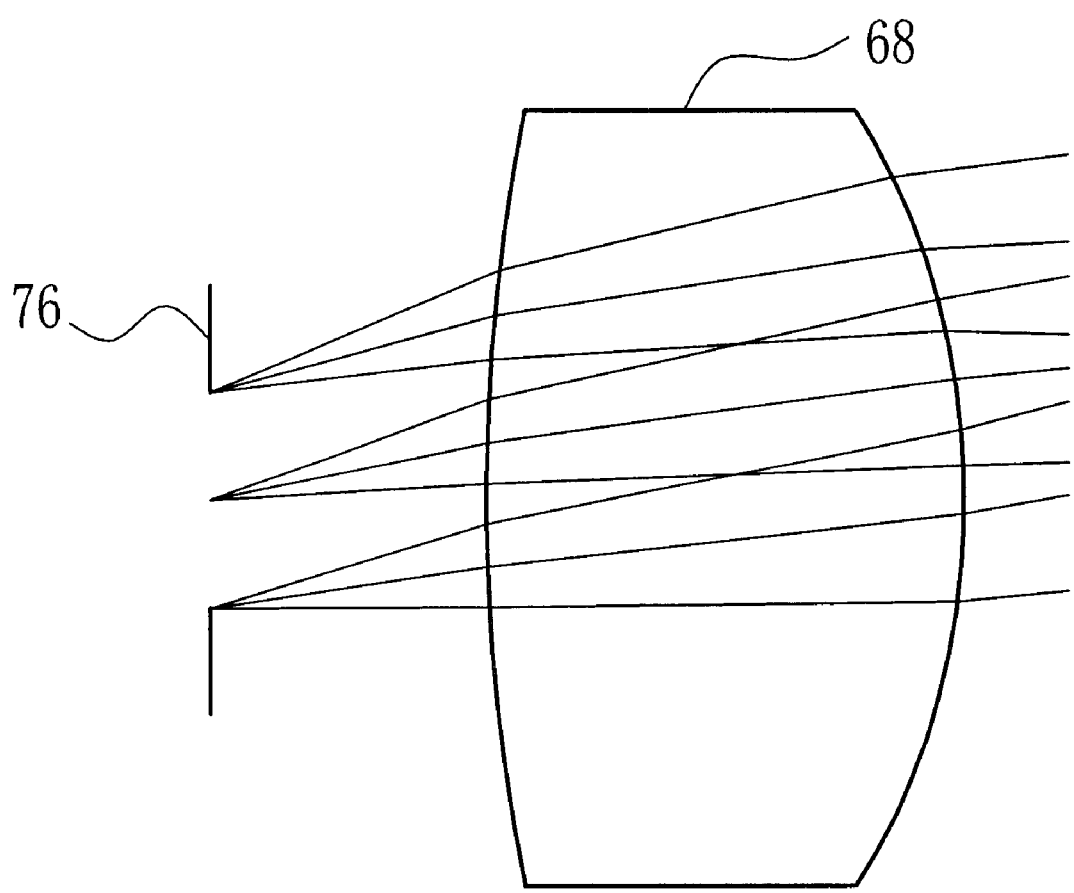

FIG. 26 is a diagram illustrating the optical path of the projection lens 68 configured according to the seventh example. The respective values for the seventh example are as set forth below. Aberrations of the projection lens 68 of the seventh example are shown in FIGS. 27 and 28.

f=6.78 (mm)

F2=8.0 d=4.72 (mm)

S=9.92 (mm)

L=3.00 (mm)

Q=2.15 (mm)

Table 12 shows the lens data of the projection lens 68.

TABLE 12

| SURFACE | RADIUS OF CUR- VATURE | DIS- TANCE | EFFEC- TIVE AP- ERTURE | REFRAC- TIVE INDEX | DIS- PERSIVE POWER |
|---|---|---|---|---|---|
| DISPLAY PANEL | | 9.93 | | | |
| STOP | | 1.70 | φ1.31 | | |
| 1 | 12.657 | 3.00 | | 1.492 | 57.5 |
| 2(*) | −4.176 | 13.37 | | | |
| IMAGE SURFACE | | 0 | | | |

In Table 12, (*) represents an aspherical surface, and the aspherical coefficients are shown in Table 13.

TABLE 13

| K | −0.261168 |
|---|---|
| A | 0.252613E-02 |
| B | −0.892276E-04 |
| C | 0 |
| D | 0 |

The characteristic values "d/f" and "θ" of the present invention are:

d/f÷0.70

θ÷0.353

Therefore, the conditions (1) and (3) are satisfied respectively.

The relationship between R1 and R2 is as follows:

|R1|=12.657

|R2|×3=12.528

So the condition (2) is satisfied.

Figure 29:
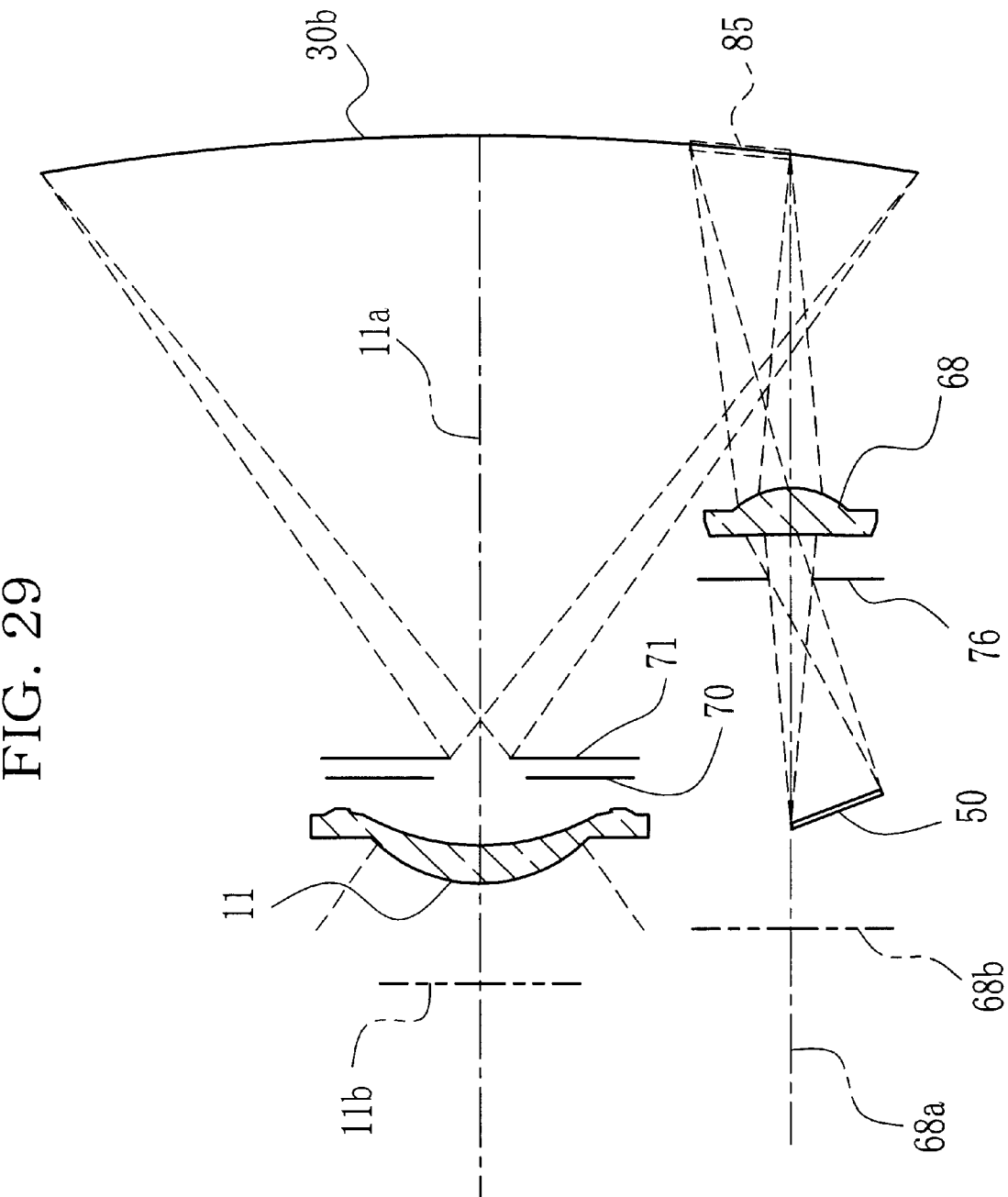
FIG. 29 is an explanatory diagram illustrating positions of a light path of a projection lens and an LCD panel relative to a light path of a taking lens, according to a second embodiment of the invention.

FIG. 29 schematically shows essential parts of an optical data recording device according to another embodiment of the present invention. This embodiment is for forming an image of the LCD panel 50 on the photo film strip 30b with better quality, provided that the photo filmstrip 30b is curved along the lengthwise direction of the photographic frame with the center of curvature located on the side of the taking lens, that is, with its concave surface oriented toward the taking lens 11. For this purpose, an LCD panel 50 is inclined to a perpendicular plane 68b to an optical axis 68a of a projection lens 68, such that the distance from the LCD panel 50 to the photo filmstrip 30b decreases as the distance from the photographic optical axis 11a in the lengthwise direction of the photographic frame increases. In this embodiment, the optical axis 68a of the projection lens 68 is parallel to the photographic optical axis 11a of the taking lens 11. The inclination angle of the LCD panel 50 is determined such that an image surface 85 of an image formed through the projection lens 68 substantially coincides with the curved surface of the photo filmstrip 30b in the date recording position. In this way, the date data displayed on the LCD panel 50 may be recorded on the photo filmstrip 30b without blurs that would otherwise be provided due to the curve of the photo filmstrip 30b.

To record the image of the LCD panel 50 on the photo filmstrip 30b sharply without aberrations, the projection lens 68 is designed to be an aspherical lens. Thus, the image of the LCD panel 50 is formed on the photo filmstrip 30b with very little aberrations. According to this embodiment, the projection lens 68 is configured for example as follows:

focal length f=5.14 mm f-number=4.87 projective magnification=1.05 effective f-number=8.0

The lens data of the projection lens 68 is shown in Table 14. Other configurations are equivalent to the first embodiment, so the detail is omitted.

TABLE 14

| SURFACE | RADIUS OF CURVATURE | DISTANCE | EFFECTIVE APERTURE | REFRACTIVE INDEX | DISPERSIVE POWER |
|---|---|---|---|---|---|
| DISPLAY PANEL | | 8.05 | | | |
| STOP | | 1.1 | φ1.06 | | |
| 1 | −19.438 | 1.2 | | 1.492 | 57.5 |
| 2(*) | −2.2285 | 10.65 | | | |
| IMAGE SURFACE | | 0 | | | |

In Table 14, (*) represents an aspherical surface, and the aspherical coefficients are shown in Table 15.

TABLE 15

| K | −0.328946 |
|---|---|
| A | 1.62E-02 |
| B | −2.03E-02 |
| C | 1.25E-02 |
| D | −2.76E-03 |

In the embodiment of FIG. 29, the LCD panel 50 is inclined in correspondence with the photographic frame of the lengthwise curved photo filmstrip, such that the LCD panel 50 approaches the film surface as it removes from the photographic optical axis 11a in the lengthwise direction of the photographic frame. However, for example where the photo filmstrip is held to be spherical, it is preferable to incline the LCD panel 50 in the widthwise direction as well as the lengthwise direction of the photographic frame, so that the image surface is formed along the curves of the film surface.

Figure 30:
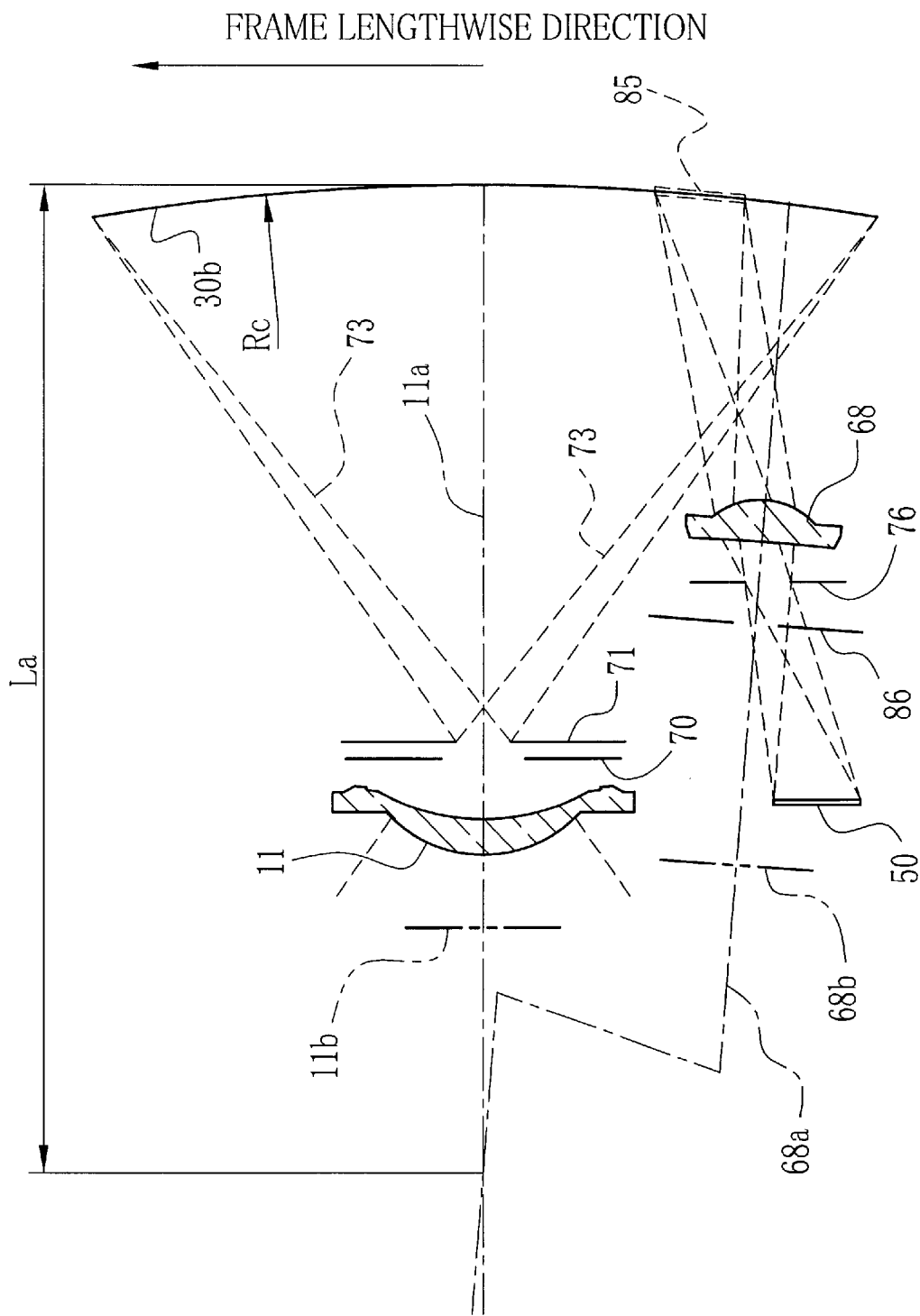
FIG. 30 is an explanatory diagram illustrating positions of a light path of a projection lens and an LCD panel relative to a light path of a taking lens, according to a third embodiment of the invention.

FIG. 30 schematically shows essential parts of an optical data recording device according to a further embodiment of the present invention. In this embodiment, where a photo filmstrip 30b is curved along the lengthwise direction with its center of curvature on the side of the taking lens, an optical axis 68a of a projection lens 68 is inclined to the photographic optical axis 11a, whereas the LCD panel 50 is inclined to a perpendicular plane 68b to the optical axis 68a of the projection lens 68 about an axis that extends in the widthwise direction of the film, to such a degree that the LCD panel 50 is oriented approximately parallel to the perpendicular plane 11b to the photographic optical axis 11a. Thereby, an image surface 85 of an LCD panel 50 that is formed through the projection lens 68 substantially coincides with the curved surface of the photo filmstrip 30b in a date recording position. That is, the projection lens 68 is arranged such that if the optical axis 68a is projected vertically onto a virtual plane that includes the photographic optical axis 11a of the taking lens 11 and is parallel to the film lengthwise direction, hereinafter referred to as a horizontal plane of the photographic optical axis, the optical axis 68a of the projection lens 68 would come across the photographic optical axis 11a on the subject side.

This configuration allows to incline the image surface 85 of the LCD panel 50 along the curved surface of the photo filmstrip 30b, while arranging the LCD panel 50 and thus the date module 31 substantially parallel to the light converging panel 16 and thus a front panel of the front cover 29, because these panels are substantially parallel to the perpendicular plane 11b to the photographic optical axis 11a. Arranging the LCD panel 50 substantially in parallel to a rear surface of the light converging panel 16 reduces a dead space inside the unit body 10, and also allows to illuminate the LCD panel 50 uniformly by the illuminating section 16a of the light converging panel 16, thereby eliminating unevenness in exposure amount for data recording. Other configurations are equivalent to the above embodiments, so the detail is omitted.

The degree of inclination of the image surface 85 of the LCD panel 50 may be adjusted by adjusting the inclination angle of the LCD panel 50 to the perpendicular plane 68b to the optical axis 68a and the inclination angle of the optical axis 68a to the photographic optical axis 11a. The image surface 85 of the LCD panel 50 does not need to coincide completely with the curve of the photo filmstrip 30b insofar as it is included in a practically tolerable range provided by a depth of field of the projection lens or the like. In order to arrange the LCD panel 50 to be approximately parallel to the perpendicular plane 11b to the photographic optical axis 11a, the angle of the optical axis 68a to the photographic optical axis 11a is preferably adjusted in a range that satisfies the following condition, though the angle depends also upon where on the photo filmstrip 30b the image surface 85 of the LCD panel 50 is to be formed.

$$Rc \times 1.5 < La < Rc \times 4 \tag{5}$$

wherein "Rc" represents a radius of curvature of the photo filmstrip, "La" represents a length from a cross point of the photographic optical axis 11a with the optical axis 68a as projected on the above photographic optical axis horizontal plane, to a cross point of the photographic optical axis 11a with the photo filmstrip 30b.

This condition is for balancing the degree of parallel of the LCD panel 50 to the perpendicular plane 11b to the photographic optical axis 11a, with the degree of compensation for blurs that are resulted from the curve.

If the length La is above the upper limit "Rc×4", the optical axis 68a get close to be parallel to the photographic optical axis 11a, so that the LCD panel 50 would have to be inclined at a certain angle to the front panel of the front cover 28 that is substantially parallel to the plane 11b. If the length La is below the lower limit "Rc×1.5", the effect of inclining the image surface 85 of the LCD panel 50 through the projection lens 68 becomes so great that the image surface would be overcompensated for the curve of the photo filmstrip when the LCD panel 50 is maintained substantially parallel to the front panel of the front cover 28, and that blurs would be provided in the opposite side from those provided by the curve.

In this example, the radius of curvature Rc is 80 mm, the inclination of the projection lens 68 is 4.5°, and a length from the cross point of the photographic optical axis 11a with the photo filmstrip 30b to a cross point of the optical axis 68a, as projected on the photographic optical axis horizontal plane, with the photo filmstrip 30b is 10.64 mm. With these values, the above length La is 135.92 mm, "Rc×1.5" is 120 mm, and "Rc×4" is 320 mm. Therefore, the above condition (5) is satisfied.

The center of the LCD panel 50 is displaced from the optical axis 68a of the projection lens 68 so as to locate the date recording position closer to the photographic optical axis 11a, in the same as the above embodiment. Correspondingly, the center of the aperture stop 76, which is placed between the LCD panel 50 and the projection lens 68, is displaced from the optical axis 68a in a direction to remove from the photographic optical axis 11a in the same way as the LCD panel 50. This configuration contributes to avoiding an increase in the external diameter of the projection lens 68.

Specifically, if the center of the aperture stop is placed on the optical axis 68a of the projection lens 68 as implied by phantom lines 86, while the center of the LCD panel 50 is displaced from the optical axis 68a, the date light projected from the LCD panel 50 would fall widely on a peripheral portion of the projection lens 68. Accordingly, the projection lens 68 would need an undesirably large external diameter. By displacing the center of the aperture stop 76 from the optical axis 68a in the same direction as the center of the LCD panel 50 is displaced from the optical axis 68a, it comes to be possible to let the date light fall integrally on avicinity of the optical axis 68a of the projection lens 68. Thus, the projection lens 68 does not need to be enlarged. In the case where the natural light is used as the illumination light source for the LCD panel 50, the displacement of the center of the aperture stop 76 from the optical axis 68a contributes to setting the angle of the date light from the center of the LCD panel to the center of the aperture stop 76 near to the photographic optical axis 11a of the taking lens 11.

This embodiment is applicable to a case where the center of the LCD panel is placed on the optical axis, in order to form the image of the LCD panel along the curved surface of the photo filmstrip.

Although those cases have been described where the photo filmstrip is curved such that its section forms a circular arc of a constant radius of curvature, the present invention is applicable to a case where the photo filmstrip is curved with its concave surface oriented to the taking lens, but the section forms a different curve from the circular arc. In that case, a pseudo radius of curvature Rc' is derived from respective cross points of the photographic optical axis and the optical axis of the projection lens with the photo filmstrip. For example, as the pseudo radius of curvature Rc' is used a length from the cross point of the photographic optical axis with the photographic filmstrip to a cross point of a normal line with the photo filmstrip, the normal line being normal to a curved surface of the photo filmstrip between the cross point of the photographic optical axis with the photo filmstrip and a cross point of the projected optical axis of the projection lens on the above mentioned horizontal plane of the photographic optical axis. Then, the length La is determined by substituting Rc' for Rc in the above condition (5).

Figure 31:
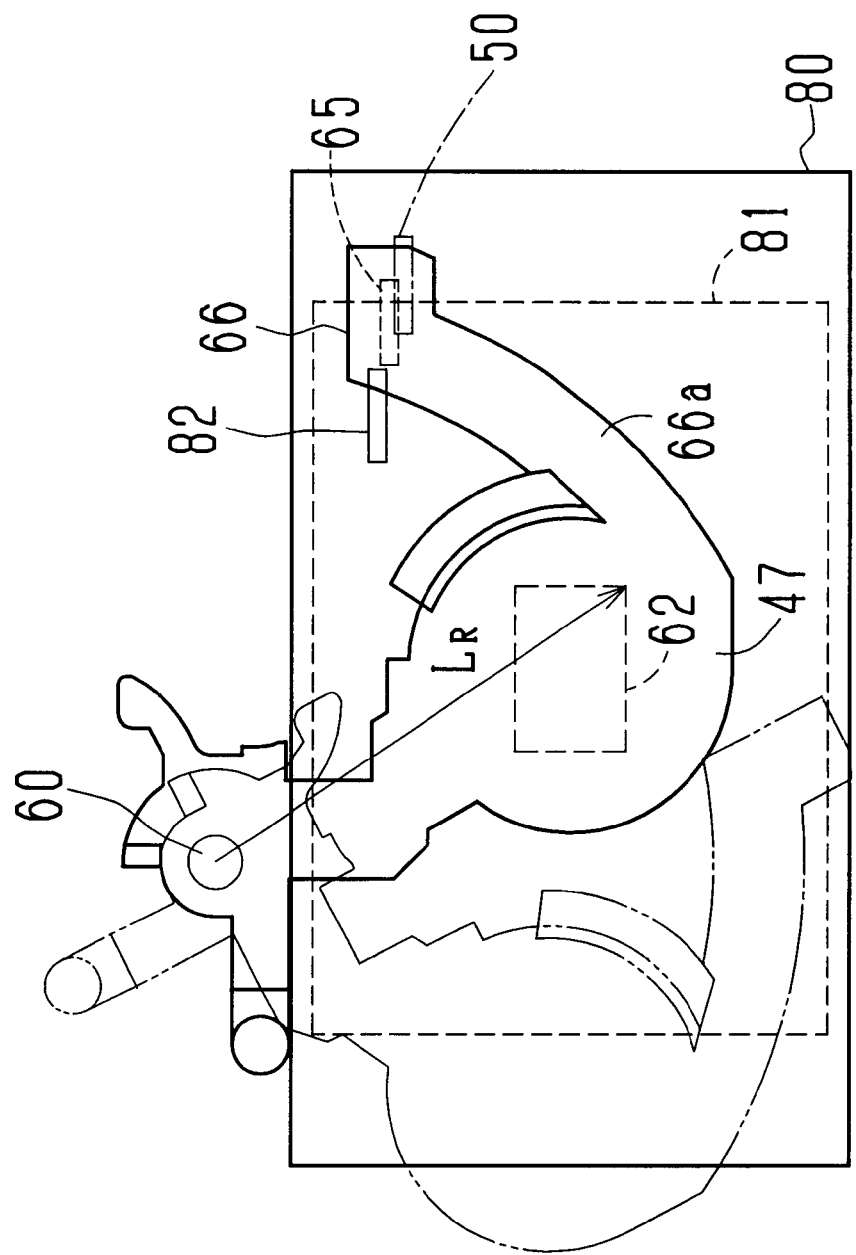
FIG. 31 is an explanatory diagram illustrating a positional relationship between a shutter aperture, a data shutter aperture and an LCD panel, as viewed from the front.

In any of the above embodiments, it is possible to displace the LCD panel 50 upward or downward from the data shutter opening 65 in the widthwise or up-down direction of the photographic frame, as shown in FIG. 31, for the sake of adjusting the date recording position 82 in the widthwise direction of the photographic frame. For example, where the date is to be recorded at an upper right position of the photographic frame, as shown in the drawings, the date data may be recorded in a frame area that is obtained by trimming top and bottom zones of the standard frame to correspond to the P size (panoramic) photo print, without the risk of interrupting the subject light for the standard frame with the projection lens or other elements. Accordingly, the date is recorded on the photo print even when the P size is designated on such a film unit that is not provided with a print size designation device but allows the user to designate the P size print at the order of printing.

As set forth above, the optical data recording devices of the above embodiments are applicable not only to such film units that are specific to the C size but allow the user to designate the H size at the printing, but also to such film units or cameras that are specific to the H size but allows the user to designate the C size or the P size at the printing.

Figure 32:
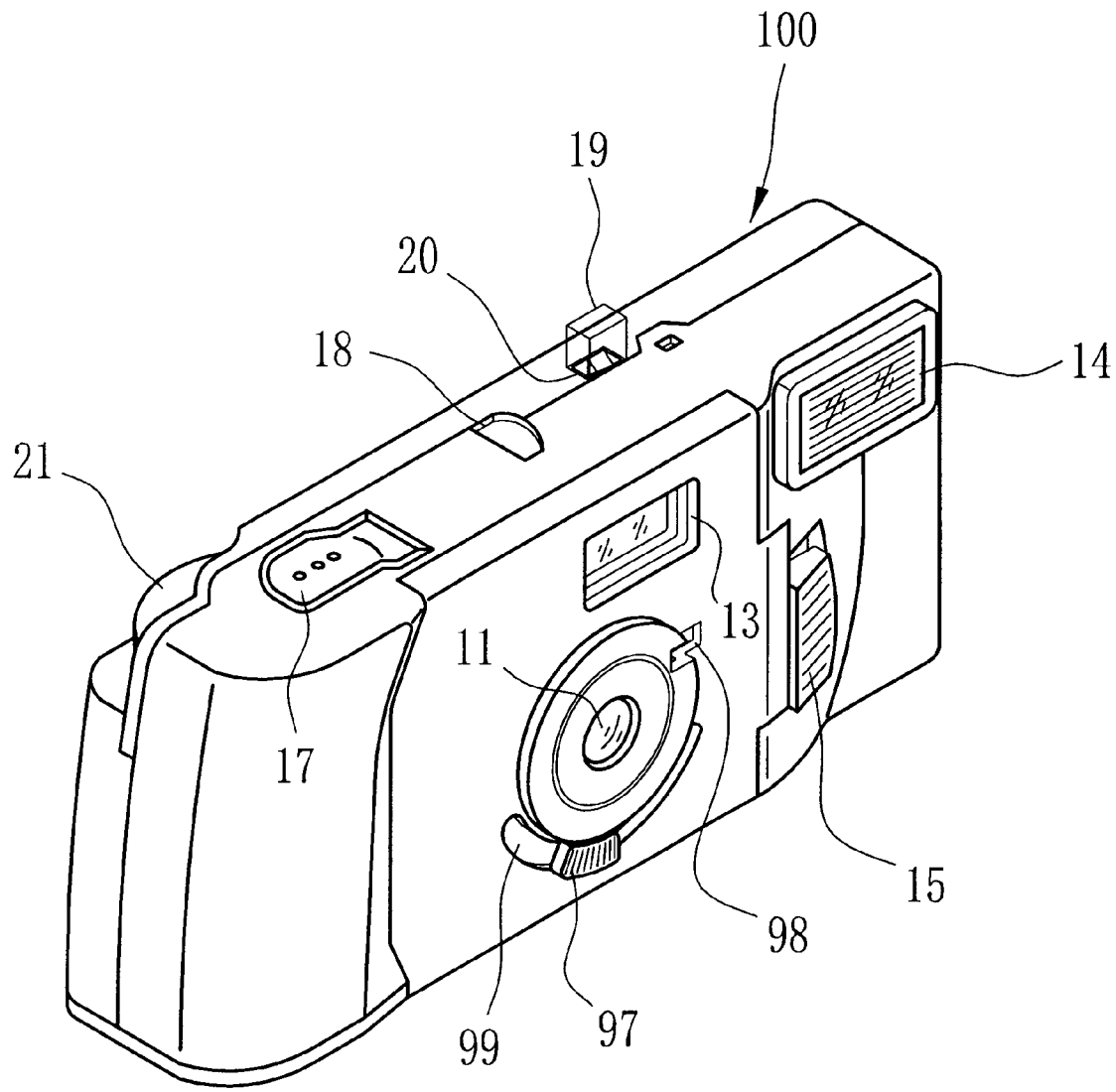
FIG. 32 is a perspective view illustrating an appearance of a unit body of a film unit having an optical data recording device integrated therein, according to a fifth embodiment of the present invention.
Figure 33:
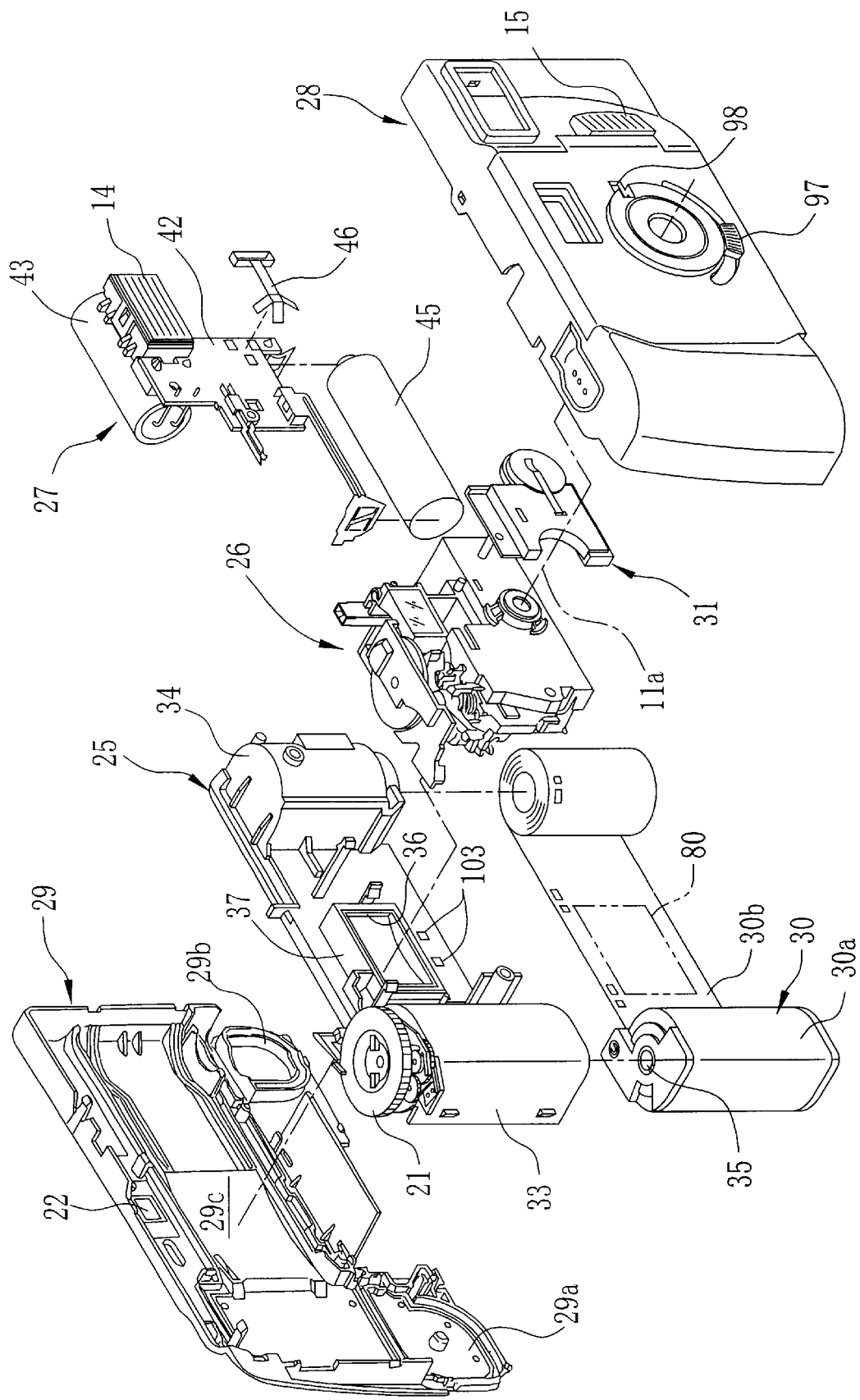
FIG. 33 is an exploded perspective view illustrating the configuration of the unit body of FIG. 32.

FIG. 32 shows an appearance of a film unit incorporated with an optical data recording device according to another embodiment of the present invention. A unit body 100 of the film unit has a taking lens, a finder objective window 13, a flash projector 14, a charge operation knob 15, a finder switching knob 97, a data recording opening 98 on its front side. On the top side, there are provided a shutter button 17, a counter window 18, an opening 20 for protruding a light guide 19 to outside, for indicating completion of flash charging. On the rear side, as shown in FIG. 33, a film winding knob 21 and a finder eyepiece window 22 are provided. The unit body 100 is constituted of a body basic portion that is loaded with a film cartridge 30 and is attached with many kinds of photographic mechanisms, an exposure unit 26 attached to a front of the body basic portion 25, a date module 31 that constitutes an optical data recording device, a flash unit 27, and front and rear covers 28 and 29 that are attached to the body basic portion 25 to cover the front and rearsides thereof. These elements are assembled through snap-in engagement in a removable fashion. Fundamentally equivalent elements to those used in the above embodiments are designated by the same reference numbers, so the detail of these elements are omitted.

The unit body 100 shown in FIG. 32 allows to select one of three print sizes: P size, H size and standard size, for each individual photographed frame at the time of photography. The print size is selected by selecting one of view fields that have corresponding shapes to the above three print sizes by sliding the finder switching knob 97 along a slit 99 that is formed through the front of the unit body 100. In cooperation with the view field switching, a different mark is selected to be recorded on photo filmstrip, to produce photo prints in the designated sizes by making printing process according to the mark.

For this purpose, a mark recording circuit that includes photoelectric elements is mounted on a printed circuit board 42 of the flash unit 27 besides a flash circuit, though the detail is not shown for avoiding complication.

Figure 34:
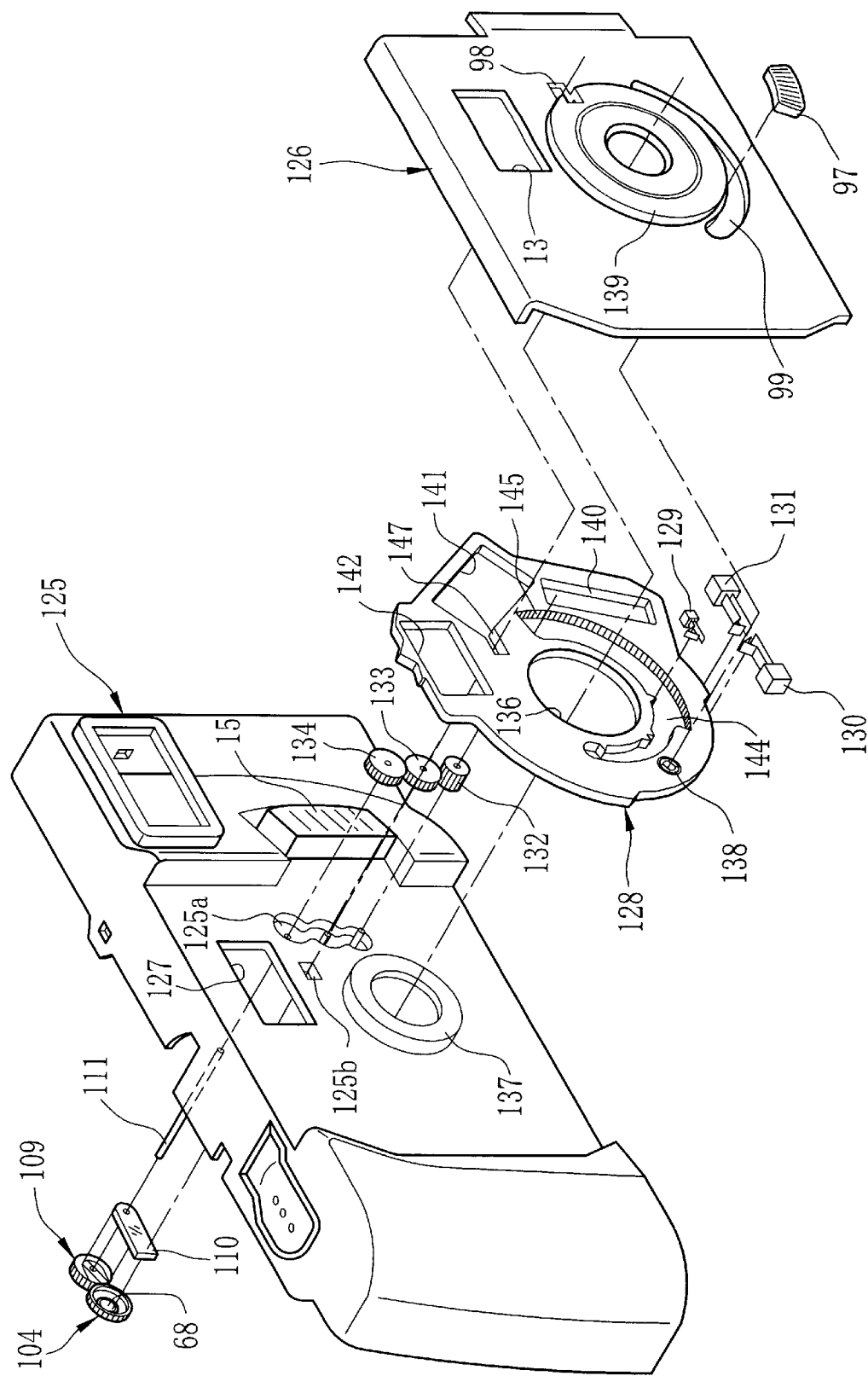
FIG. 34 is an exploded perspective view illustrating the configuration of a front cover of the unit body of FIG. 32.

As shown in FIG. 34, the front cover 28 is constituted of a front cover main body 125, and a front panel 126 that is attached to the front of the front cover main body 125. The front cover main body 125 has a finder opening 127 of the same shape as the finder objective window 13 that is formed through the front panel 126. The finder opening 127 and the finder objective window 13 are placed in front of a finder optical system 12 that is integrated in the exposure unit 26. In between the front cover main body 125 and the front panel 126, a view field switching plate 128, three micro switches 129, 130 and 131, and three gears 132, 133 and 134 are mounted. The three gears 132 to 134 are pivotally mounted in a recess 125a that is formed on the front of the front cover main body 125.

The view field switching plate 128 is mounted on the front panel 126 in a rotary fashion by fitting a round center opening 136 of the view field switching plate 128 on a lens barrel 137 that is formed on the front of the front cover main body 125. A boss 138 is formed integrally on a lower front portion of the view field switching plate 128, and is inserted in the arced slit 99 that is formed through the front panel 126 below a lens hood 139. On the boss 138 protruded through the slit 99 is fitted the finder switching knob 97 from the front of the front panel 126.

In a peripheral area of the view field switching plate 128 are formed a P size finder frame 140 (aspect ratio: 3.0), an H size finder frame (aspect ratio: 1.8) and a C size finder frame 142 (aspect ratio: 1.5). Thus, either one of the finder frames 140 to 142 is inserted into between the finder objective window 13 and the finder opening 127 by operating the finder switching knob 97 to turn the view field switching plate 128, and the view field comes to be corresponding to the designated print size (see FIGS. 37A, 38A and 39A).

As shown in FIG. 33, a pair of marking holes 103 are provided below a light-shielding barrel 37 of the body basic portion 25. Light emitting elements, which are mounted on the rear side of the printed circuit board 42 of the flash unit 27, are opposed to these holes 103, so light is projected from the light emitting elements onto a photo filmstrip 30b through the holes 103. As set forth in detail below, depending upon the rotational position of the view field switching plate 128, the micro switches 129 to 131 are turned on or off, to change the number of activated light emitting elements. Thereby, the number of recorded marks is changed to designate the print size. The charge operation knob 15 is mounted on the front of the front cover main body 125, such that the charge operation knob 15 can slide up and down. As being slid upward, the charge operation knob 15 pushes the metal blade 46 that is disposed on the front of the printed circuit board 42, and thus turns on a charge switch. The light guide 19 moves up and down in cooperation with the charge operation knob 15.

Figure 35:
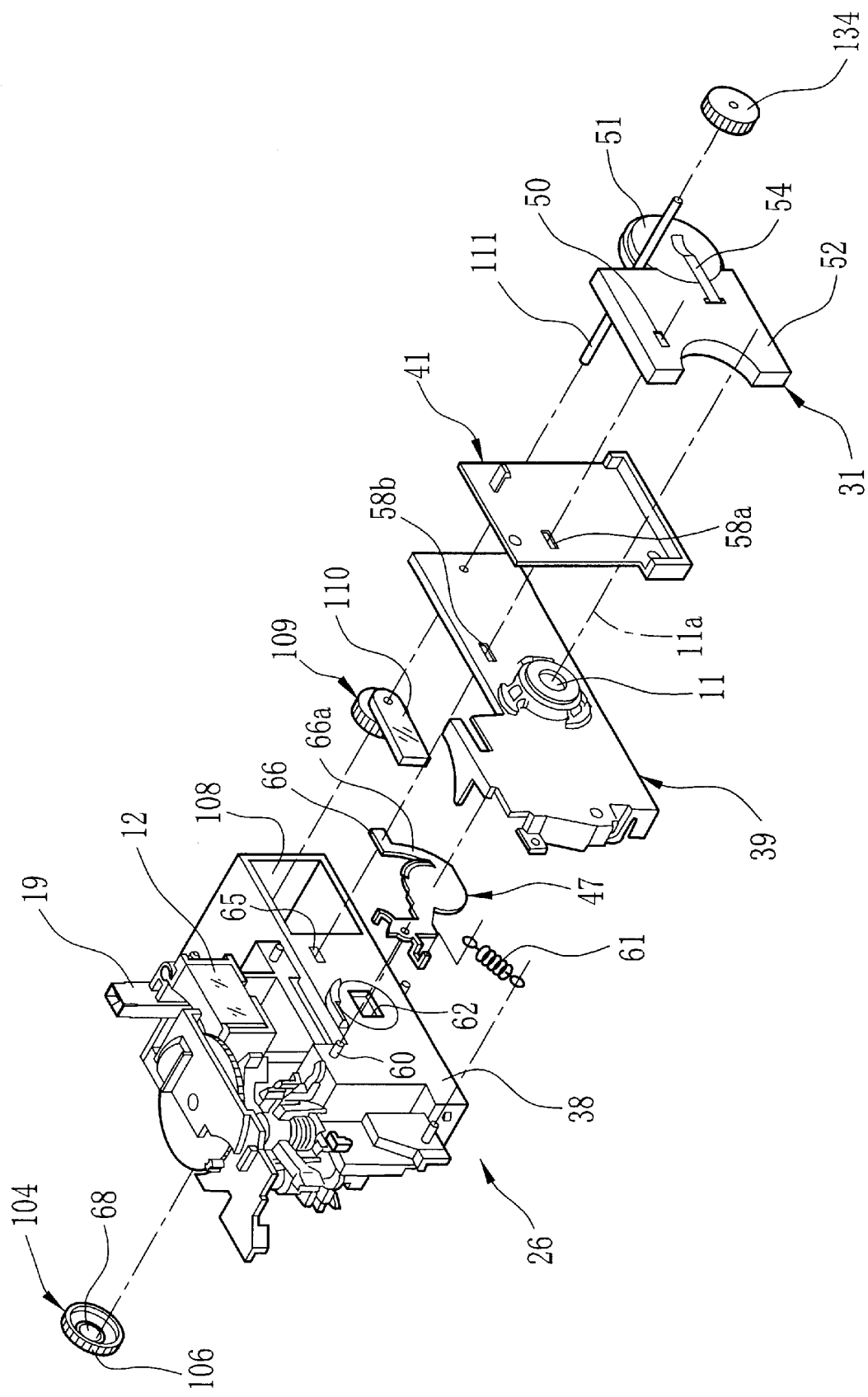
FIG. 35 is an exploded perspective view of an exposure unit including the optical data recording device.

As shown in FIG. 35, a module holding plate 41 is mounted on the front of a shutter cover 39 of the exposure unit 26, for holding the date module 31. Light from the data recording opening 98, which is formed through the front of the front cover 28, falls on an LCD panel 50 through an opening formed through the front of a module case 52. The light passes through date data that is displayed as transparent portions on the LCD panel 50, and then projected from an opening that is formed through a rear side of the module case 52. The light from the rear side opening of the module case 52 goes into a base portion 38 through openings 58a and 58b which are formed through the module holding plate 41 and the shutter cover 39 and through a data shutter opening 65 formed through the case portion 38.

Inside the base portion 38, behind the data shutter opening 65 is mounted a lens holder 104 that holds a projection lens 68 as a part of the optical data recording device. The lens holder 104 is of a circular shape, and is mounted in a rotary fashion on a holding plate 74 that is mounted inside the base portion 38, as shown in FIG. 36. A plurality of teeth 106 are formed around the lens holder 104 so the lens holder 104 functions as a gear.

A cavity 108 of a parallelepiped shape is integrally formed on one side of the base portion 38, and a drive gear 109 is mounted in the cavity 108 such that the drive gear 109 is in mesh with the teeth 106 of the lens holder 104. The drive gear 109 is formed from a transparent plastic integrally with a light path length adjusting plate 110. The light path length adjusting plate 110 is for changing the optical length from the LCD panel 50 to the projection lens 68. A shaft 111 is force fitted in the drive gear 109. The shaft 11 extends from the front side toward the rear side of the unit body 100. One end of the shaft 111 is pivoted in a bearing portion 108a that is provided inside the cavity 108. An opening 112 that is connected to the base portion 38 is formed through the cavity 108, so the drive gear 109 is engaged with the teeth 106 of the lens holder 104 through this opening 112. According to this configuration, the lens holder 104 is turned by rotational movement of the shaft 111.

On the other end of the shaft 111 is fitted the transmission gear 134 that is included in the three gears 132 to 134. The transmission gear 134 is coupled to the pinion gear 132 through the interconnection gear 133. The pinion gear 132 is in mesh with a rack gear 145 that if formed inside an arced slit 144 that is formed around the opening 136 of the view field switching plate 128. According to this configuration, rotational movement of the view field switching plate 128 causes the pinion gear 132 to rotate through the engagement with the rack gear 145, so the interconnection gear 133 and the transmission gear 134 rotate. Since the shaft 111 is force-fitted in the transmission gear 134, the rotational movement of the view field switching plate 128 is transmitted to the drive gear 109 through the shaft 111.

Figure 37A:
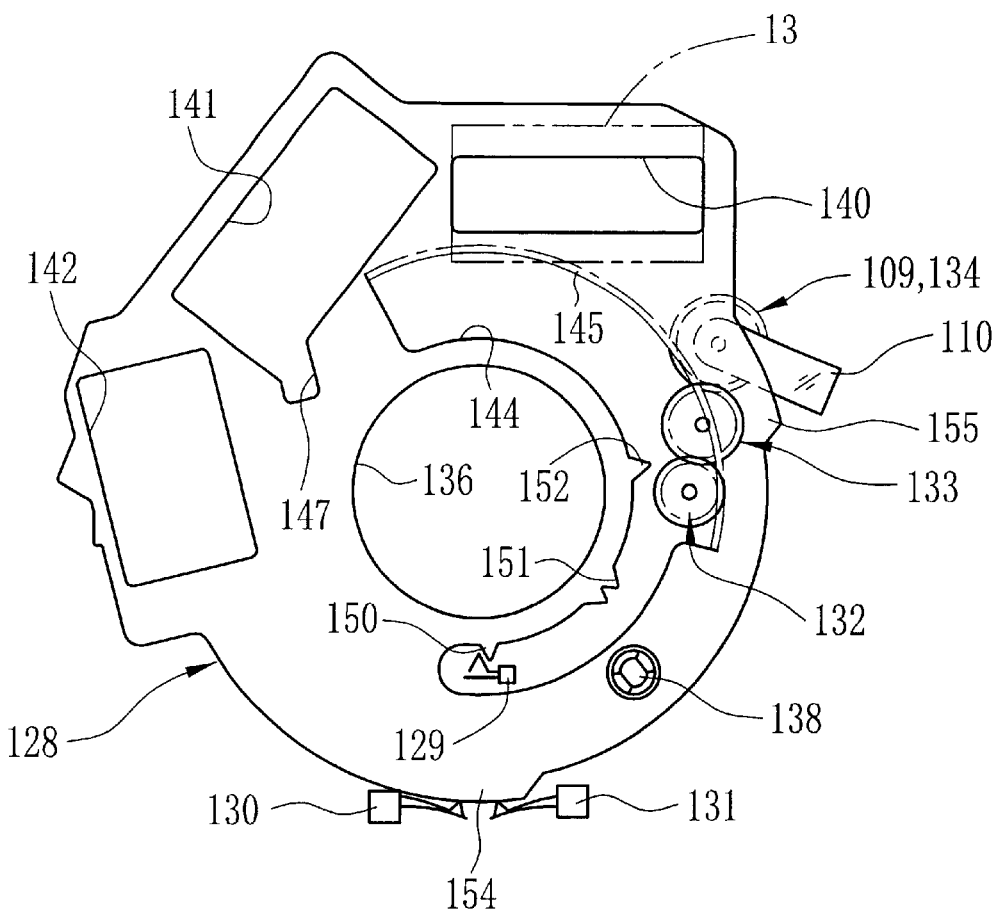
FIGS. 37A and 37B are explanatory diagrams respectively illustrating a view field switching plate and the optical data recording device in a P size position.
Figure 37B:
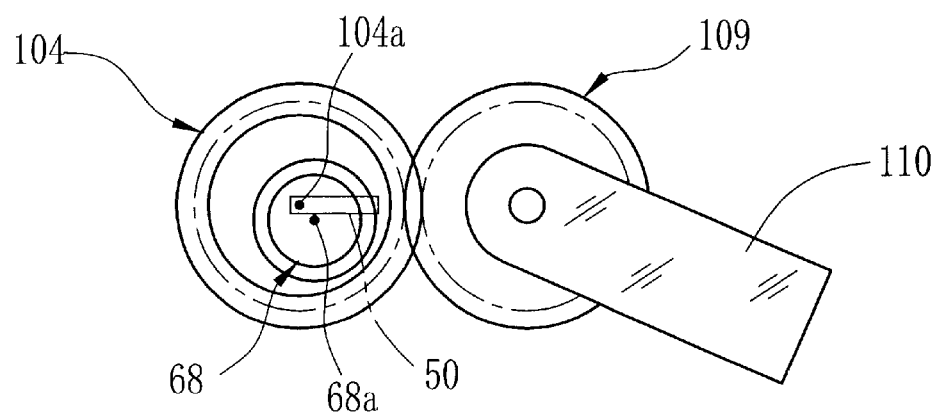
Figure 38A:
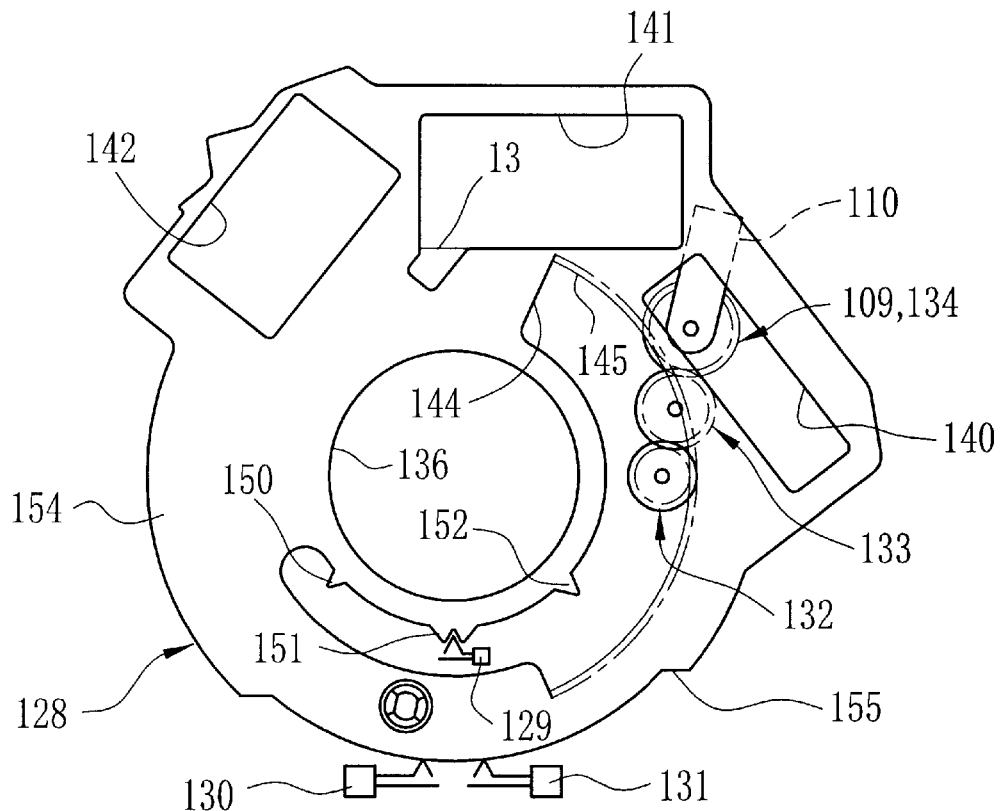
FIGS. 38A and 38B are explanatory diagrams respectively illustrating the view field switching plate and the optical data recording device in an H size position.
Figure 38B:
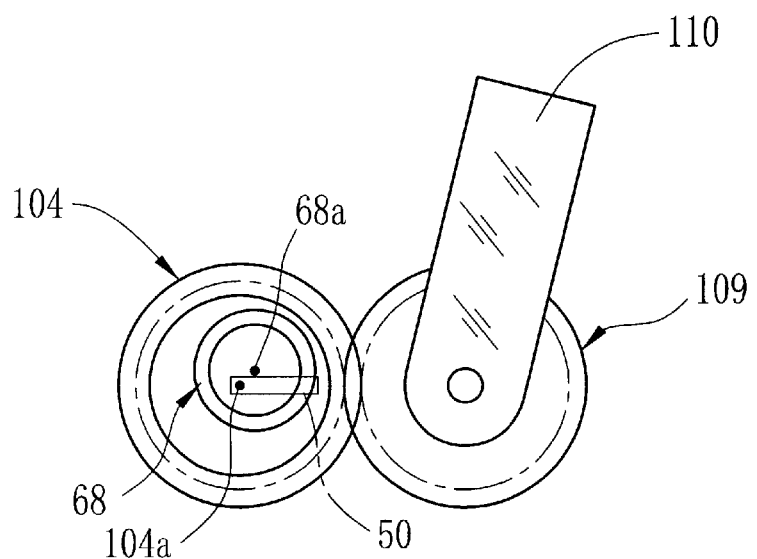
Figure 39A:
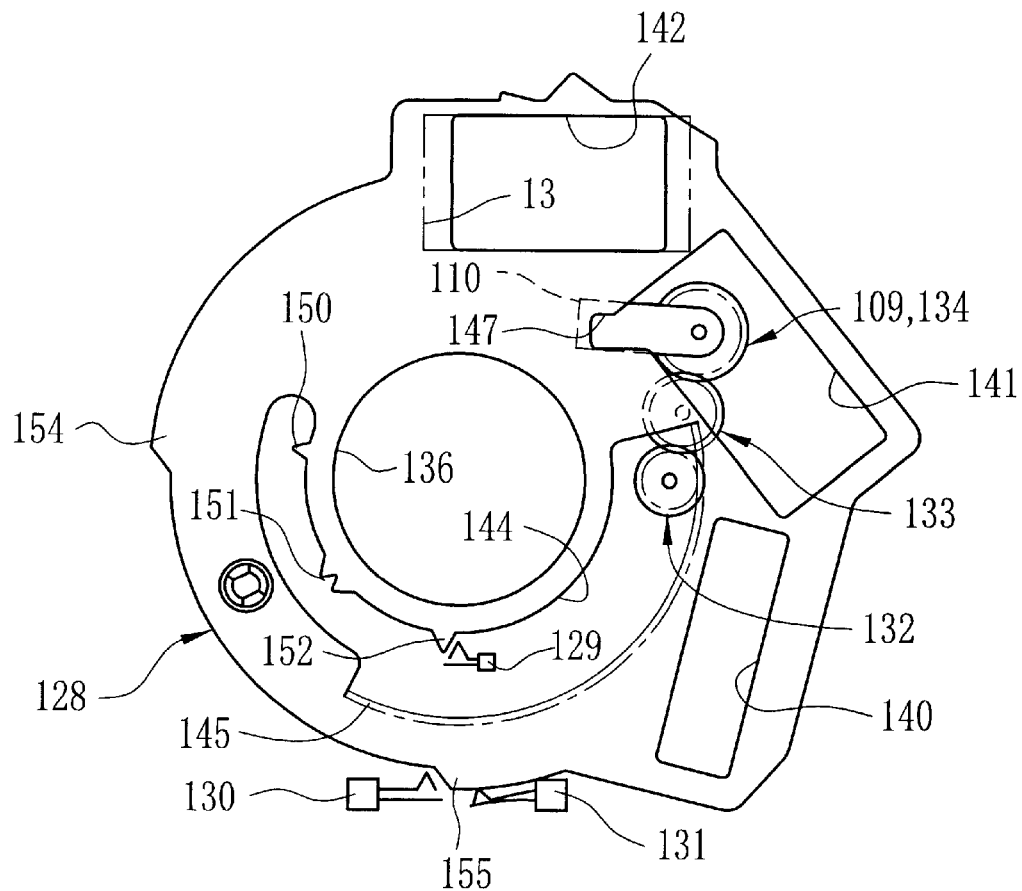
FIGS. 39A and 39B are explanatory diagrams respectively illustrating the view field switching plate and the optical data recording device in a C size position.
Figure 39B:
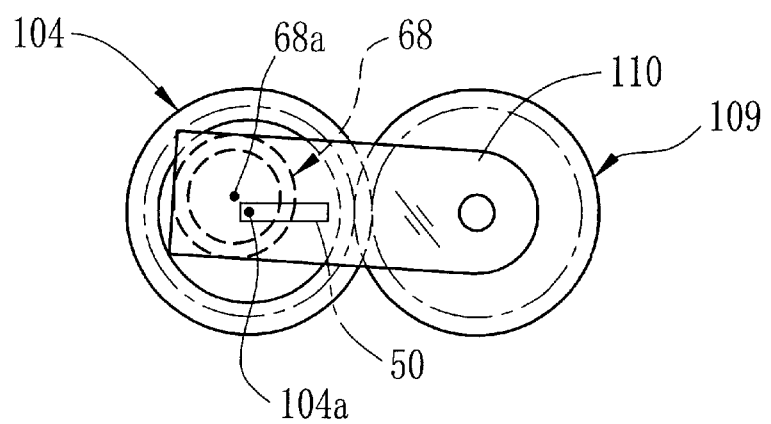

Referring to FIGS. 37B, 38B and 39B showing engagement between the lens holder 104 and the drive gear 109, the projection lens 68 is held in the lens holder 104 with its optical axis 68a displaced from a rotary center 104a of the lens holder 104, so the position of the projection lens 68 relative to the LCD panel 50 of the date module 31 changes with rotation of the lens holder 104. By adjusting gear numbers and others of the gears 132 to 134, 109 and the 104, the position of the projection lens 68 relative to the LCD panel 50 changes as the view field switching plate 128 is turned to the respective switching positions, such that the recording position of the date data in a picture frame 80 on the photo filmstrip 30b is shifted to one of those positions CD, HD and PD which are suitable for the print sizes of C, H and P respectively.

At that time, since a film supporting surface 29c and an aperture 36 of the unit body 100 are curved along an advancing direction of the photo filmstrip 30b, as shown in FIG. 36, the distance between the projection lens 68 and the date recording position CD for the C size is longer than the distance from the projection lens 68 to the date recording positions HD and PD for the H size and the P size, as shown by phantom lines in FIG. 36. Accordingly, if a focal point of the projection lens 68 is adjusted to one of these distances, the other position would be out of focus. To solve this problem, the focal point of the projection lens 68 is adjusted to the date recording positions HD and PD for the H and P sizes, and when the view field switching plate 128 is switched to the C size view field, the light path length adjusting plate 110, which is formed integrally with the drive gear 109, is inserted in between the data shutter opening 65 and the projection lens 68, as shown by phantom lines in FIG. 36. This position is shown in detail in FIGS. 39B and 41. In this way, when the C size is selected, the image surface of the date data on the LCD panel 50 is adjusted to the date data recording position CD for the C size within the picture frame 80 on the photo filmstrip 30b.

To form the image surface of the LCD panel 50 parallel with the curved film surface, it is preferable to incline the LCD panel 50 to a perpendicular plane to the optical axis 68a of the projection lens 68. It is also possible to incline the optical axis 68a of the projection lens 68 to the optical axis 11a of the taking lens 11a. Where the optical axis 68a of the projection lens 68 is inclined, the rotary axis 104a of the lens holder 104 is set parallel to the optical axis 68a.

An opening 125b is formed through the front of the front cover main body 125 in opposition to the data recording opening 98 of the front panel 126, to conduct ambient light to the LCD panel 50, for use as a light source for the data recording. Where the view field switching plate 128 is in the H size position or the P size position, the slit 144 is opposed to the openings 98 and 125a, so the light is conducted with no problem. On the other hand, where the view field switching plate 128 is turned to the C size position, as shown in FIG. 39A, a cutout 147 formed in connection to the H size finder frame 141 is placed in between these openings 98 and 125a, so the view field switching plate 128 would not block the light path.

The micro switch 129 of the mark recording circuit is located in the slit 144, and the slit 144 has projections 150, 151 and 152 formed on its one inner side wall, for actuating the micro switch 129. The micro switch 129 is connected in parallel to the charge switch that is turned on by the charge operation knob 15. The micro switch 129 is used for starting charging the flash circuit, like the charge switch. The mark recording circuit is designed to activate the light emitting element by electricity from a main capacitor 43 of the flash circuit. Therefore, the main capacitor 43 must be fully charged at the photography, to permit recording the marks. However, since the flash is often unused at the outdoor photography or the like, the main capacitor 43 is not always charged fully at the photography. At that case, the marks would not be recorded and thus the print size could not be designated. For this reason, the projections 150 to 152 are provided for pressing the micro switch 129 to turn it on to charge the main capacitor 43 when the view field switching plate 128 is turned to switch the view field.

The micro switch 129 and the projections 150 to 152 are used for holding the view field switching plate 128 at each switching position. For example, where the view field switching plate 128 is in the P size position as shown in FIG. 37A, the micro switch 129 is in contact with the projection 150 to hold the view field switching plate 128 at the P size position. In the same way, where the view field switching plate 128 is in the H size position as shown in FIG. 38A, the micro switch 129 is engaged with the projection 151 of a fork shape, so the view field switching plate 128 is held in this position. Furthermore, where the view field switching plate 128 is in the C size position as shown in FIG. 39A, the micro switch 129 is in contact with the projection 152 to hold the view field switching plate 128.

The micro switches 130 and 131 placed below the view field switching plate 128 are respectively for turning a pair of light emitting elements on and off for the mark recording, and are connected to the mark recording circuit. Cam portions 154 and 155 for actuating the micro switches 130 and 131 are provided on a periphery of the view field switching plate 128. For example, where the view field switching plate 128 is in the P size position as shown in FIG. 37A, the micro switches 130 and 131 are both turned on, so the two light emitting elements emit light to record two marks on the photo filmstrip 30b. Where the view field switching plate 128 is in the H size position as shown in FIG. 38A, the micro switches 130 and 131 are both turned off, so neither of the two light emitting elements emit light, and any mark is not recorded on the photo filmstrip 30b. Furthermore, where the view field switching plate 128 is in the C size position, only the micro switch 131 is turned on, so one light emitting element emits light to record one mark on the photo filmstrip 30b.

Next, the operation of the above embodiment will be described. The user slides the finder switching knob 97 in accordance with the print size to photograph. Though they are not shown, three indexes (H size, P size and C size) are provided as counterparts of the finder switching knob 97, outside the slit 99, so the finder switching knob 97 is mated with one of these indexes.

As the view field switching plate 128 turns, the projection 150, 151 or 152 provided in the slit 144 of the view field switching plate 128 presses the micro switch 129 to turn it on. Thereby the main capacitor 43 of the flash unit 27 is charged. For example when the finder switching knob 97 is switched to the P size position, as shown in FIG. 37A, the P size finder frame 140 is inserted in between the finder objective window 13 and the finder optical system 12, so the view field of the finder comes to be the P size. The micro switch 129 comes into contact with the projection 150 of the view field switching plate 128, thereby holding the view field switching plate 128 at the P size position.

As the view field switching plate 128 turns, the pinion gear 132 also rotates, because the pinion gear 132 is in mesh with the rack gear 145 provided on the view field switching plate 128. The rotation of the pinion gear 132 is transmitted through the interconnection gear 133 and the transmission gear 134 to the shaft 111 that is shown in FIGS. 34 and 35. As the shaft 111 rotates, the drive gear 109 fixed on one end of the shaft 111 also rotates, so the lens holder 104 rotates because the teeth 106 on its periphery are in mesh with the drive gear 109.

Since the projection lens 68 is mounted in the lens holder 104 with its optical axis 68a displaced from the rotary center 104a of the lens holder 104, the position of the projection lens 68 relative to the LCD panel 50 changes as the lens holder 104 turns. For example when the view field switching plate 128 is placed at the P size position, the projection lens 68 is placed at the P size position as shown in FIG. 37B.

To photograph without flash, the shutter button 17 is just pressed after framing through the finder. Then, a shutter release mechanism of the exposure unit 26 is activated to swing a shutter blade 47 for opening a photographic shutter opening 62. Thereby the photo filmstrip 30b is exposed to a subject light through the taking lens 11, and the picture frame 80 is photographed in the H size.

A data shutter portion 66 formed integrally with the shutter blade 47 also swings to open the data shutter opening 65. Thereby light entering through the data recording opening 98 of the front cover 28 illuminates the LCD panel 50 of the date module 31, so the date data displayed on the LCD panel 50 is projected through the projection lens 68 onto the photo filmstrip 30b. Where the projection lens 68 is set at the P size position by the rotation of the lens holder 104, the date data displayed on the LCD panel 50 is recorded on the date recording position PD in the P size frame area of the picture frame 80.

Because the cam portion 154 of the view field switching plate 128 turns on both micro switches 130 and 131 when the view field switching plate 128 is in the P size position, the mark recording circuit causes the two light emitting elements to emit light simultaneously with the shutter release. The light from these light emitting elements is photographed on the photo filmstrip 30*b* through marking holes 103 which are provided below a light-shielding barrel 37 of the body basic portion 25. After the photography, the exposed portion of the photo filmstrip 30*b* is wound up into a cartridge shell 30*a* by rotating a winding wheel 21, so an unexposed picture frame 80 is fed to a position opposing to the aperture 36. At the same time, preparation for the photography, including shutter-charging is carried out.

Where the view field switching plate 128 is turned to the H size position, as shown in FIG. 38A, the H size finder frame 141 is placed between the finder objective window 13 and the finder optical system 12, whereas the projection lens 68 is moved to the position as shown in FIG. 38B by the rotational movement of the lens holder 104. Thus, the date data is recorded on the date recording position HD shown in FIG. 40 simultaneously with the shutter releasing.

Figure 40:
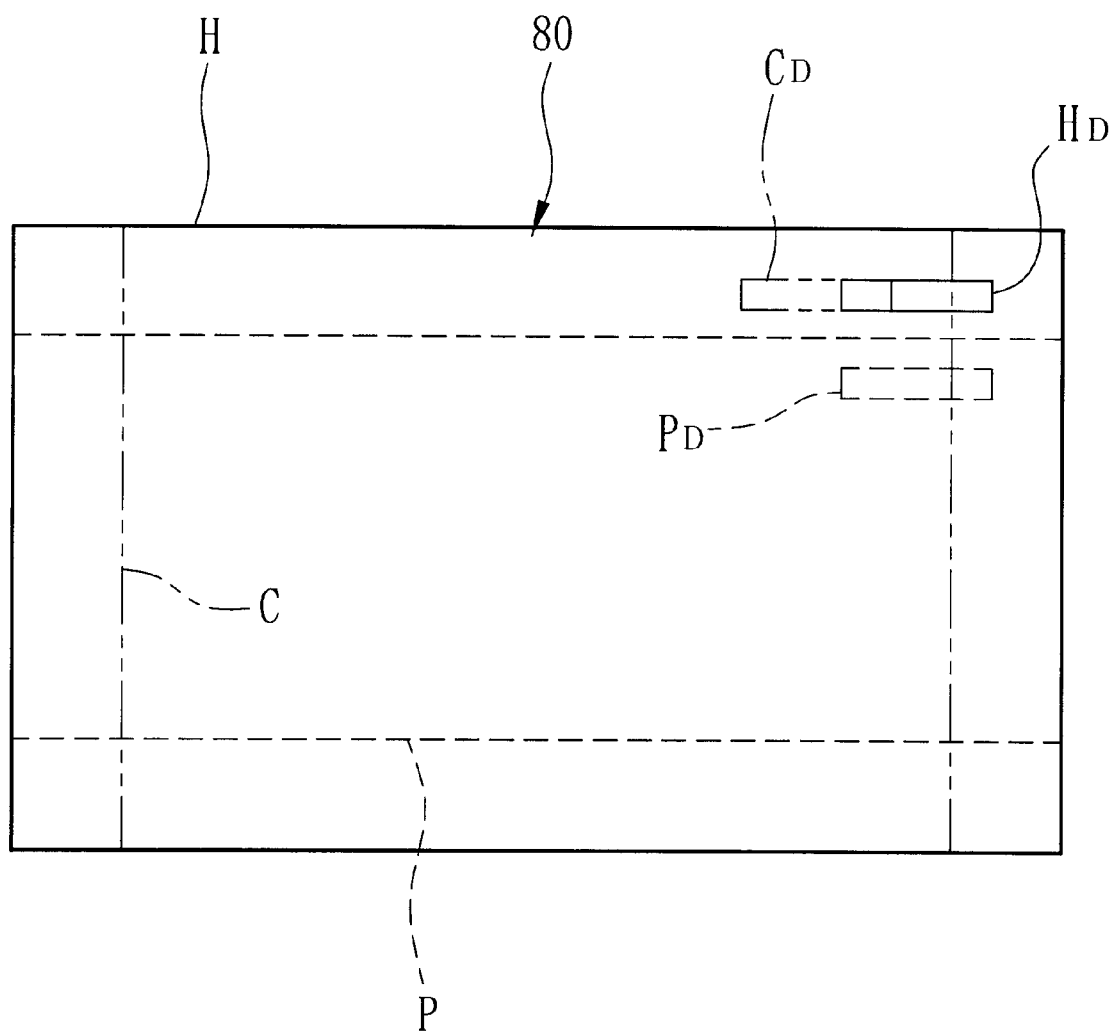
FIG. 40 is an explanatory diagram illustrating date recording positions for the respective sizes on a photographic frame, provided by the optical data recording device according to the fifth embodiment.
Figure 41:
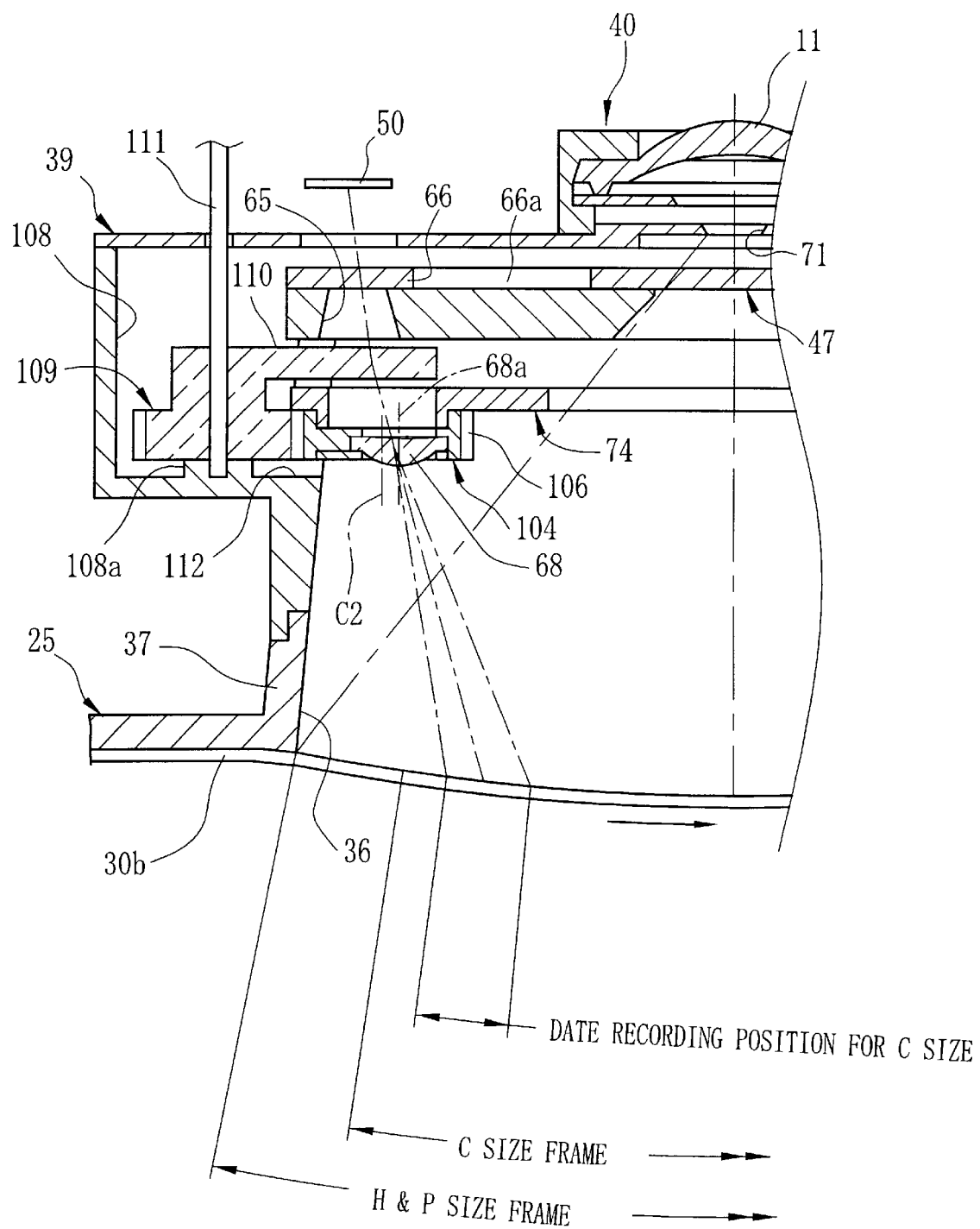
FIG. 41 is a sectional view of essential parts of the film unit of FIG. 32, illustrating a position of the optical data recording device where the date data is recorded at a date recording position for the C size.

Furthermore, where the view field switching plate 128 is turned to the C size position, as shown in FIG. 39A, the C size finder frame 142 is placed between the finder objective window 13 and the finder optical system 12, whereas the projection lens 68 is moved to the position as shown in FIGS. 39B and 41 by the rotational movement of the lens holder 104, and the light path length adjusting plate 110, which is formed integrally with the drive gear 109, is inserted in the light path of the photographic optical system. Thus, the date data is recorded in focus on. the date recording position CD inside the C size frame area of the picture frame 80, as is shown in FIG. 40.

Although the light path length is changed by means of the light path length adjusting plate in the above embodiment, it is possible to move the projection lens along the optical axis in cooperation with the print size switching. In that case, it is preferable to set the image magnification through the projection lens at 100% or more for the C size, and use a smaller image magnification for the H size and the P size.

The present invention has been described with respect to the film units, the present invention is applicable to those cameras which permit switching the print sizes. Since the film supporting surface is not curved in the conventional cameras, there is little difference in distance from date recording positions HD, PD and CD for the respective sizes to the projection lens 68. Therefore, the camera with the flat film supporting surface does not need a light path length adjusting plate, nor a configuration for inclining the image surface of the LCD panel so as to form it along the curved film surface.

To form the image surface of the LCD panel parallel with the curved film surface, one of the above embodiments inclines only the LCD panel to the perpendicular plane to the optical axis of the projection lens, while setting the optical axis of the projection lens to be parallel to the photographic optical axis of the taking lens. The other embodiment inclines only the optical axis of the projection lens to the photographic optical axis of the taking lens, while setting the LCD panel to be substantially parallel to the perpendicular plane to the photographic optical axis. However, it is possible to incline the LCD panel to the perpendicular plane to the photographic optical axis of the taking lens, and also incline the optical axis of the projection lens to the photographic optical axis of the taking lens, for the sake of forming the image surface of the LCD panel parallel with the curved surface of the photo filmstrip.

Although the above embodiments are designed to record the date data at an upper right position of the picture frame on the photo filmstrip, as viewed from the front of the film unit, the date data may be recorded at any location in the picture frame, such as lower right, upper left, or lower left of the picture frame, by relocating the projection lens and the LCD panel. Although the data shutter member is formed integrally with the shutter blade, it is possible to provide them separately, and actuate the data shutter member to open and close in cooperation with the shutter blade opening and closing.

In the above embodiment, a transparent type LCD panel is used as the display panel, and is illuminated with ambient light to emit the date light. In alternative, it is possible to direct a fragment of flash light into a light guide and conduct it to the LCD panel for illuminating the LCD panel. It is also possible to provide the date module with a light that emits at each photography to illuminate the LCD panel. The display panel may be an electronic display device that emits light by itself, like that consists of a plurality of portions, each portion having a plurality of LEDs arranged in a shape of "8". Where such an illumination lamp or an electronic display device is adopted, a special shutter member for controlling exposure amount for the data recording may be omitted if only the lamp or the electronic display device is turned on in synchronism with the shutter blade movement. However, in some cases, e.g., if the response of the illumination lamp or the electronic display device is slow, it is preferable to activate the lamp or the display device to emit light immediately before the shutter member begins to open the data shutter opening, e.g., at the timing when the shutter button is pressed halfway, and thereafter cause the shutter member to open the data shutter opening at the timing when the shutter button is fully pressed. Thereby the data would be recorded on the photo filmstrip without fail with less power consumption.

Thus, the present invention is not to be limited to the above embodiments, but various modifications will be possible without departing from the scope of claim.

INDUSTRIAL APPLICATION FIELD

Although the above description relates to the film units, the present invention is not limited to the film unit, but is applicable to cameras. The present invention is also applicable not only to those cases where a photographic date is the optically recorded data, but also to those cases where different kinds of characters, codes and the like are optically recorded.

What is claimed is:

1. An optical data recording device for optically recording data as displayed on a display panel through a non-reflective projection lens in a photographic frame on a photo filmstrip, in which an image of a subject is photographed through a taking lens, the photographic frame of the photo filmstrip being held in a curved posture in order to compensate for a curvature of field of the taking lens, the optical data recording device being characterized in that the display panel and the projection lens are located on the side of the taking lens relative to the photo filmstrip, and that a center of the display panel is displaced from an optical axis of the projection lens in a direction away from an optical axis of the taking lens, such that the data on the display panel is projected onto the photo filmstrip, to be recorded at a position that is shifted from the projection lens optical axis toward the taking lens optical axis.

2. An optical data recording device as claimed in claim 1, wherein a data shutter member is provide for controlling exposure amount for recording the data of the display panel, the data shutter member being rotated together with a shutter blade that controls exposure amount through the taking lens.

3. An optical data recording device as claimed in claim 2, wherein a rotational track of the data shutter member is placed outside a circle whose radius is identical to a distance from the rotary center to a farthest edge of a shutter opening for the taking lens.

4. An optical data recording device as claimed in claim 1, wherein a transparent type LCD panel is used as the display panel.

5. An optical data recording device as claimed in claim 4, wherein a light converging panel for converging ambient light is provided as a light source for illuminating the LCD panel.

6. An optical data recording device as claimed in claim 1, wherein a stop is placed between the display panel and the projection lens, and the optical data recording device satisfies the following conditions:

$$1 > d/f \geq 0.3$$

$$|R1| > |R2| \times 3$$

wherein f represents the focal length of the projection lens, d represents a distance from the stop to an image side surface of the projection lens, R1 represents a radius of curvature of a surface of the projection lens on the side of the display panel, and R2 represents a radius of curvature of the image side surface of the projection lens.

7. An optical data recording device as claimed in claim 6, wherein an angle θ of a line that extends from a farther edge of the display panel from the projection lens optical axis to a center of the stop, relative to the projection lens optical axis satisfies the following condition:

$$0 < \theta < 0.55$$

wherein the angle θ is given by an equation $\theta = TAN^{-1}\{(Q+L/2)/S\}$, assuming that S represents a distance from the display panel to the stop, L represents a longer side length of the display panel, and Q represents an amount of displacement of the center of the display panel from the optical axis of the projection lens.

8. An optical data recording device as claimed in claim 6, wherein, assuming that F1 represents the f-number of the taking lens, and F2 represents the f-number of the image forming lens, the f-numbers satisfy the following condition:

$$\log_2 (F2) \leq \log_2 (F1)$$

9. An optical data recording device as claimed in claim 1, wherein the display panel is inclined to a perpendicular plane to the projection lens optical axis such that an image surface of the display panel formed through the projection lens on the photo filmstrip extends parallel with the curved surface of the photo filmstrip.

10. An optical data recording device as claimed in claim 9, wherein the photographic frame of the photo filmstrip is curved along a lengthwise direction of the photo filmstrip with its concave surface oriented to the taking lens, and the projection lens optical axis is arranged parallel to the taking lens optical axis, whereas the display panel is inclined to close to the photo filmstrip as it removes from the taking lens optical axis.

11. An optical data recording device as claimed in claim 9, wherein the photographic frame of the photo filmstrip is curved along a lengthwise direction of the photo filmstrip with its concave surface oriented to the taking lens, and the projection lens optical axis is inclined to the taking lens optical axis such that if the optical axis is projected vertically onto a plane that includes the taking lens optical axis and is parallel to the lengthwise direction, the projected optical axis of the projection lens would cross the taking lens optical axis on an object side.

12. An optical data recording device as claimed in claim 11, wherein a stop is placed between the display panel and the projection lens, and a center of the stop is displaced from the projection lens optical axis in a direction away from the taking lens optical axis.

13. An optical data recording device as claimed in claim 12, wherein the display panel is arranged substantially parallel to a perpendicular plane to the taking lens optical axis.

14. An optical data recording device mounted in a camera that holds a photo filmstrip to be curved with its concave surface oriented to a taking lens, so as to compensate for a curvature of field of the taking lens, the optical data recording device recording data as displayed on a display panel optically through a projection lens in a photographic frame in which a subject image is photographed through the taking lens, characterized in that an optical axis of the projection lens is inclined to an optical axis of the taking lens such that if the projection lens optical axis is projected vertically onto a plane that includes the taking lens optical axis and is parallel to a particular direction, the projected optical axis of the projection lens would cross the taking lens optical axis on an object side, and that the display panel, a stop and the projection lens are arranged on the side of the taking lens relative to the photo filmstrip in this order from the object side, and the display panel is inclined to a perpendicular plane to the optical axis of the projection lens, such that an image surface of the display panel formed through the projection lens on the photo filmstrip extends parallel with the curved surface of the photo filmstrip.

15. An optical data recording device as claimed in claim 14, wherein a section of the photographic frame of the photo filmstrip taken along the particular direction forms a circular arc with a constant radius of curvature, whose center of curvature is on the side of the taking lens, and the optical data recording device satisfies the following condition:

$$Rc \times 1.5 < La < Rc \times 4$$

wherein La represents a length from the cross point of the taking lens optical axis with the projection lens optical axis as projected on the plane to a cross point of the taking lens optical axis with the photo filmstrip, and Rc represents the radius of curvature of the film surface.

16. An optical data recording device as claimed in claim 14, wherein a section of the photographic frame of the photo filmstrip taken along the particular direction is curved with irregular radiuses of curvature, and the optical data recording device satisfies the following condition:

$$Rc' \times 1.5 < La < Rc' \times 4$$

wherein La represents a length from the cross point of the taking lens optical axis with the projection lens optical axis as projected on the plane to a cross point of the taking lens optical axis with the photo filmstrip, and Rc' represents a pseudo radius of curvature of the photo filmstrip that is derived from positions where the taking lens optical axis and the projection lens optical axis come across the photo filmstrip respectively.

17. An optical data recording device as claimed in claim 14, wherein the display panel is arranged substantially parallel to a perpendicular plane to the taking lens optical axis.

18. An optical data recording device as claimed in claim 14, wherein the particular direction is a lengthwise direction of the photo filmstrip.

19. An optical data recording device for recording data as displayed on a display panel optically through a projection lens on a photo filmstrip in a photographic frame in which a subject image is photographed through a taking lens, the data recording device comprising:

a device for holding the projection lens such that the projection lens may rotate about a rotary center that is a parallel line to an optical axis of the projection lens, while keeping a center of the display panel away from the projection lens optical axis in a direction to remove the display panel away from an optical axis of the taking lens; and a device for causing the holding device to rotate to make a parallel displacement of the projection lens optical axis, thereby to shift an image projecting position of the data of the display panel on the photo filmstrip, while setting the image projecting position off the projection lens optical axis toward the taking lens optical axis.

20. An optical data recording device as claimed in claim 19, wherein the photographic frame of the photo filmstrip is held to be curved with its concave surface oriented to the taking lens, thereby to compensate for a curvature of field of the taking lens, and wherein the optical data recording device further comprises a light path length adjusting plate that is inserted into between the display panel and the projection lens in cooperation with the projection lens being rotated, to adjust a position of an image surface of the display panel formed through the projection lens in a direction of the optical axis.

21. An optical data recording device as claimed in claim 20, wherein the display panel is inclined to a perpendicular plane to the projection lens optical axis, to form the image surface of the display panel through the projection lens on the photo filmstrip along a curved surface thereof.

22. A camera with a print size switching operation mechanism that allows to designate a print size at photography for obtaining at least two kinds of photo prints of different sizes, the camera comprising:

a display panel for displaying data;

a projection lens for projecting the data as displayed on the display panel onto a photo filmstrip to record the data optically in a photographic frame in which a subject image is photographed through a taking lens;

a device for holding the projection lens such that the projection lens may rotate about a rotary center that is a parallel line to an optical axis of the projection lens, while keeping a center of the display panel away from the projection lens optical axis in a direction to remove the display panel away from an optical axis of the taking lens; and a device for causing the holding device to rotate to make a parallel displacement of the projection lens optical axis in cooperation with the print size switching operation mechanism, thereby to shift an image projecting position of the data of the display panel on the photo filmstrip to a location corresponding to the designated print size, while setting the image projecting position off the projection lens optical axis toward the taking lens optical axis.

23. A camera as claimed in claim 22, wherein the photographic frame of the photo filmstrip is held to be curved with its concave surface oriented to the taking lens, thereby to compensate for a curvature of field of the taking lens, and wherein the camera further comprises a light path length adjusting plate that is inserted into between the display panel and the projection lens in cooperation with the projection lens being rotated, to adjust a position of an image surface of the display panel formed through the projection lens in a direction of the optical axis.

24. A camera as claimed in claim 23, wherein the display panel is inclined to a perpendicular plane to the projection lens optical axis, to form the image surface of the display panel through the projection lens on the photo filmstrip along a curved surface thereof.

25. An optical data recording device as claimed in claim 24, wherein the photographic frame of the photo filmstrip is held to be curved along a film lengthwise direction with its concave surface oriented to the taking lens, and the projection lens optical axis is inclined to an optical axis of the taking lens such that if the projection lens optical axis is projected vertically onto a plane that includes the taking lens optical axis and is parallel to the film lengthwise direction, the projection lens optical axis would cross the taking lens optical axis on an object side.

* * * * *

UNITED STATES PATENT AND TRADEMARK OFFICE
CERTIFICATE OF CORRECTION

PATENT NO.      : 6,507,710 B1
DATED           : January 14, 2003
INVENTOR(S)     : Kazumi Koike et al.

It is certified that error appears in the above-identified patent and that said Letters Patent is hereby corrected as shown below:

<u>Title page,</u>
Item [30], Foreign Application Priority Data, change the third entry from "12-212908" to -- 10-212908 --.

Signed and Sealed this

Twentieth Day of May, 2003

JAMES E. ROGAN
*Director of the United States Patent and Trademark Office*